United States Patent
Sago et al.

(10) Patent No.: US 9,175,222 B2
(45) Date of Patent: Nov. 3, 2015

(54) OPTICALLY ISOTROPIC LIQUID CRYSTAL MEDIUM AND OPTICAL DEVICE

(71) Applicants: JNC CORPORATION, Tokyo (JP); JNC PETROCHEMICAL CORPORATION, Tokyo (JP)

(72) Inventors: Koki Sago, Chiba (JP); Shin-Ichi Yamamoto, Chiba (JP); Takafumi Kuninobu, Chiba (JP); Yasuhiro Haseba, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

(21) Appl. No.: 14/232,907

(22) PCT Filed: May 22, 2013

(86) PCT No.: PCT/JP2013/064169
§ 371 (c)(1),
(2) Date: Jan. 15, 2014

(87) PCT Pub. No.: WO2013/179960
PCT Pub. Date: Dec. 5, 2013

(65) Prior Publication Data
US 2014/0132868 A1    May 15, 2014

(30) Foreign Application Priority Data
May 28, 2012  (JP) .................. 2012-120771

(51) Int. Cl.
| | |
|---|---|
| G02F 1/1333 | (2006.01) |
| C09K 19/54 | (2006.01) |
| C09K 19/34 | (2006.01) |
| C09K 19/58 | (2006.01) |
| C09K 19/20 | (2006.01) |
| G02F 1/1343 | (2006.01) |
| G02F 1/139 | (2006.01) |
| C09K 19/04 | (2006.01) |

(52) U.S. Cl.
CPC ............... *C09K 19/542* (2013.01); *C09K 19/20* (2013.01); *C09K 19/3402* (2013.01); *C09K 19/3444* (2013.01); *C09K 19/3458* (2013.01); *C09K 19/54* (2013.01); *C09K 19/586* (2013.01); *C09K 19/588* (2013.01); *G02F 1/1396* (2013.01); *G02F 1/133365* (2013.01); *G02F 1/134363* (2013.01); *C09K 2019/0448* (2013.01); *C09K 2019/0466* (2013.01); *C09K 2019/3422* (2013.01)

(58) Field of Classification Search
CPC ............ G02F 1/1396; G02F 1/134363; G02F 1/133365; C09K 19/542; C09K 19/3402; C09K 19/586; C09K 19/588; C09K 19/54; C09K 19/20; C09K 19/3444; C09K 19/3458; C09K 2019/0448; C09K 2019/0466; C09K 2019/3422

USPC ............... 252/299.01, 299.6, 299.61, 299.63, 252/299.66; 428/1.1, 1.3; 349/167, 182
See application file for complete search history.

(56) References Cited

U.S. PATENT DOCUMENTS 8,609,208 B2 * 12/2013 Yamamoto et al. ............ 428/1.1
8,858,830 B2 * 10/2014 Yamamoto et al. ...... 252/299.66
(Continued)

FOREIGN PATENT DOCUMENTS

| EP | 0959060 | 11/1999 |
|---|---|---|
| EP | 1690917 | 8/2006 |

(Continued)

OTHER PUBLICATIONS

Kikuchi et al., "Polymer-stabilized liquid crystal blue phases", Nature Materials, Sep. 2002, p. 64-p. 68, vol. 1.
(Continued)

*Primary Examiner* — Geraldina Visconti
(74) *Attorney, Agent, or Firm* — Jianq Chyun IP Office

(57) ABSTRACT

An optically isotropic liquid crystal composition is described. The liquid crystal composition contains an achiral component T and a chiral agent, contains at least one compound represented by formula (1) as a first component of the achiral component T, and exhibits an optically isotropic liquid crystal phase:

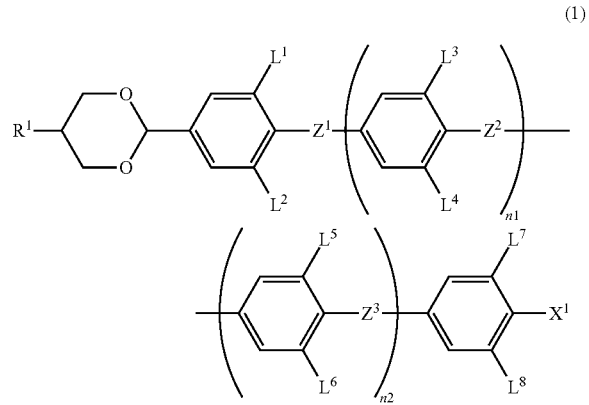

(1)

wherein, for example, $R^1$ is alkyl having 1 to 20 carbons; $L^1$ to $L^8$ are independently hydrogen or fluorine; $Z^1$ to $Z^3$ are each independently a single bond, —COO— or —CF$_2$O—, but at least one thereof is —COO—; n1 and n2 are each independently 0 or 1; and $X^1$ is halogen.

40 Claims, 1 Drawing Sheet

(56) References Cited

U.S. PATENT DOCUMENTS

| | | | |
|---|---|---|---|
| 2006/0006363 A1 | 1/2006 | Heckmeier et al. | |
| 2006/0050354 A1 | 3/2006 | Heckmeier et al. | |
| 2006/0227283 A1 | 10/2006 | Ooi et al. | |
| 2011/0242473 A1 | 10/2011 | Haseba et al. | |

FOREIGN PATENT DOCUMENTS

| | | |
|---|---|---|
| EP | 1743931 | 1/2007 |
| EP | 1824946 | 8/2007 |
| JP | S59-082382 | 5/1984 |
| JP | H05-247026 | 9/1993 |
| JP | H08-082778 | 3/1996 |
| JP | H08-218069 | 8/1996 |
| JP | H09-176650 | 7/1997 |
| JP | H09-235551 | 9/1997 |
| JP | H10-139778 | 5/1998 |
| JP | 2003-327966 | 11/2003 |
| JP | 2005-157109 | 6/2005 |
| JP | 2005-336477 | 12/2005 |
| JP | 2006-506477 | 2/2006 |
| JP | 2006-506515 | 2/2006 |
| JP | 2006-089622 | 4/2006 |
| JP | 2006-127707 | 5/2006 |
| JP | 2006-225655 | 8/2006 |
| JP | 2006-299084 | 11/2006 |
| WO | WO98/20006 | * 5/1998 ............ C09K 19/42 |
| WO | 9823561 | 6/1998 |
| WO | 2005080529 | 9/2005 |
| WO | 2005090520 | 9/2005 |
| WO | 2006063662 | 6/2006 |
| WO | 2010058681 | 5/2010 |
| WO | 2012043145 | 4/2012 |

OTHER PUBLICATIONS

Hisakado et al., "Large Electro-optic Kerr Effect in Polymer-Stabilized Liquid-Crystalline Blue Phases", Jan. 2005, p.96-p. 98, vol. 17, No. 1.

Haseba et al, "Electro-optic effects of the optically isotropic state induced by the incorporative effects of a polymer network and the chirality of liquid crystal", Journal of the SID, Jun. 2006, p. 551-p. 556, vol. 14, No. 6.

"International Search Report (Form PCT/ISA/210)", mailed on Aug. 20, 2013, with English translation thereof, p. 1-p. 6 in which the listed references (WO2012043145, JPH09-235551, JPS59-082382, JPH09-176650, JPH08-218069, JPH08-082778, JPH05-247026 and JPH10-139778) were cited.

\* cited by examiner

Optical System for Measurement
(Use of comb electrode cell)

OPTICALLY ISOTROPIC LIQUID CRYSTAL MEDIUM AND OPTICAL DEVICE

CROSS-REFERENCE TO RELATED APPLICATION

This application is a 371 application of an International PCT application serial no. PCT/JP2013/064169, filed on May 22, 2013, which claims the priority benefits of Japan Patent Application No. 2012-120771 filed on May 28, 2012. The entirety of each of the above-mentioned patent applications is hereby incorporated by reference herein and made a part of this specification.

TECHNICAL FIELD

The present invention relates to a liquid crystal medium useful as a material for an optical device. More specifically, the invention relates to a liquid crystal medium having a wide temperature range of a liquid crystal phase, and large dielectric anisotropy and refractive index anisotropy. In addition, the invention relates to an optical device using the liquid crystal medium. More specifically, the invention relates to a liquid crystal medium that can be used in a wide temperature range, allows low voltage driving and can achieve a high-speed electro-optic response, and an optical device using the same.

BACKGROUND ART

Liquid crystal display devices using liquid crystal compositions are widely utilized for displays of watches, calculators, word processors and so on. The liquid crystal display devices utilize refractive index anisotropy, dielectric anisotropy and so on of liquid crystal compounds. As an operation mode in the liquid crystal display device, a mode mainly using at least one polarizing plate to display images is known, such as a phase change (PC), twisted nematic (TN), super twisted nematic (STN), bistable twisted nematic (BTN), electrically controlled birefringence (ECB), optically compensated bend (OCB), in-plane switching (IPS) or vertical alignment (VA) mode. Furthermore, a research has been recently conducted actively on a mode that exhibits electric birefringence by applying an electric field to an optically isotropic liquid crystal phase (Patent literature Nos. 1 to 14, Non-patent literature Nos. 1 to 3).

Furthermore, a proposal has been made for a wavelength variable filter, a wavefront control device, a liquid crystal lens, an aberration correction device, an aperture control device, an optical head device or the like utilizing electric birefringence in a blue phase as one of the optically isotropic liquid crystal phases (Patent literature Nos. 10 to 12).

The classification based on the driving mode of the device includes passive matrix (PM) and active matrix (AM) types. The passive matrix (PM) types are further classified into static type, multiplex type and so forth, and the AM types are further classified into thin film transistor (TFT) type, metal insulator metal (MIM) type and so forth.

The liquid crystal display devices include a liquid crystal composition having suitable physical properties. In order to improve characteristics of the liquid crystal display device, the liquid crystal composition preferably has suitable physical properties. General physical properties necessary for the liquid crystal compound as a component of the liquid crystal composition are as described below:

(1) being chemically stable and physically stable;
(2) having a high clearing point (clearing point: phase transition temperature between a liquid crystal phase and an isotropic phase);
(3) having a low minimum temperature of the liquid crystal phase (a nematic phase, a cholesteric phase, a smectic phase, an optically isotropic phase such a blue phase, or the like);
(4) having an excellent compatibility with other liquid crystal compounds;
(5) having a dielectric anisotropy of a suitable magnitude; and
(6) having a refractive index anisotropy of a suitable magnitude.

In particular, from a viewpoint of reducing the driving voltage, a liquid crystal compound having both a large dielectric anisotropy and a large refractive index anisotropy is preferred for the optically isotropic liquid crystal phase.

If a liquid crystal compound containing a liquid crystal compound being chemically and physically stable as described in property (1) is used in the liquid crystal display device, the voltage holding ratio can be increased.

With a liquid crystal composition containing a liquid crystal compound having a high clearing point or a low minimum temperature of the liquid crystal phase as described in properties (2) and (3), the temperature range of the nematic phase or the optically isotropic liquid crystal phase can be extended, and the liquid crystal composition can be used in the form of a display device in a wide temperature range. In order to develop characteristics that are difficult to be achieved by a single compound, the liquid crystal compound is generally used in the form of a liquid crystal composition prepared by mixing the compound with many other liquid crystal compounds. Accordingly, the liquid crystal compound to be used in the liquid crystal device preferably has the good compatibility with other liquid crystal compounds as described in property (4). In particular, a liquid crystal display device having a higher display performance in characteristics such as contrast, display capacity and response time has been recently required. Furthermore, a liquid crystal composition having a low driving voltage is required for a liquid crystal material to be used. Moreover, a liquid crystal compound having large dielectric anisotropy and refractive index anisotropy is preferably used in order to drive at a low voltage the optical device to be driven in the optically isotropic liquid crystal phase.

CITATION LIST

Patent Literature

Patent literature No. 1: JP 2003-327966 A.
Patent literature No. 2: WO 2005/90520 A.
Patent literature No. 3: JP 2005-336477 A.
Patent literature No. 4: JP 2006-89622 A.
Patent literature No. 5: JP 2006-299084 A.
Patent literature No. 6: JP 2006-506477 A.
Patent literature No. 7: JP 2006-506515 A.
Patent literature No. 8: WO 2006/063662 A.
Patent literature No. 9: JP 2006-225655 A.
Patent literature No. 10: JP 2005-157109 A.
Patent literature No. 11: WO 2005/80529 A.
Patent literature No. 12: JP 2006-127707 A.
Patent literature No. 13: WO 1998/023561 A.
Patent literature No. 14: WO 2010/058681A.

Non-Patent Literature

Non-patent literature No. 1: Nature Materials, 1, 64 (2002).
Non-patent literature No. 2: Adv. Mater., 17, 96 (2005).

Non-patent literature No. 3: Journal of the SID, 14, 551 (2006).

SUMMARY OF INVENTION

Technical Problem

A first object of the invention is to provide a liquid crystal medium that has an optically isotropic liquid crystal phase, and has stability to heat, light and so forth, a wide liquid crystal phase temperature range, and a very large dielectric anisotropy. A second object is to provide various optical devices that include the liquid crystal medium, can be used in a wide temperature range, and have a short response time, a large contrast and a low driving voltage.

Solution to Problem

The invention provides a liquid crystal medium (a liquid crystal composition or a polymer/liquid crystal composite), a mixture and an optical device including the liquid crystal medium, or the like.

Item 1. A liquid crystal composition that exhibits an optically isotropic liquid crystal phase, contains an achiral component T and a chiral agent, and contains at least one compound selected from the group of compounds represented by formula (1) as a first component of the achiral component T:

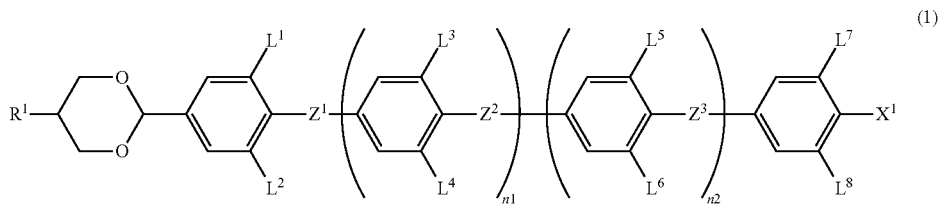

(1)

wherein $R^1$ is hydrogen or alkyl having 1 to 20 carbons, at least one —$CH_2$— in the alkyl may be replaced by —O—, —S—, —COO— or —OCO—, at least one —$CH_2$—$CH_2$— in the alkyl may be replaced by —CH=CH—, —CF=CF— or —C≡C—, and in the alkyl, the group formed by replacing at least one —$CH_2$— in the alkyl by —O—, —S—, —COO— or —OCO—, or the group formed by replacing at least one —$CH_2$—$CH_2$— in the alkyl by —CH=CH—, —CF=CF— or —C≡C—, at least one hydrogen may be replaced by halogen, provided that in R', —O— and —CH=CH— are not adjacent and —CO— and —CH=CH— are not adjacent; $L^1$, $L^2$, $L^3$, $L^4$, $L^5$, $L^6$, $L^7$ and $L^8$ are independently hydrogen or fluorine; $Z^1$, $Z^2$ and $Z^3$ are each independently a single bond, —COO— or —$CF_2O$—, but at least one thereof is —COO—; n1 and n2 are each independently 0 or 1; and $X^1$ is hydrogen, halogen, —$SF_5$ or alkyl having 1 to 10 carbons, at least one —$CH_2$— in the alkyl may be replaced by —O—, —S—, —COO— or —OCO—, at least one —$CH_2$—$CH_2$— in the alkyl may be replaced by —CH=CH—, —CF=CF— or —C≡C—, and in the alkyl, the group formed by replacing at least one —$CH_2$— in the alkyl by —O—, —S—, —COO— or —OCO—, or the group formed by replacing at least one —$CH_2$—$CH_2$— in the alkyl by —CH=CH—, —CF=CF— or —C≡C—, at least one hydrogen may be replaced by fluorine, provided that in $X^1$, —O— and —CH=CH— are not adjacent and —CO— and —CH=CH— are not adjacent.

Item 2. The liquid crystal composition according to item 1, wherein the first component of the achiral component T contains at least one compound selected from the group of compounds represented by formulas (1-1-1), (1-1-2), (1-2-1) to (1-2-5), (1-3-1), (1-3-2), (1-4-1), (1-4-2) and (1-5-1):

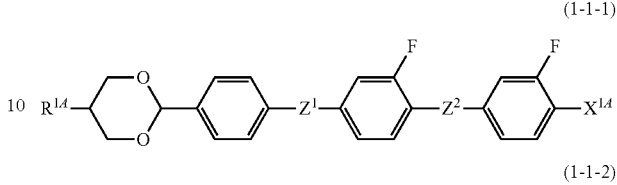
(1-1-1)

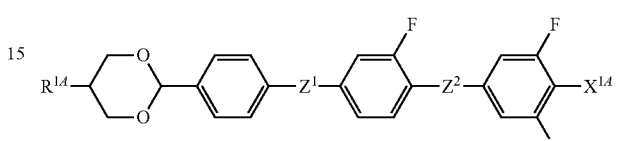
(1-1-2)

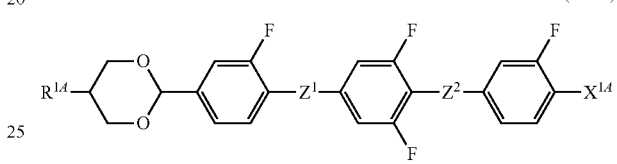
(1-2-1)

-continued

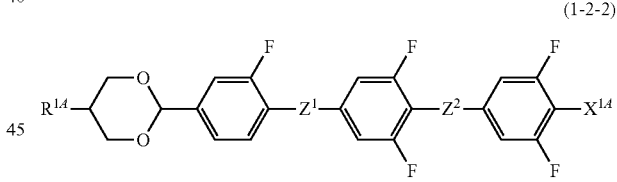
(1-2-2)

(1-2-3)

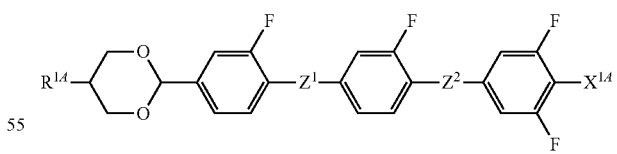
(1-2-4)

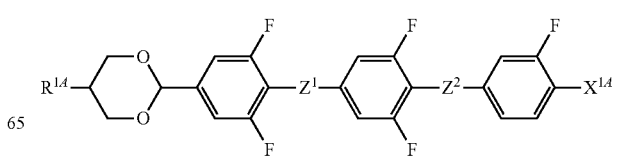

(1-2-5)
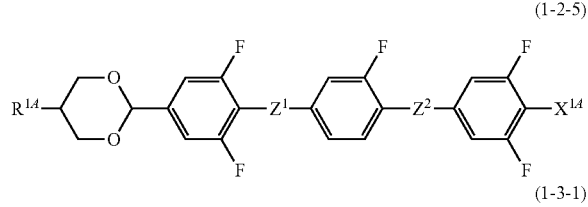

(1-3-1)
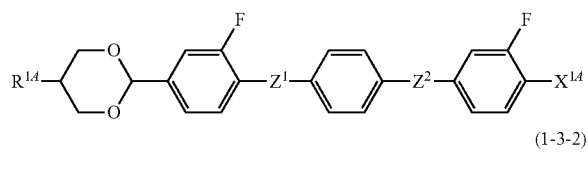

(1-3-2)
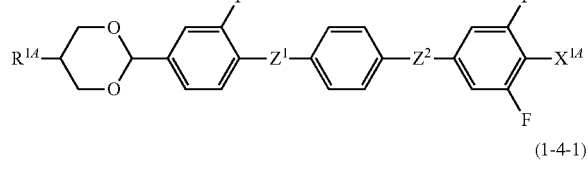

(1-4-1)
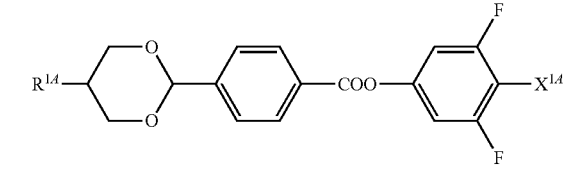

(1-4-2)
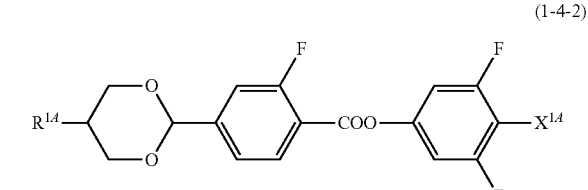

(1-5-1)
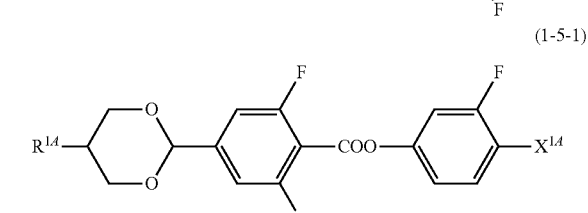

wherein $R^{14}$ is alkyl having 1 to 12 carbons, alkoxy having 1 to 12 carbons, alkenyl having 2 to 12 carbons, or alkenyl having 2 to 12 carbons in which at least one hydrogen is replaced by fluorine; $Z^1$ and $Z^2$ are each independently a single bond, —COO— or —CF$_2$O—, but at least one thereof is —COO—; and $X^{14}$ is fluorine, chlorine, —CF$_3$ or —OCF$_3$.

Item 3. The liquid crystal composition according to item 1, wherein the first component of the achiral component T contains at least one compound selected from the group of compounds represented by formulas (1-2-2-1) and (1-2-5-1):

(1-2-2-1)
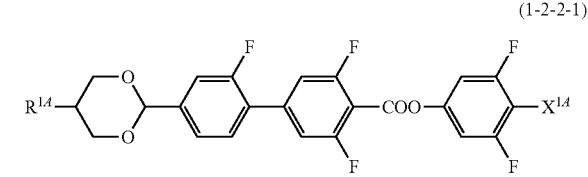

(1-2-5-1)
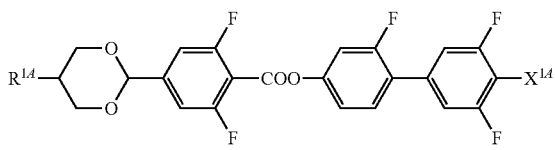

wherein $R^{14}$ is alkyl having 1 to 12 carbons, alkoxy having 1 to 12 carbons, alkenyl having 2 to 12 carbons, or alkenyl having 2 to 12 carbons in which at least one hydrogen is replaced by fluorine; and $X^{14}$ is fluorine, chlorine or —CF$_3$.

Item 4. The liquid crystal composition according to item 1, wherein the first component of the achiral component T contains at least one compound selected from the group of compounds represented by formulas (1-4-1), (1-4-2) and (1-5-1):

(1-4-1)
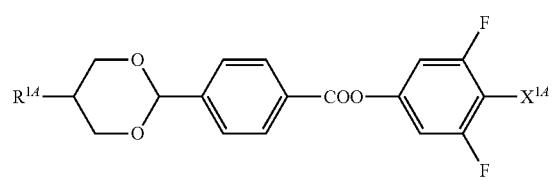

(1-4-2)
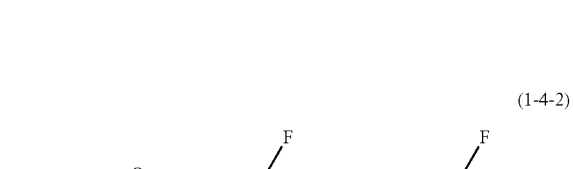

(1-5-1)
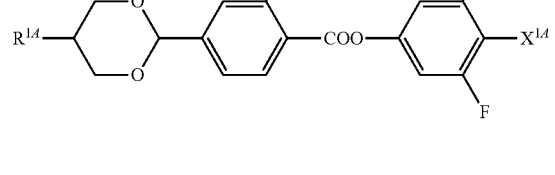

wherein, $R^{14}$ is alkyl having 1 to 12 carbons, alkoxy having 1 to 12 carbons, alkenyl having 2 to 12 carbons, or alkenyl having 2 to 12 carbons in which at least one hydrogen is replaced by fluorine; and $X^{14}$ is fluorine, chlorine, —CF$_3$ or —OCF$_3$.

Item 5. The liquid crystal composition according to any one of items 1 to 4, wherein the proportion of the first component of the achiral component T is in the range of 3 wt % to 80 wt % based on the total weight of the achiral component T.

Item 6. The liquid crystal composition according to any one of items 1 to 5, further containing at least one compound selected from the group of compounds represented by formula (2) as a second component of the achiral component T:

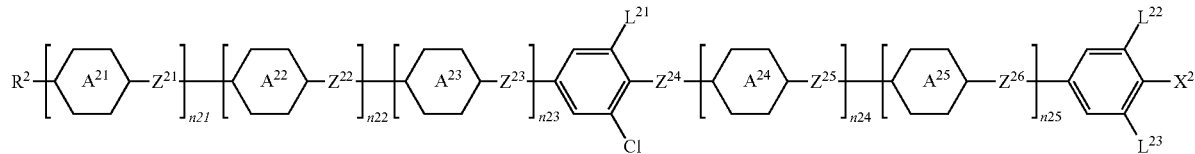

(2)

wherein R² is hydrogen or alkyl having 1 to 20 carbons, at least one —CH₂— in the alkyl may be replaced by —O—, —S—, —COO— or —OCO—, at least one —CH₂—CH₂— in the alkyl may be replaced by —CH=CH—, —CF=CF— or —C≡C—, and in the alkyl, the group formed by replacing at least one —CH₂— in the alkyl by —O—, —S—, —COO— or —OCO—, or the group formed by replacing at least one —CH₂—CH₂— in the alkyl by —CH=CH—, —CF=CF— or —C≡C—, at least one hydrogen may be replaced by halogen, provided that in R², —O— and —CH=CH— are not adjacent and —CO— and —CH=CH— are not adjacent; ring $A^{21}$, ring $A^{22}$, ring $A^{23}$, ring $A^{24}$ and ring $A^{25}$ are independently 1,4-cyclohexylene, 1,3-dioxane-2,5-diyl, 1,4-phenylene, 1,4-phenylene in which one or two hydrogens are replaced by fluorine, 1,4-phenylene in which two hydrogens are replaced by fluorine and chlorine, respectively, pyridine-2,5-diyl or pyrimidine-2,5-diyl; $Z^{21}$, $Z^{22}$, $Z^{23}$, $Z^{24}$, $Z^{25}$ and $Z^{26}$ are independently a single bond or alkylene having 1 to 4 carbons, and at least one —CH₂— in the alkylene may be replaced by —O—, —COO— or —CF₂O—; $L^{21}$, $L^{22}$ and $L^{23}$ are independently hydrogen or fluorine; $X^2$ is fluorine, chlorine, —CF₃ or —OCF₃; and n21, n22, n23, n24 and n25 are independently 0 or 1 and satisfy the inequality of 2≤n21+n22+n23+n24+n25≤3.

Item 7. The Liquid crystal composition according to item 6, wherein the second component of the achiral component T contains at least one compound selected from the group of compounds represented by formulas (2-1-1-2), (2-1-2-1), (2-1-3-1), (2-1-3-2), (2-1-4-2) and (2-1-4-3):

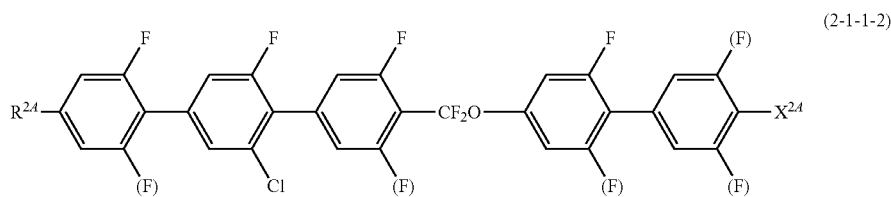

(2-1-1-2)

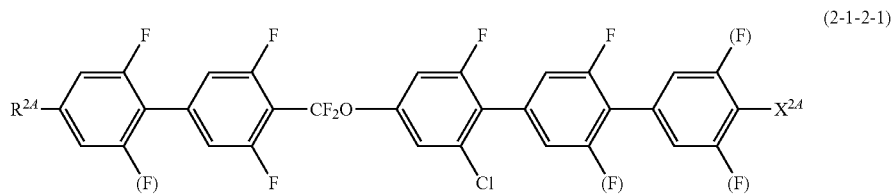

(2-1-2-1)

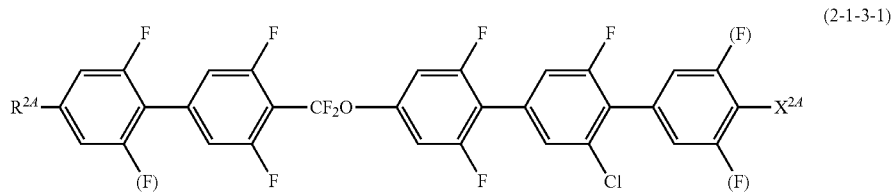

(2-1-3-1)

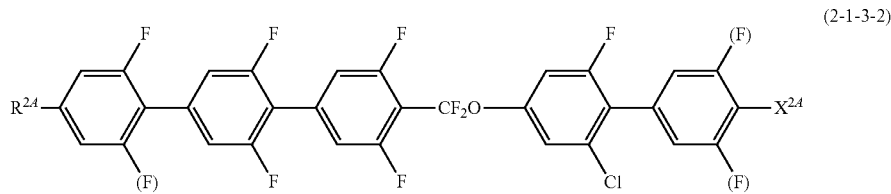

(2-1-3-2)

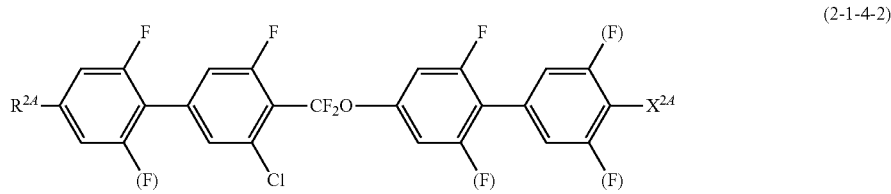

(2-1-4-2)

(2-1-4-3)

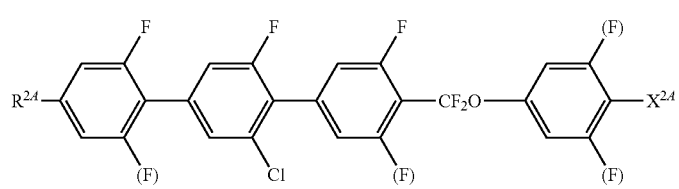

wherein, $R^{2A}$ is alkyl having 1 to 12 carbons, alkoxy having 1 to 12 carbons, alkenyl having 2 to 12 carbons, or alkenyl having 2 to 12 carbons in which at least one hydrogen is replaced by fluorine; (F) is independently hydrogen or fluorine; and $X^{2A}$ is fluorine, chlorine, —$CF_3$ or —$OCF_3$.

Item 8. The liquid crystal composition according to item 7, wherein the second component of the achiral component T contains at least one compound selected from the group of compounds represented by formula (2-1-1-2) according to item 7.

Item 9. The liquid crystal composition according to item 7, wherein the second component of the achiral component T contains at least one compound selected from the group of compounds represented by the formula (2-1-4-3) according to item 7.

Item 10. The liquid crystal composition according to item 7, wherein the second component of the achiral component T contains a mixture of at least one compound selected from the group of compounds represented by formula (2-1-1-2) according to item 7, and at least one compound selected from the group of compounds represented by formula (2-1-4-3) according to item 7.

Item 11. The liquid crystal composition according to any one of items 6 to 10, wherein the proportion of the second component of the achiral component T is in the range of 5 wt % to 70 wt % based on the total weight of the achiral component T.

Item 12. The liquid crystal composition according to any one of items 1 to 11, further containing at least one compound selected from the group of compounds represented by formula (3) as a third component of the achiral component T:

(3)

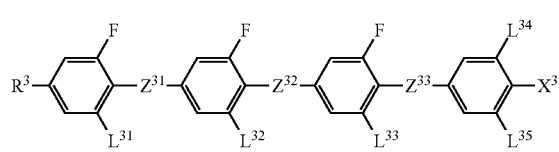

wherein in formula (3), $R^3$ is hydrogen or alkyl having 1 to 20 carbons, at least one —$CH_2$— in the alkyl may be replaced by —O—, —S—, —COO— or —OCO—, at least one —$CH_2$—$CH_2$— in the alkyl may be replaced by —CH=CH—, —CF=CF— or —C≡C—, and in the alkyl, the group formed by replacing at least one —$CH_2$— in the alkyl by —O—, —S—, —COO— or —OCO—, or the group formed by replacing at least one —$CH_2$—$CH_2$— in the alkyl by —CH=CH—, —CF=CF— or —C≡C—, at least one hydrogen may be replaced by halogen, provided that in $R^3$, —O— and —CH=CH— are not adjacent and —CO— and —CH=CH— are not adjacent; $Z^{31}$, $Z^{32}$ and $Z^{33}$ are independently a single bond, —COO— or —$CF_2O$—, but at least one thereof is —$CF_2O$—; $L^{31}$, $L^{32}$, $L^{33}$, $L^{34}$ and $L^{35}$ are independently hydrogen or fluorine; and $X^3$ is hydrogen, halogen, —$SF_5$ or alkyl having 1 to 10 carbons, at least one —$CH_2$— in the alkyl may be replaced by —O—, —S—, —COO— or —OCO—, at least one —$CH_2$—$CH_2$— in the alkyl may be replaced by —CH=CH—, —CF=CF— or —C≡C—, and in the alkyl, the group formed by replacing at least one —$CH_2$— in the alkyl by —O—, —S—, —COO— or —OCO—, or the group formed by replacing at least one —$CH_2$—$CH_2$— in the alkyl by —CH=CH—, —CF=CF— or —C≡C—, at least one hydrogen may be replaced by fluorine, provided that in $X^3$, —O— and —CH=CH— are not adjacent and —CO— and —CH=CH— are not adjacent.

Item 13. The liquid crystal composition according to item 12, wherein the third component of the achiral component T is at least one compound selected from the group of compounds represented by formulas (3-2) to (3-3):

(3-2)

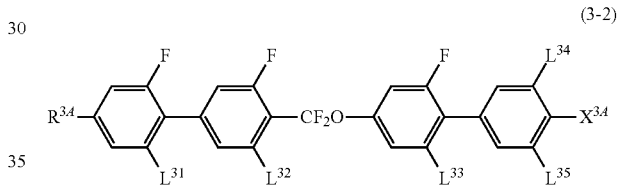

(3-3)

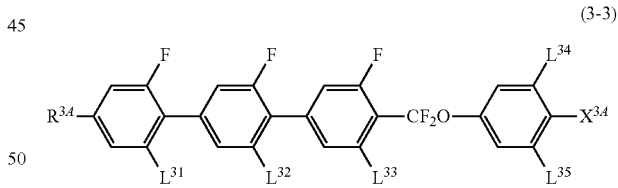

wherein $R^{3A}$ is independently alkyl having 1 to 12 carbons, alkoxy having 1 to 12 carbons, alkenyl having 2 to 12 carbons, or alkenyl having 2 to 12 carbons in which at least one hydrogen is replaced by fluorine, $X^{3A}$ is fluorine, chlorine, —$CF_3$ or —$OCF_3$, and $L^{31}$ to $L^{35}$ are independently hydrogen or fluorine.

Item 14. The liquid crystal composition according to item 12 or 13, wherein in formula (3) of item 12, $R^3$ has a straight chain, and in formulas (3-2) and (3-3) of item 13, $R^{3A}$ has a straight chain.

Item 15. The liquid crystal composition according to item 13 or 14, wherein the third component of the achiral component T is at least one compound selected from the group of compounds represented by formulas (3-2A) and (3-2C):

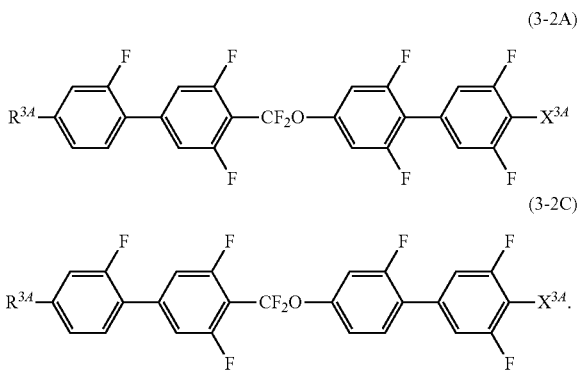

(3-2A)

(3-2C)

Item 16. The liquid crystal composition according to item 13 or 14, wherein the third component of the achiral component T is at least one compound selected from the group of compounds represented by formula (3-3A):

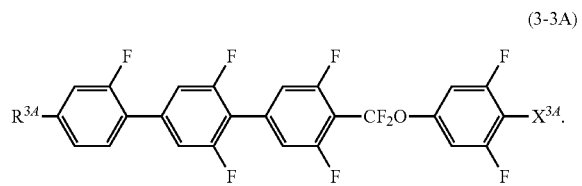

(3-3A)

Item 17. The liquid crystal composition according to any one of items 12 to 16, wherein the proportion of the third component of the achiral component T is in the range of 5 wt % to 70 wt % based on the total weight] of the achiral component T.

Item 18. The liquid crystal composition according to any one of items 12 to 17, wherein the proportion of the first component of the achiral component T is in the range of 30 wt % to 70 wt %, the proportion of the second component is in the range of 10 wt % to 50 wt %, and the proportion of the third component is in the range of 10 wt % to 50 wt %, based on the total weight of the achiral component T.

Item 19. The liquid crystal composition according to any one of items 1 to 18, further containing at least one compound selected from the group of compounds represented by formula (4) as a fourth component of the achiral component T:

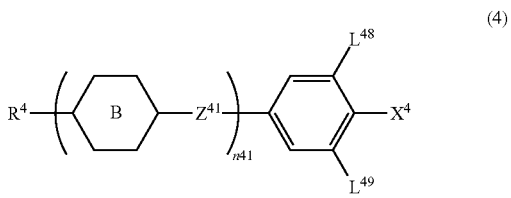

(4)

wherein $R^4$ is alkyl having 1 to 12 carbons, alkoxy having 1 to 12 carbons, alkenyl having 2 to 12 carbons, or alkenyl having 2 to 12 carbons in which at least one hydrogen is replaced by fluorine; each ring B is independently 1,4-cyclohexylene, 1,4-phenylene, 2-fluoro-1,4-phenylene, 3-fluoro-1,4-phenylene, 3,5-difluoro-1,4-phenylene, 3,5-dichloro-1,4-phenylene or pyrimidine-2,5-diyl; $Z^{41}$ is independently a single bond, ethylene, —COO—, —OCO—, —CF$_2$O— or —OCF$_2$—; $L^{48}$ and $L^{49}$ are independently hydrogen or fluorine; $X^4$ is fluorine, chlorine, —CF$_3$ or —OCF$_3$; n41 is 1, 2, 3 or 4, provided that when n41 is 3 or 4, one $Z^{41}$ is —CF$_2$O— or —OCF$_2$—, and when n41 is 3, a case where all of the rings B are 1,4-phenylene replaced by fluorine is excluded.

Item 20. The liquid crystal composition according to item 19, wherein the fourth component of the achiral component T is at least one compound selected from the group of compounds represented by formulas (4-1) to (4-9):

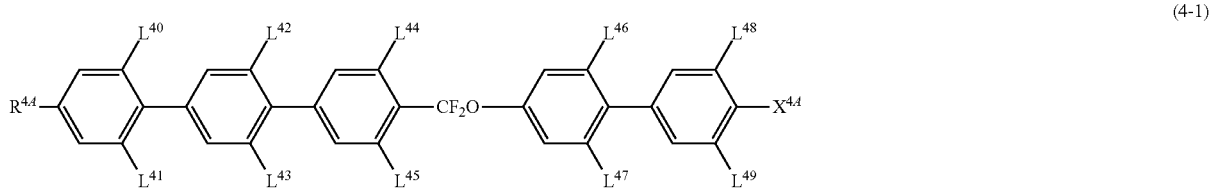

(4-1)

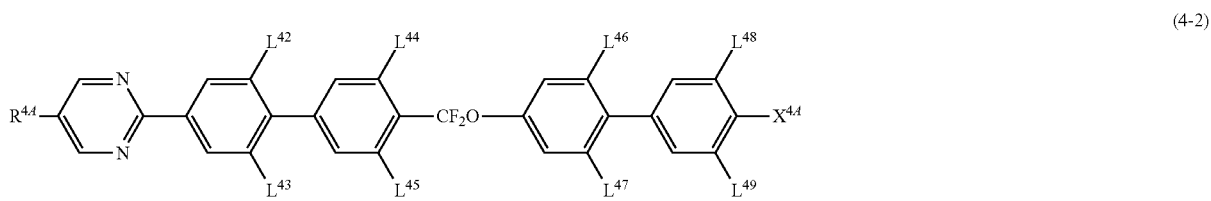

(4-2)

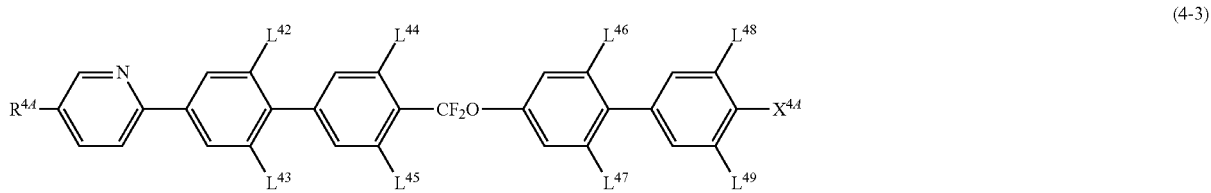

(4-3)

-continued

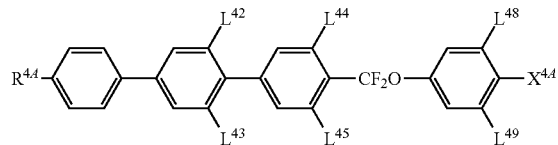
(4-4)

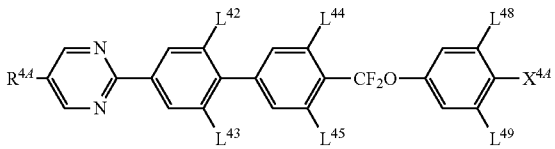
(4-5)

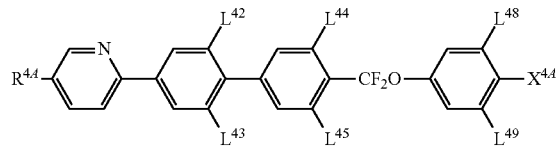
(4-6)

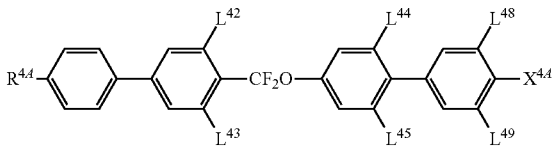
(4-7)

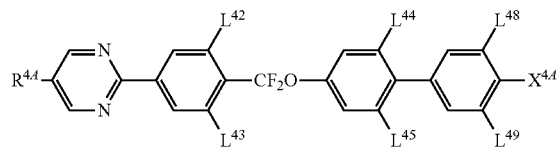
(4-8)

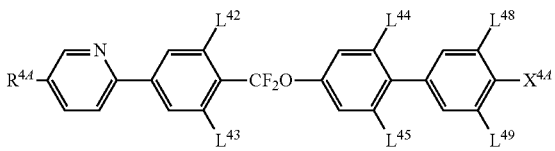
(4-9)

wherein, $R^{44}$ is independently alkyl having 1 to 12 carbons, alkoxy having 1 to 12 carbons, alkenyl having 2 to 12 carbons, or alkenyl having 2 to 12 carbons in which at least one hydrogen is replaced by fluorine, $X^{44}$ is fluorine, chlorine, —$CF_3$ or —$OCF_3$, and $L^{40}$ to $L^{49}$ are independently hydrogen or fluorine.

Item 21. The liquid crystal composition according to any one of items 1 to 20, further containing at least one compound selected from the group of compounds represented by formula (5) as a fifth component of the achiral component T:

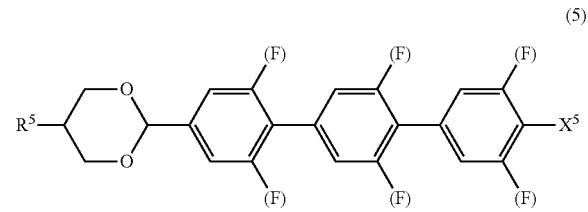
(5)

wherein $R^5$ is hydrogen or alkyl having 1 to 20 carbons, at least one of —$CH_2$— in the alkyl may be replaced by —O—, —S—, —COO— or —OCO—, at least one of —$CH_2$—$CH_2$— in the alkyl may be replaced by —CH=CH—, —CF=CF— or —C≡C—, and in the alkyl, the group formed by replacing at least one —$CH_2$— by —O—, —S—, —COO— or —OCO—, or the group formed by replacing at least one —$CH_2$—$CH_2$— in the alkyl by —CH=CH—, —CF=CF— or —C≡C—, at least one hydrogen may be replaced by halogen, provided that in $R^5$, —O— and —CH=CH— are not adjacent and —CO— and —CH=CH— are not adjacent; (F) is independently hydrogen or fluorine; $X^5$ is hydrogen, halogen, —$SF_5$ or alkyl having 1 to 10 carbons, at least one —$CH_2$— in the alkyl may be replaced by —O—, —S—, —COO— or —OCO—, at least one —$CH_2$—$CH_2$— in the alkyl may be replaced by —CH=CH—, —CF=CF— or —C≡C—, and in the alkyl, the group formed by replacing at least one —$CH_2$— in the alkyl by —O—, —S—, —COO— or —OCO—, or the group formed by replacing at least one —$CH_2$—$CH_2$— in the alkyl by —CH=CH—, —CF=CF— or —C≡C—, at least one hydrogen may be replaced by fluorine, provided that in $X^5$, —O— and —CH=CH— are not adjacent and —CO— and —CH=CH— are not adjacent.

Item 22. The liquid crystal composition according to item 21, wherein the fifth component of the achiral component T contains at least one compound selected from the group of compounds represented by formulas (5-1) to (5-3):

(5-1)

(5-2)

(5-3)

wherein, $R^{54}$ is alkyl having 1 to 12 carbons, alkoxy having 1 to 12 carbons, alkenyl having 2 to 12 carbons, or alkenyl having 2 to 12 carbons in which at least one hydrogen is replaced by fluorine; (F) is independently hydrogen or fluorine; and $X^{54}$ is fluorine, chlorine, —$CF_3$ or —$OCF_3$.

Item 23. The liquid crystal composition according to item 21 or 22, wherein the proportion of the fifth component of the achiral component T is in the range of 1 wt % to 20 wt % based on the total weight of the liquid crystal composition.

Item 24. The liquid crystal composition according to any one of items 1 to 23, further containing at least one compound selected from the group of compounds represented by formula (6) as a sixth component of the achiral component T:

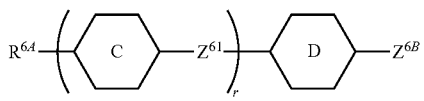
(6)

wherein $R^{6A}$ and $R^{6B}$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine; ring C and ring D are independently 1,4-cyclohexylene, 1,4-phenylene, 2-fluoro-1,4-phenylene, 3-fluoro-1,4-phenylene or 2,5-difluoro-1,4-phenylene; each $Z^{61}$ is independently a single bond, ethylene, —COO— or —OCO—; and r is 1, 2 or 3.

Item 25. The liquid crystal composition according to item 24, wherein the sixth component of the achiral component T contains at least one compound selected from the group of compounds represented by formulas (6-1) to (6-13):

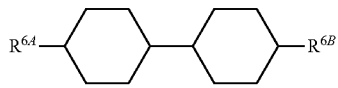
(6-1)

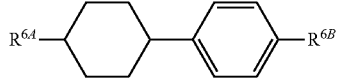
(6-2)

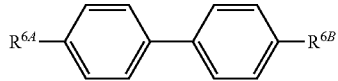
(6-3)

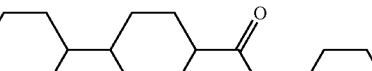
(6-4)

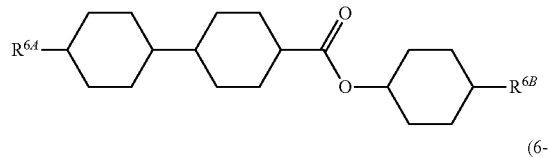
(6-5)

(6-6)

(6-7)

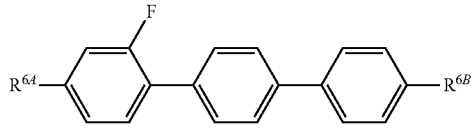
(6-8)

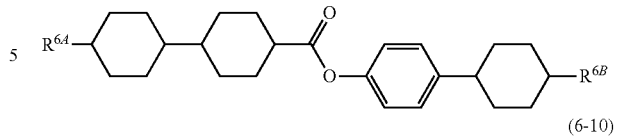
(6-9)

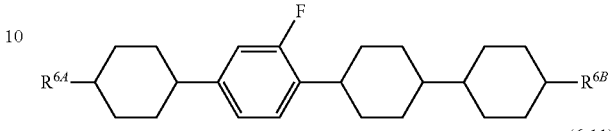
(6-10)

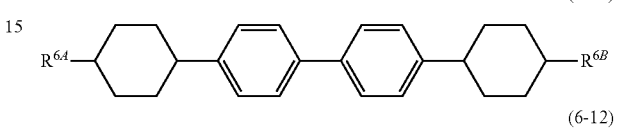
(6-11)

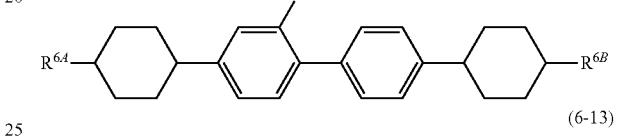
(6-12)

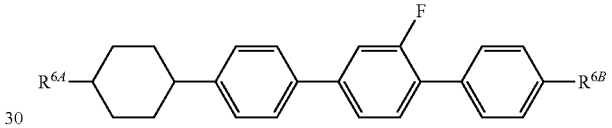
(6-13)

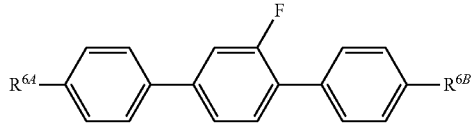

wherein $R^{6A}$ and $R^{6B}$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine.

Item 26. The liquid crystal composition according to any one of items 1 to 25, further containing at least one compound selected from the group of compounds represented by formula (7) as a seventh component of the achiral component T:

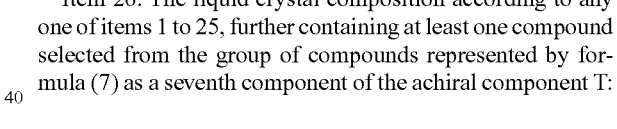
(7)

wherein $R^7$ is hydrogen or alkyl having 1 to 20 carbons, at least one of —CH$_2$— in the alkyl may be replaced by —O—, —S—, —COO— or —OCO—, at least one of —CH$_2$—CH$_2$— in the alkyl may be replaced by —CH═CH—, —CF═CF— or —C≡C—, and in the alkyl, the group formed by replacing at least one —CH$_2$— in the alkyl by —O—, —S—, —COO— or —OCO—, or the group formed by replacing at least one —CH$_2$—CH$_2$— in the alkyl by —CH═CH—, —CF═CF— or —C≡C—, at least one hydrogen may be replaced by halogen, provided that in $R^7$, —O— and —CH═CH— are not adjacent and —CO— and —CH═CH— are not adjacent; $L^{71}$, $L^{72}$, $L^{73}$, $L^{74}$, $L^{75}$ and $L^{76}$ are independently hydrogen or fluorine; $Z^{71}$ and $Z^{72}$ are each independently a single bond or —CF$_2$O—, but at least one thereof is —CF$_2$O—; and
$X^7$ is hydrogen, halogen, —SF$_5$ or alkyl having 1 to 10 carbons, and in the alkyl, at least one —CH$_2$— may be replaced by —O—, —S—, —COO— or —OCO—, at least one —CH$_2$—CH$_2$— in the alkyl may be replaced by —CH═CH—, —CF═CF— or —C≡C—, and in the alkyl, the group formed by replacing at least one —CH$_2$— in the alkyl by —O—, —S—, —COO— or —OCO—, or the group formed by replacing at least one —CH$_2$—CH$_2$— in the alkyl by —CH═CH—, —CF═CF— or —C≡C—, at least one hydrogen may be replaced by fluorine, provided that in X$^7$, —O— and —CH═CH— are not adjacent and —CO— and —CH═CH— are not adjacent.

Item 27. The liquid crystal composition according to item 26, wherein the seventh component of the achiral component T contains at least one compound selected from the group of compounds represented by formulas (7-1) to (7-3):

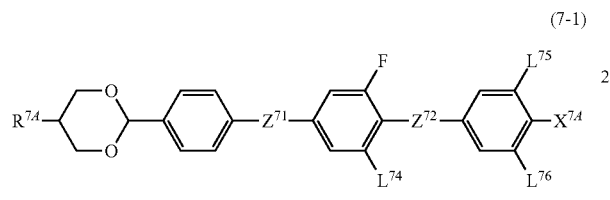
(7-1)

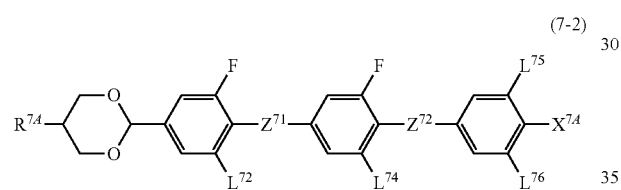
(7-2)

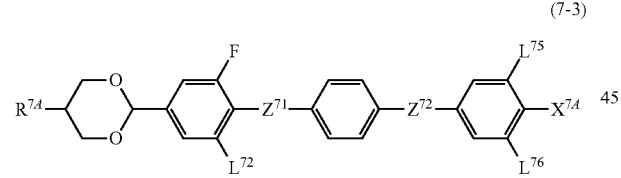
(7-3)

wherein R$^{7A}$ is alkyl having 1 to 12 carbons, alkoxy having 1 to 12 carbons, alkenyl having 2 to 12 carbons, or alkenyl having 2 to 12 carbons in which at least one hydrogen is replaced by fluorine; L$^{72}$, L$^{74}$, L$^{75}$ and L$^{76}$ are independently hydrogen or fluorine; Z$^{71}$ and Z$^{72}$ are each independently a single bond or —CF$_2$O—, but at least one thereof is —CF$_2$O—; and X$^{7A}$ is fluorine, chlorine, —CF$_3$ or —OCF$_3$.

Item 28. The liquid crystal composition according to item 27, wherein the proportion of the first component of the achiral component T is in the range of 5 wt % to 30 wt %, and the proportion of the seventh component of the achiral component T is in the range of 30 wt % to 70 wt %, based on the total weight of the achiral component T.

Item 29. The liquid crystal composition according to any one of items 1 to 28, wherein the chiral agent is at least one compound selected from the group of compounds represented by formulas (K1) to (K5):

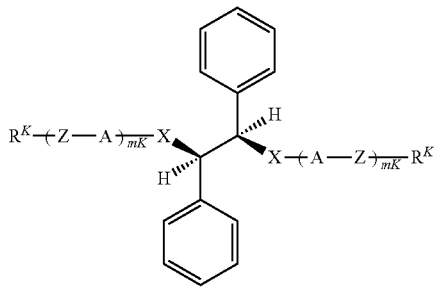
(K1)

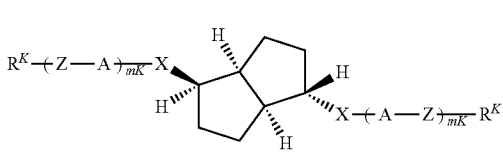
(K2)

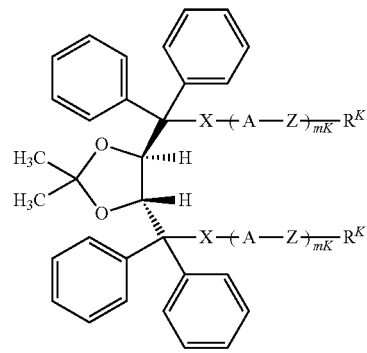
(K3)

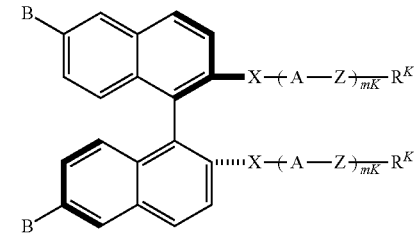
(K4)

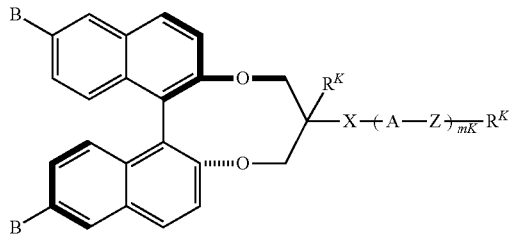
(K5)

wherein each R$^K$ is independently hydrogen, halogen, —C≡N, —N═C═O, —N═C═S, or alkyl having 1 to 20 carbons, at least one —CH$_2$— in the alkyl may be replaced by —O—, —S—, —COO— or —OCO—, at least one —CH$_2$—CH$_2$— in the alkyl may be replaced by —CH═CH—, —CF═CF— or —C≡C—, and at least one hydrogen in the alkyl may be replaced by halogen; each A is independently an aromatic six- to eight-membered ring, a non-aromatic three- to eight-membered ring, or a fused ring having 9 or more carbons, and in the rings, at least one hydrogen may be replaced by halogen, or alkyl or haloalkyl each having 1 to 3 carbons, —CH$_2$— may be replaced by —O—, —S— or —NH—, and —CH═ may be replaced by —N═; each B is independently hydrogen, halogen, alkyl having 1 to 3 carbons, haloalkyl having 1 to 3 carbons, an aromatic six- to eight-membered ring, a non-aromatic three- to eight-membered ring, or a fused ring having 9 or more carbons, and in the rings, at least one hydrogen may be replaced by halogen, or alkyl or haloalkyl each having 1 to 3 carbons, —$CH_2$— may be replaced by —O—, —S— or be replaced by halogen; X is a single bond, —COO—, —OCO—, —$CH_2O$—, —$OCH_2$—, —$CF_2O$—, —$OCF_2$— or —$CH_2CH_2$—; and mK is an integer from 1 to 4.

Item 30. The liquid crystal composition according to item 29, wherein the chiral agent is at least one compound selected from the group of compounds represented by formulas (K4-1) to (K4-6) and (K5-1) to (K5-3):

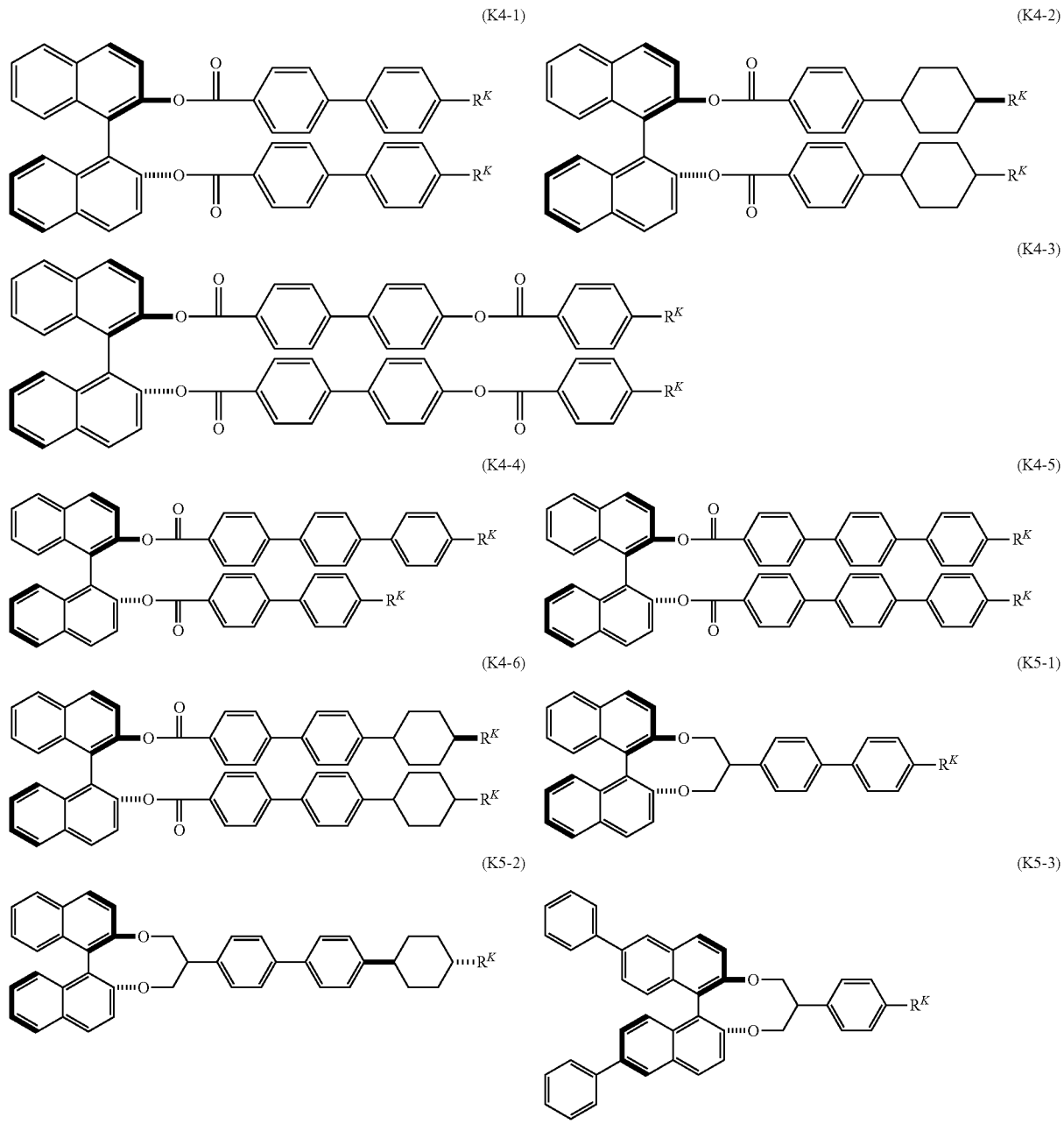

—NH—, and —CH═ may be replaced by —N═; each Z is independently a single bond or alkylene having 1 to 8 carbons, and in the alkylene, at least one —$CH_2$— may be replaced by —O—, —S—, —COO—, —OCO—, —CSO—, —OCS—, —N═N—, —CH═N— or —N═CH—, at least one —$CH_2$—$CH_2$— may be replaced by —CH═CH—, —CF═CF— or —C≡C—, and at least one hydrogen may wherein each $R^K$ is independently alkyl having 3 to 10 carbons or alkoxy having 3 to 10 carbons, and at least one of —$CH_2$— in the alkyl or the alkoxy may be replaced by —CH═CH—, provided that —O— and —C≡C— are not adjacent.

Item 31. The liquid crystal composition according to any one of items 1 to 30, exhibiting a chiral nematic phase at any temperature in the range of 70 to −20° C., wherein a helical pitch is 700 nanometers or less at least in a part of the temperature range.

Item 32. The liquid crystal composition according to any one of items 1 to 31, containing at least one antioxidant and/or at least one ultraviolet light absorbent.

Item 33. A mixture containing the liquid crystal composition according to any one of items 1 to 32, and a polymerizable monomer.

Item 34. A polymer/liquid crystal composite material, obtained by polymerizing the mixture according to item 33, and used for a device to be driven in an optically isotropic liquid crystal phase.

Item 35. The polymer/liquid crystal composite material according to item 34, obtained by polymerizing the mixture according to item 33 in a non-liquid crystal isotropic phase or the optically isotropic liquid crystal phase.

Item 36. An optical device having two substrates with electrodes disposed on a surface of one or both of the substrates, a liquid crystal medium disposed between the substrates, and an electric field applying means for applying an electric field to the liquid crystal medium through the electrodes, wherein the liquid crystal medium is the liquid crystal composition according to any one of items 1 to 32 or the polymer/liquid crystal composite material according to item 34 or 35.

Item 37. An optical device having a set of substrates, at least one of which is transparent, with electrodes disposed on a surface of one or both thereof, a liquid crystal medium disposed between the substrates, a polarizing plate disposed outside the substrate, and an electric field applying means for applying an electric field to the liquid crystal medium through the electrodes, wherein the liquid crystal medium is the liquid crystal composition according to any one of items 1 to 32 or the polymer/liquid crystal composite material according to item 34 or 35.

Item 38. The optical device according to item 36 or 37, wherein the electrodes are constituted so as to allow application of the electric field in at least two directions, on at least one substrate of the set of substrates.

Item 39. The optical device according to item 36 or 37, wherein the electrodes are constituted so as to allow application of the electric field in at least two directions, on one or both of the set of substrates arranged in parallel to each other.

Item 40. The optical device according item 36 or 37, wherein the electrodes are arranged in a matrix to constitute pixel electrodes, each pixel has an active device, and the active device is a thin film transistor (TFT).

Item 41. Use of the liquid crystal composition according to any one of items 1 to 32 for an optical device.

In the invention, the liquid crystal compound represents a compound having a mesogen, and is not limited to a compound having a liquid crystal phase. The liquid crystal medium is a generic term for the liquid crystal composition and the polymer/liquid crystal composite. Moreover, the optical device means various kinds of devices that perform a function of optical modulation, optical switching or the like by utilizing an electro-optic effect. Specific examples include an optical modulator used for a display device (liquid crystal display device), an optical communication system, optical information processing and various kinds of sensor systems. With regard to optical modulation that utilizes a change of a refractive index by applying voltage to an optically isotropic liquid crystal medium, the Kerr effect is known. The Kerr effect means a phenomenon in which the value of the electric birefringence $\Delta n(E)$ is proportional to the square of the electric field E, and the equation of $\Delta n(E) = K\lambda E^2$ is satisfied for a material showing the Kerr effect (K: Kerr coefficient (Kerr constant), $\lambda$: wavelength). Here, the value of the electric birefringence means a value of refractive index anisotropy induced when the electric field is applied to an isotropic medium.

The usage of terms herein is as described below. The liquid crystal compound is a generic term for a compound having a liquid crystal phase such as a nematic phase and a smectic phase, and a compound having no liquid crystal phase but being useful as a component of the liquid crystal composition. The chiral agent is an optically active compound, and is added for the purpose of providing the liquid crystal composition with a desired twisted alignment of molecules. The liquid crystal display device is a generic term for a liquid crystal display panel and a liquid crystal display module. The liquid crystal compound, the liquid crystal composition and the liquid crystal display device may be occasionally abbreviated as "compound," "composition" and "device," respectively. Moreover, the maximum temperature of the liquid crystal phase is the phase transition temperature between the liquid crystal phase and an isotropic phase, and may be occasionally abbreviated simply as "clearing point" or "maximum temperature." The minimum temperature range of the liquid crystal phase may be occasionally abbreviated as "minimum temperature." A compound represented by formula (1) may be occasionally abbreviated as "compound (1)." The abbreviation rule may occasionally apply to a compound represented by formula (2) or the like. In formulas (2) to (5), a symbol such as $A^1$, B or C surrounded by a hexagonal shape corresponds to ring $A^1$, ring B or ring C, respectively. The amount of compound expressed in terms of percentage is expressed in terms of weight percentage (wt %) based on the total weight of the composition. A plurality of identical symbols such as ring $A^1$, $Y^1$ and B are described in identical formulas or different formulas, but they may represent identical or different groups.

"At least one" means that not only the position but also the number can be freely selected, but the case where the number is 0 (zero) is excluded. The expression "at least one A may be replaced by B, C or D" (occasionally expressed as "arbitrary A may be replaced by B, C or D") includes the case where at least one A is replaced by B, the case where at least one A is replaced by C, the case where at least one A is replaced by D, and also the cases where a plurality of A are replaced by at least two of B to D. For example, "alkyl in which at least one —CH$_2$— may be replaced by —O— and at least one —CH$_2$—CH$_2$— may be replaced by —CH=CH—" includes alkyl, alkenyl, alkoxy, alkoxyalkyl, alkoxyalkenyl and alkenyloxyalkyl. In the invention, the cases where two successive —CH$_2$— are replaced by —O— to form —O—O— are not preferred. The cases where terminal —CH$_2$— of alkyl is replaced by —O— is not preferred, either. The invention will be further explained below. With regard to the terminal groups, the rings, the linking groups and so on in the compound represented by formula (1), preferred examples are also described.

Advantageous Effects of Invention

Because a large amount of compound represented by formula (1) is contained, the liquid crystal composition of the invention shows stability to heat, light and so forth, and a high maximum temperature and a low minimum temperature of an optically isotropic liquid crystal phase, and has a low driving voltage and a large contrast ratio in a device to be driven in the optically isotropic liquid crystal phase. A polymer/liquid crystal composite material having the optically isotropic liquid crystal phase according to the invention shows a high maximum temperature or a low minimum temperature of the optically isotropic liquid crystal phase, and has a low driving voltage in the device to be driven in the optically isotropic liquid crystal phase.

The optical device to be driven in the optically isotropic liquid crystal phase according to the invention has a wide temperature range in which the optical device can be used, a short response time, a large contrast ratio and a low driving voltage.

DESCRIPTION OF EMBODIMENTS 1-1. Compound (1)

Figure 1:
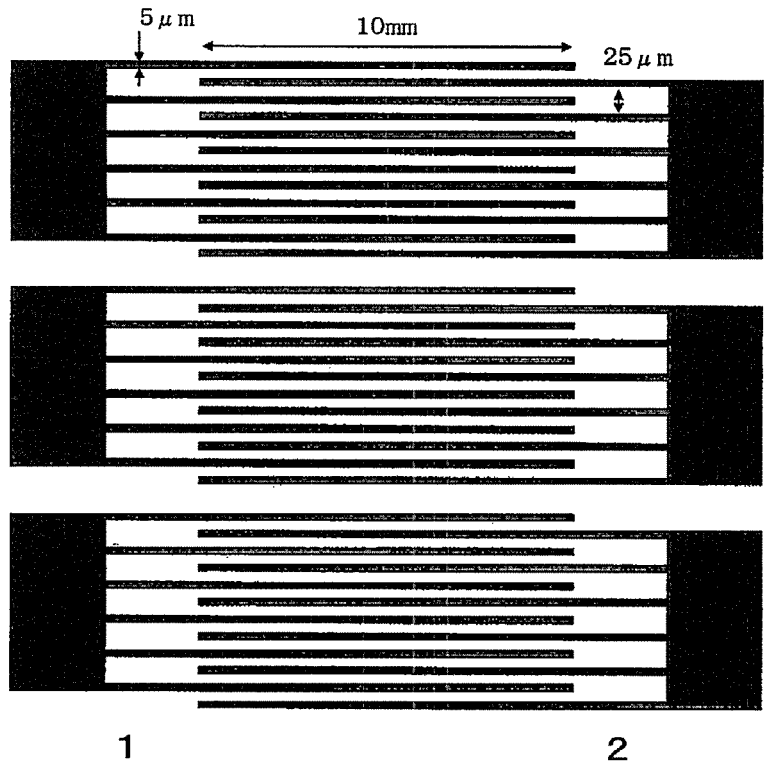
FIG. 1 shows a comb-shaped electrode substrate used in Examples.

A liquid crystal composition having an optically isotropic liquid crystal phase according to the invention contains an achiral component T and a chiral agent, and the achiral component T contains a compound represented by formula (1) as a first component.

A first embodiment of the liquid crystal composition according to the invention is a composition containing the first component and any other component whose component name is not particularly shown herein. First of all, the compound represented by formula (1) will be explained.

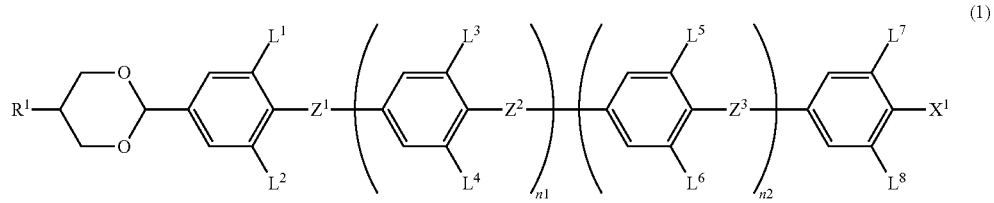

(1)

In formula (1), $R^1$ is hydrogen or alkyl having 1 to 20 carbons, at least one —$CH_2$— in the alkyl may be replaced by —O—, —S—, —COO— or —OCO—, at least one of —$CH_2$—$CH_2$— in the alkyl may be replaced by —CH=CH—, —CF=CF— or —C≡C—, and in the alkyl, the group formed by replacing at least one —$CH_2$— in the alkyl is replaced by —O—, —S—, —COO— or —OCO—, or the group formed by replacing at least one —$CH_2$—$CH_2$— in the alkyl by —CH=CH—, —CF=CF— or —C≡C—, at least one hydrogen may be replaced by halogen, provided that in $R^1$, —O— and —CH=CH— are not adjacent and —CO— and —CH=CH— are not adjacent; $L^1, L^2, L^3, L^4, L^5, L^6, L^7$ and $L^8$ are independently hydrogen or fluorine; $Z^1, Z^2$ and $Z^3$ are each independently a single bond, —COO— or —$CF_2O$—, but at least one thereof is —COO—; n1 and n2 are each independently 0 or 1; and $X^1$ is hydrogen, halogen, —$SF_5$ or alkyl having 1 to 10 carbons, at least one —$CH_2$— in the alkyl may be replaced by —O—, —S—, —COO— or —OCO—, at least one —$CH_2$—$CH_2$— in the alkyl may be replaced by —CH=CH—, —CF=CF— or —C≡C—, and in the alkyl, the group formed by replacing at least one —$CH_2$— in the alkyl by —O—, —S—, —COO— or —OCO—, or the group formed by replacing at least one —$CH_2$—$CH_2$— in the alkyl by —CH=CH—, —CF=CF— or —C≡C—, at least one hydrogen may be replaced by fluorine, provided that in $X^1$, —O— and —CH=CH— are not adjacent and —CO— and —CH=CH— are not adjacent.

The preferred configuration of —CH=CH— in alkenyl depends on the position of the double bond. The trans configuration is preferred in alkenyl having a double bond at an odd-numbered position, such as —CH=$CHCH_3$, —CH=$CHC_2H_5$, —CH=$CHC_3H_7$, —CH=$CHC_4H_9$, —$C_2H_4$CH=$CHCH_3$ and —$C_2H_4$CH=$CHC_2H_5$. The cis configuration is preferred in alkenyl having a double bond in an even-numbered position, such as —$CH_2$CH=$CHCH_3$, —$CH_2$CH=$CHC_2H_5$ and —$CH_2$CH=$CHC_3H_7$. An alkenyl compound having the preferred configuration has a high maximum temperature or a wide temperature range of a liquid crystal phase. A detailed description is found in Mol. Cryst. Liq. Cryst., 1985, 131, 109 and Mol. Cryst. Liq. Cryst., 1985, 131, 327.

Specific examples of alkyl include —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$, —$C_{10}H_{21}$, —$C_{11}H_{23}$, —$C_{12}H_{25}$, —$C_{13}H_{27}$, —$C_{14}H_{29}$ and —$C_{15}H_{31}$.

Specific examples of alkoxy include —$OCH_3$, —$OC_2H_5$, —$OC_3H_7$, —$OC_4H_9$, —$OC_5H_{11}$, —$OC_6H_{13}$, —$OC_7H_{15}$, —$OC_8H_{17}$, —$OC_9H_{19}$, —$OC_{10}H_{21}$, —$OC_{11}H_{23}$, —$OC_{12}H_{25}$, —$OC_{13}H_{27}$ and —$OC_{14}H_{29}$.

Specific examples of alkoxyalkyl include —$CH_2OCH_3$, —$CH_2OC_2H_5$, —$CH_2OC_3H_7$, —$(CH_2)_2$—$OCH_3$, —$(CH_2)_2$—$OC_2H_5$, —$(CH_2)_2$—$OC_3H_7$, —$(CH_2)_3$—$OCH_3$, —$(CH_2)_4$—$OCH_3$ and —$(CH_2)_5$—$OCH_3$.

Specific examples of alkenyl include —CH=$CH_2$, —CH=$CHCH_3$, —$CH_2$CH=$CH_2$, —CH=$CHC_2H_5$, —$CH_2$CH=$CHCH_3$, —$(CH_2)_2$—CH=$CH_2$, —CH=$CHC_3H_7$, —$CH_2$CH=$CHC_2H_5$, —$(CH_2)_2$—CH=$CHCH_3$ and —$(CH_2)_3$—CH=$CH_2$.

Specific examples of alkenyloxy include —$OCH_2$CH=$CH_2$, —$OCH_2$CH=$CHCH_3$ and —$OCH_2$CH=$CHC_2H_5$.

Specific examples of alkynyl include —C≡CH, —C≡$CCH_3$, —$CH_2$C≡CH, —C≡$CC_2H_5$, —$CH_2$C≡$CCH_3$, —$(CH_2)_2$—C≡CH, —C≡$CC_3H_7$, —$CH_2$C≡$CC_2H_5$, —$(CH_2)_2$—C≡$CCH_3$ and —C≡C$(CH_2)_5$.

Specific examples of alkyl in which at least one hydrogen is replaced by fluorine or chlorine include —$CHF_2$, —$CF_3$, —CF$_2$CH$_2$F, —CF$_2$CHF$_2$, —CH$_2$CF$_3$, —CF$_2$CF$_3$, —(CH$_2$)$_3$—F, —(CF$_2$)$_3$—F, —CF$_2$CHFCF$_3$ and —CHFCF$_2$CF$_3$.

Specific examples of alkoxy in which at least one hydrogen is replaced by fluorine or chlorine include —OCHF$_2$, —OCF$_3$, —OCF$_2$CH$_2$F, —OCF$_2$CHF$_2$, —OCH$_2$CF$_3$, —O—(CF$_2$)$_3$—F, —OCF$_2$CHFCF$_3$ and —OCHFCF$_2$CF$_3$.

Specific examples of alkenyl in which at least one hydrogen is replaced by fluorine or chlorine include —CH=CF$_2$, —CF=CHF, —CH=CHCH$_2$F, —CH=CHCF$_3$, —(CH$_2$)$_2$—CH=CF$_2$, —CH$_2$CH=CHCF$_3$ and —CH=CHCF$_2$CF$_3$.

Specific examples of preferred include fluorine, chlorine, —CF$_3$, —CHF$_2$, —OCF$_3$ and —OCHF$_2$. Specific examples of further preferred X$^1$ include fluorine, chlorine, —CF$_3$ and —OCF$_3$. When is chlorine or fluorine, the melting point is low, and the compatibility with other liquid crystal compounds is particularly excellent. When is —CF$_3$, —CHF$_2$, —OCF$_3$ and —OCHF$_2$, a particularly large dielectric anisotropy is shown.

With respect to formula (1), preferred compounds are represented by formulas (1-1) to (1-8)

(1-1)
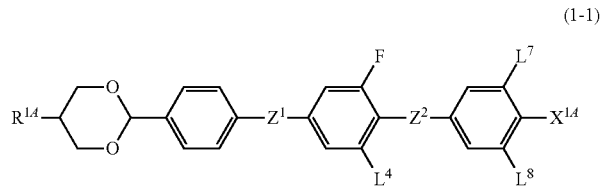

(1-2)
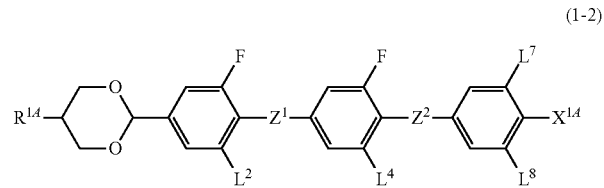

(1-3)
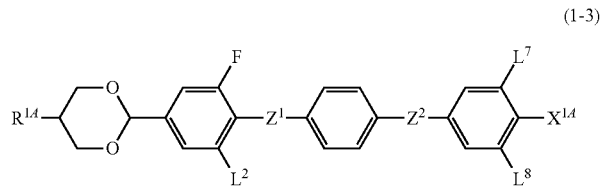

(1-4)
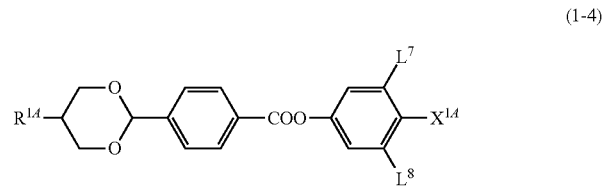

(1-5)
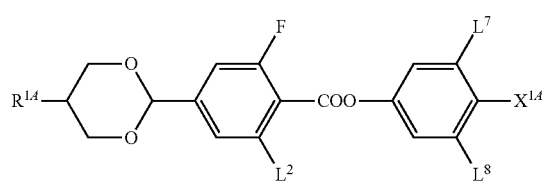

(1-6)
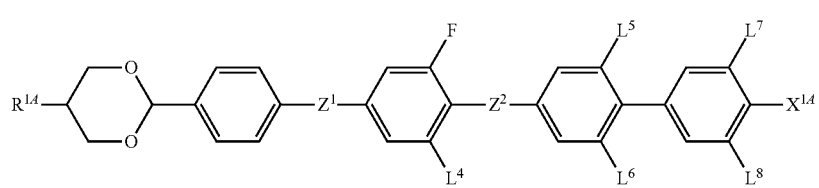

(1-7)
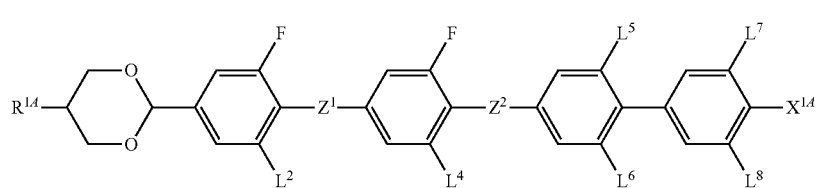

(1-8)
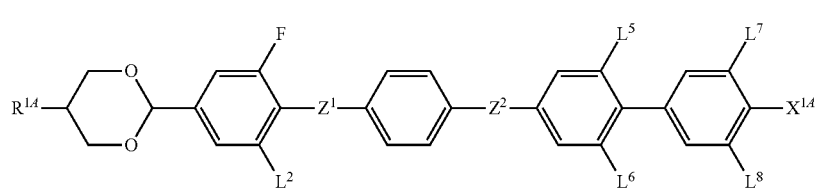

In formulas (1-1) to (1-8), $R^{1A}$ is alkyl having 1 to 12 carbons, alkoxy having 1 to 12 carbons, alkenyl having 2 to 12 carbons, or alkenyl having 2 to 12 carbons in which at least one hydrogen is replaced by fluorine; $L^2, L^4, L^5, L^6, L^7$ and $L^8$ are independently hydrogen or fluorine; $Z^1, Z^2$ and $Z^3$ are each independently a single bond, —COO— or —CF$_2$O—, but at least one thereof is —COO—; and $X^{1A}$ is fluorine, chlorine, —CF$_3$ or —OCF$_3$.

Among the compounds represented by formulas (1-1) to (1-8), further preferred compounds are represented by formulas (1-1-1), (1-1-2), (1-2-1) to (1-2-6), (1-3-1), (1-3-2), (1-4-1), (1-4-2), (1-5-1) and (1-5-2). Among the compounds, furthermore preferred compounds are represented by formulas (1-2-1) to (1-2-6).

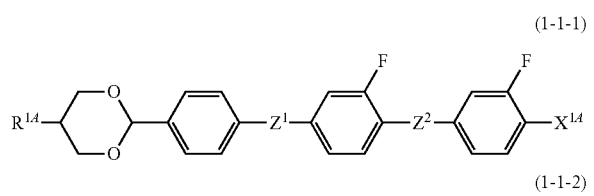

(1-1-1)

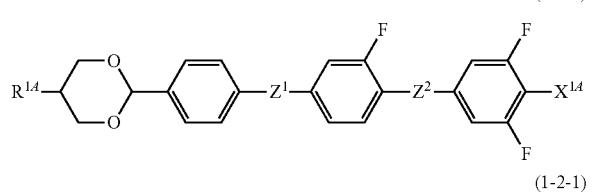

(1-1-2)

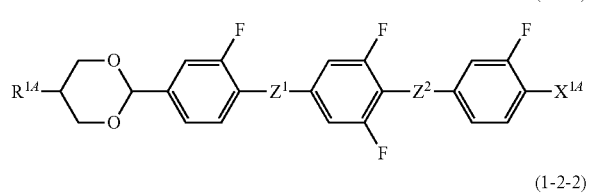

(1-2-1)

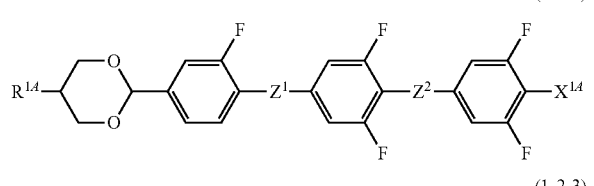

(1-2-2)

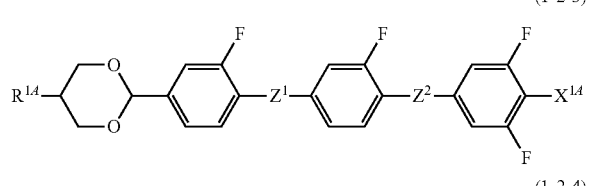

(1-2-3)

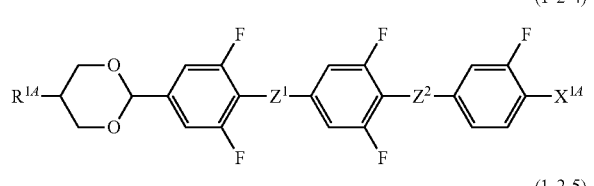

(1-2-4)

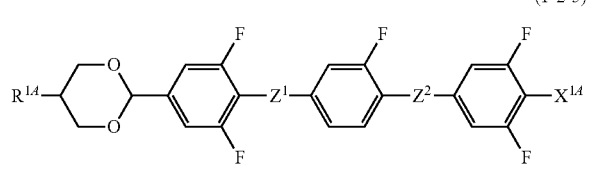

(1-2-5)

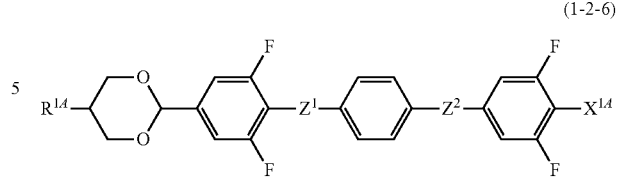

(1-2-6)

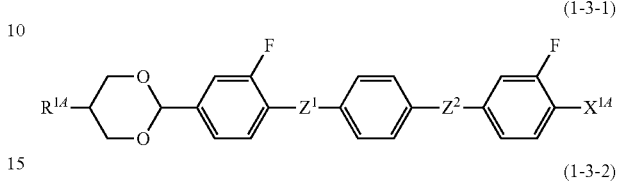

(1-3-1)

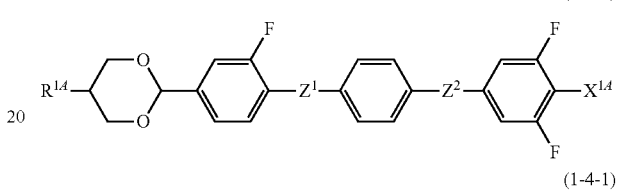

(1-3-2)

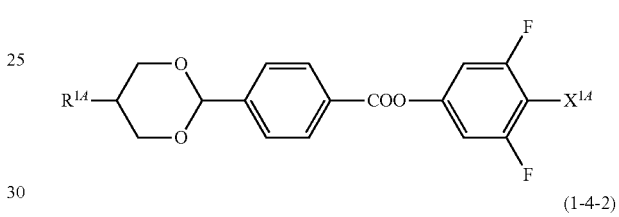

(1-4-1)

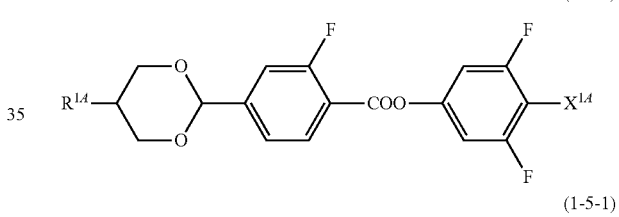

(1-4-2)

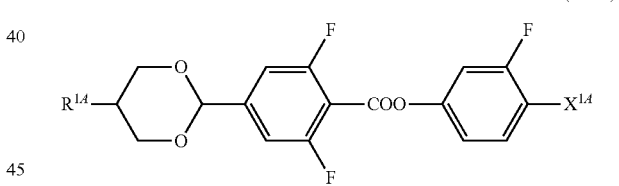

(1-5-1)

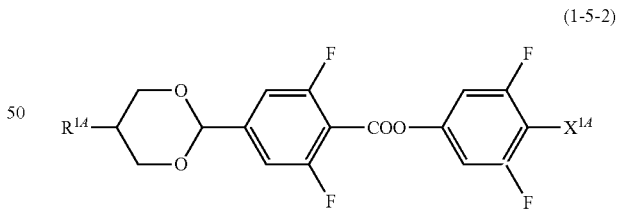

(1-5-2)

wherein the definitions of $R^{1A}, Z^1, Z_2$ and $X^{1A}$ are identical with the definitions described above.

In the formulas, still furthermore preferred compounds are represented by formulas (1-2-2-1), (1-2-5-1) and (1-2-6-1). All of the compounds allow achievement of a high clearing point of the composition according to the invention, while the compounds represented by formulas (1-2-2-1) and (1-2-5-1) are effective in decreasing the driving voltage, and the compounds represented by formula (1-2-6-1) are further effective in increasing the clearing point and, on the other hand, are relatively fast with regard to the response time.

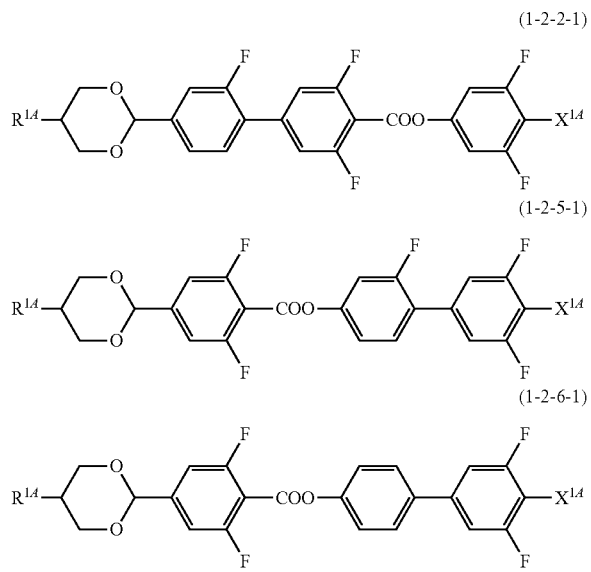

wherein, $R^{1A}$ is alkyl having 1 to 12 carbons, alkoxy having 1 to 12 carbons, alkenyl having 2 to 12 carbons, or alkenyl having 2 to 12 carbons in which at least one hydrogen is replaced by fluorine; and $X^{1A}$ is fluorine, chlorine or —CF3.

1-2. Properties of Compound (1)

Compound (1) used in the invention will be explained in more detail. Compound (1) is a liquid crystal compound having a dioxane ring and at least one —COO— linking group. The compound is significantly physically and chemically stable under conditions in which the device is ordinarily used, and has a relatively good compatibility with other liquid crystal compounds even though the clearing point is high. A composition containing the compound is stable under the conditions in which the device is ordinarily used. Accordingly, the temperature range of the optically isotropic liquid crystal phase can be extended in the composition, and the composition can be used in the form of a display device in a wide temperature range. Furthermore, the compound is useful as a component for decreasing the driving voltage of the composition to be driven in the optically isotropic liquid crystal phase. More specifically, the compound represented by formula (1) has excellent features of increasing the clearing point and decreasing the driving voltage. Moreover, the compound exhibits a very large dielectric anisotropy.

When the right-terminal group $X^1$ is fluorine, chlorine, —SF5, —CF3, —OCF3 or —CH=CH—CF3, compound (1) has a large dielectric anisotropy. When $X^1$ is fluorine, —CF3 or —OCF3, compound (1) is chemically stable.

1-4. Synthesis of Compound (1)

Next, the synthesis of compound (1) will be explained. Compound (1) can be prepared by suitably combining techniques in synthetic organic chemistry. Methods for introducing objective terminal group, ring and linking group into a starting material are described in Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Koza in Japanese) (Maruzen Co., Ltd.), or the like.

For example, the compound represented by formula (1) according to the invention can be prepared even by correspondingly applying the method described in JP 2959526B.

The compound represented by formula (1) has a large dielectric anisotropy and a large refractive index anisotropy. Therefore, the content thereof may be 10 to 85 wt %, and is preferably 30 to 80 wt %, further preferably 40 to 80 wt %, based on the total weight of the component T. If the content is adjusted in the range, the compatibility at a low temperature becomes satisfactory. The content of a compound in which at least one of $Z^1$, $Z^2$ and $Z^3$ is —COO— in formula (1) may be 1 to 85 wt %, and is preferably 3 to 60 wt %, further preferably 5 to 50 wt % and particularly preferably 5 to 40 wt % based on the total weight of the component T.

Compound (1) used for the invention may be applied in one kind or two or more kinds thereof.

2-1. Compound (2)

A second embodiment of the liquid crystal composition according to the invention is a composition containing a second component of the achiral component T including at least one compound selected from the group of compounds represented by formula (2), and the first component.

The compound represented by formula (2) will be explained.

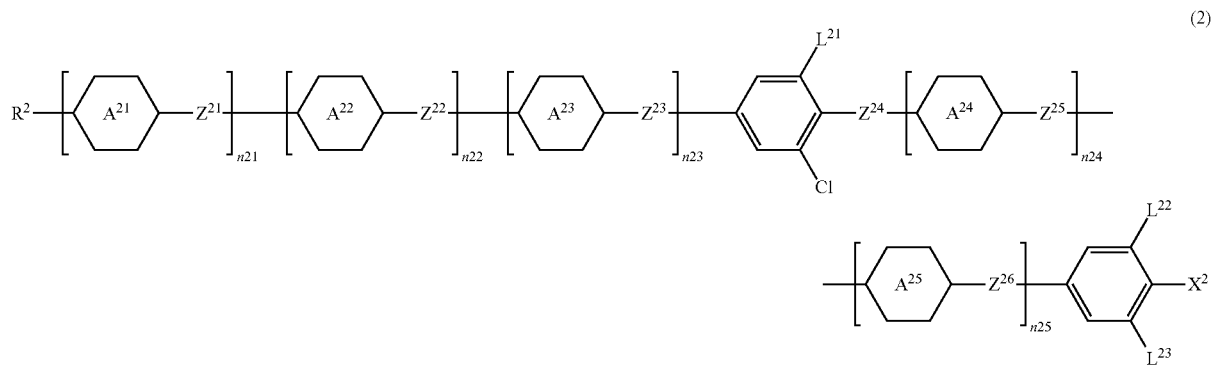

In formula (2), $R^2$ is hydrogen or alkyl having 1 to 20 carbons, at least one —CH2— in the alkyl may be replaced by —O—, —S—, —COO— or —OCO—, at least one —CH2—CH2— in the alkyl may be replaced by —CH=CH—, —CF=CF— or —C≡C—, and in the alkyl, the group formed by replacing at least one —CH2— in the alkyl by —O—, —S—, —COO— or —OCO—, or the group formed by replacing at least one —CH2—CH2— in the alkyl by —CH=CH—, —CF=CF— or —C≡C—, at least one hydrogen may be replaced by fluorine, provided that —O— and —CH=CH— are not adjacent and —CO— and —CH=CH— are not adjacent; ring $A^{21}$, ring $A^{22}$, ring $A^{23}$, ring $A^{24}$ and ring $A^{25}$ are independently 1,4-cyclohexylene, 1,3-dioxane-2,5-diyl, 1,4-phenylene, 1,4-phenylene in which one or two hydrogens are replaced by fluorine, 1,4-phenylene in which two hydrogens are replaced by fluorine and chlorine, respectively, pyridine-2,5-diyl or pyrimidine-2,5-diyl; $Z^{21}$, $Z^{22}$, $Z^{23}$, $Z^{24}$, $Z^{25}$ and $Z^{26}$ are independently a single bond or alkylene having 1 to 4 carbons, and at least one —$CH_2$— in the alkylene may be replaced by —O—, —COO— or or —$CF_2O$—; $L^{21}$, and $L^{23}$ are independently hydrogen or fluorine; $X^2$ is fluorine, chlorine, —$CF_3$ or —$OCF_3$; and n21, n22, n23, n24 and n25 are independently 0 or 1, and satisfy the inequality of 2≤n21+n22+n23+n24+n25≤3.

$R^2$ is preferably alkyl having 1 to 12 carbons, alkoxy having 1 to 12 carbons, alkenyl having 2 to 12 carbons, or alkenyl having 2 to 12 carbons in which at least one hydrogen is replaced by fluorine.

When the stability and the dielectric anisotropy of the compound are taken into consideration, ring $A^{21}$, ring $A^{22}$, ring $A^{23}$, ring $A^{24}$ and ring $A^{25}$ are preferably 1,4-phenylene, or 1,4-phenylene in which one or two hydrogens are replaced by fluorine.

$Z^{21}$, $Z^{22}$, $Z^{23}$, $Z^{24}$, $Z^{25}$ and $Z^{26}$ are independently a single bond or alkylene having 1 to 4 carbons, wherein at least one —$CH_2$— in the alkylene may be replaced by —O—, —COO— or —$CF_2O$—. It is preferred that all of $Z^{21}$, $Z_{22}$, $Z_{23}$, $Z_{24}$, $Z_{25}$ and $Z_{26}$ are single bonds or at least one of $Z^{21}$, $Z^{22}$, $Z^{23}$, $Z^{24}$, $Z^{25}$ and $Z^{26}$ is —COO— or —$CF_2O$—. When the compatibility with other liquid crystal compounds is considered important, at least one of $Z^{21}$, $Z^{22}$, $Z^{23}$, $Z^{24}$, $Z_{25}$ and $Z^{26}$ is preferably —$CF_2O$—. Particularly preferably, n24 is 1, and $Z^{25}$ is —$CF_2O$—.

$X^2$ is fluorine, chlorine, —$CF_3$, —$CHF_2$, —$CH_2F$, —$OCF_3$, —$OCHF_2$, —$OCH_2F$, —$OCF_2CFHCF_3$ or —CH=$CHCF_3$. $X^2$ is further preferably fluorine, chlorine, —$CF_3$ or —$OCF_3$.

In the compound represented by formula (2), a further preferred compound is represented by formula (2-1).

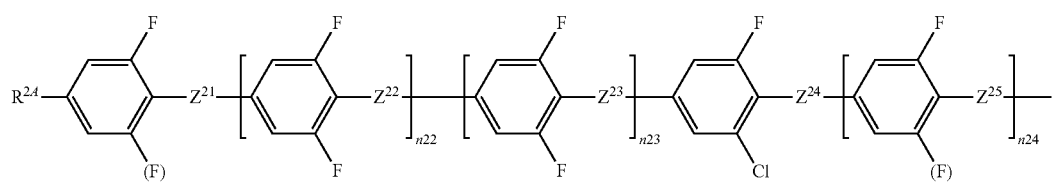

(2-1)

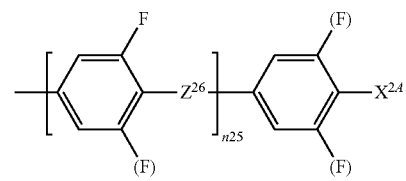

In formula (2-1), $R^{24}$ in formula (2) is alkyl having 1 to 12 carbons, alkoxy having 1 to 12 carbons, alkenyl having 2 to 12 carbons, or alkenyl having 2 to 12 carbons in which at least one hydrogen is replaced by fluorine, $Z^{21}$ to $Z^{26}$ are defined in a manner identical with the definitions for formula (2), $X^{24}$ is fluorine, chlorine, —$CF_3$ or —$OCF_3$, n22, n23, n24 and n25 in formula (2-1) are independently 0 or 1, with a sum (n22+n23+n24+n25) being an integer from 1 to 2, and (F) independently represents hydrogen or fluorine.

$Z^{21}$, $Z^{22}$, $Z^{23}$, $Z^{24}$, $Z^{25}$ and $Z^{26}$ are independently a single bond or —$CF_2O$—, and when the compatibility with other liquid crystal compounds is considered important, it is preferred that at least one of $Z^{21}$, $Z^{22}$, $Z^{23}$, $Z^{24}$, $Z^{25}$ and $Z^{26}$ is —$CF_2O$—. Particularly preferably, n24 is 1, and $Z^{25}$ is —$CF_2O$—.

Preferred structures for formula (2-1) are represented by formulas (2-1-1) to (2-1-5).

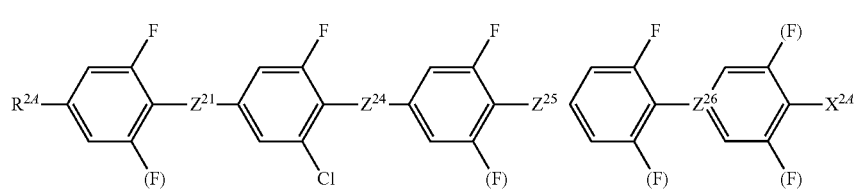

(2-1-1)

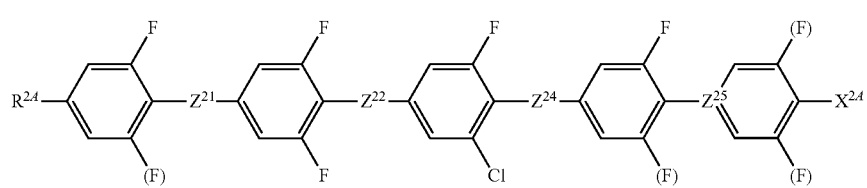
(2-1-2)
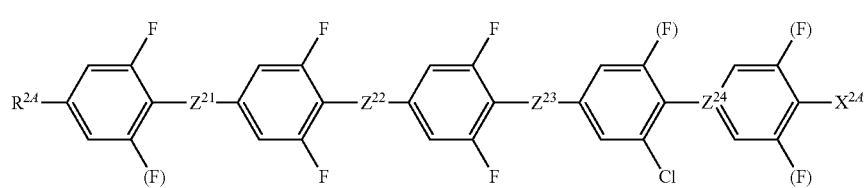
(2-1-3)
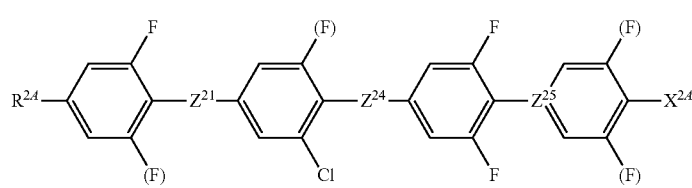
(2-1-4)
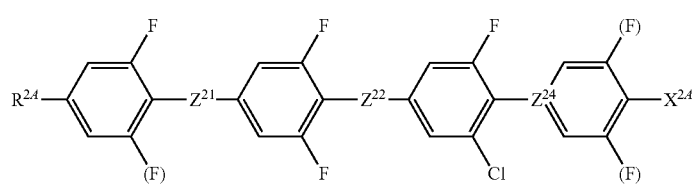
(2-1-5)
In the formulas, $R^{2A}$, $Z^{21}$ to $Z^{26}$, $X^{2A}$ and (F) are defined as above.
Among the compounds represented by formulas (2-1-1) to (2-1-5), further preferred compounds are represented by formulas (2-1-1-1) to (2-1-1-3), (2-1-2-1) to (2-1-2-3), (2-1-3-1) to (2-1-3-3), (2-1-4-1) to (2-1-4-3), (2-1-5-1) to (2-1-5-3). Among the compounds, still further preferred compounds are represented by formulas (2-1-1-1) and (2-1-1-2), formulas (2-1-2-1) and (2-1-2-2), formulas (2-1-3-1), (2-1-3-2), (2-1-4-2), (2-1-4-3) and (2-1-5-3).
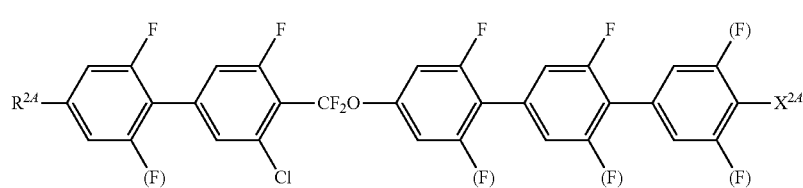
(2-1-1-1)
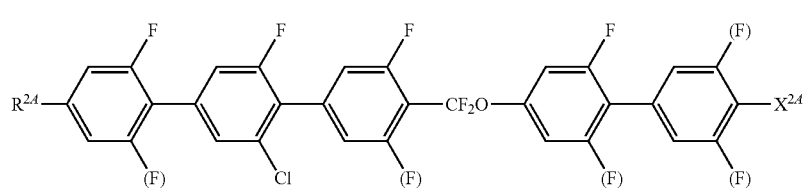
(2-1-1-2)
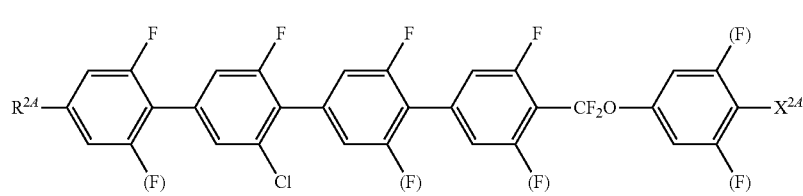
(2-1-1-3)

-continued
(2-1-2-1)
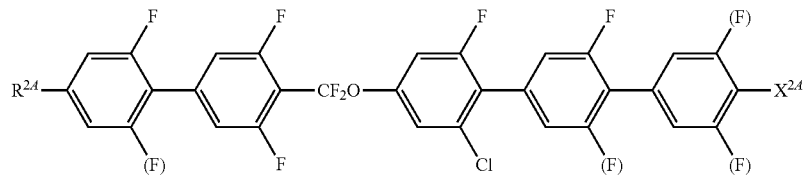
(2-1-2-2)
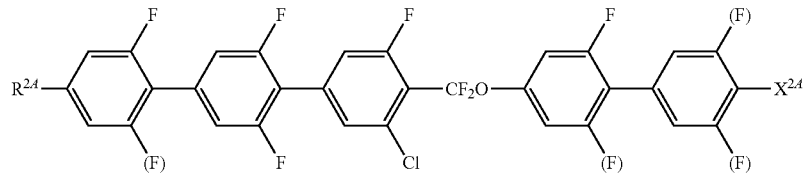
(2-1-2-3)
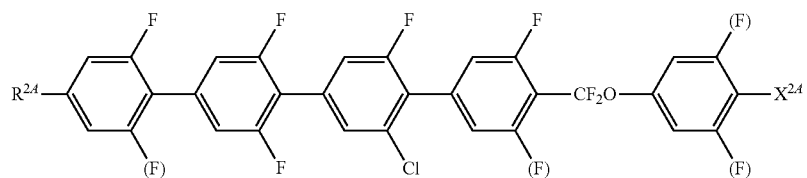
(2-1-3-1)
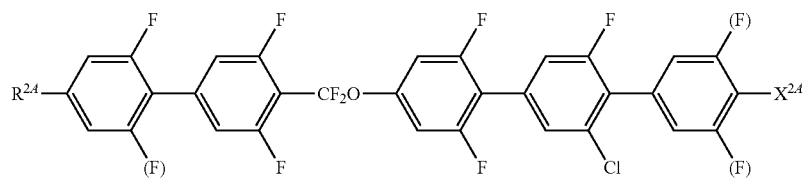
(2-1-3-2)
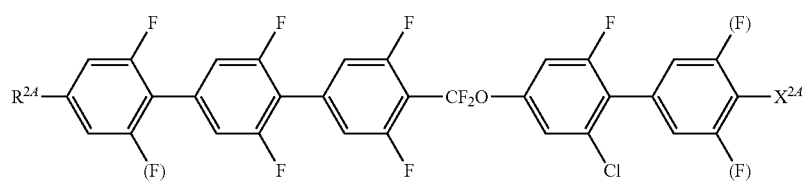
(2-1-3-3)
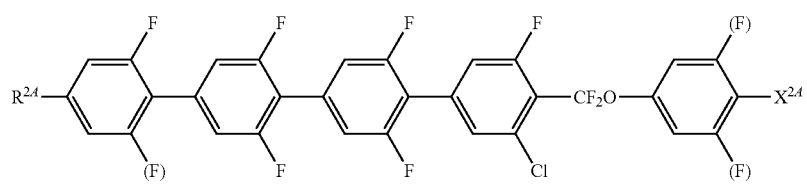
(2-1-4-1)
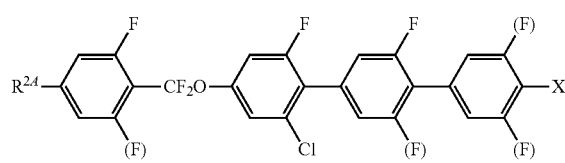
(2-1-4-2)
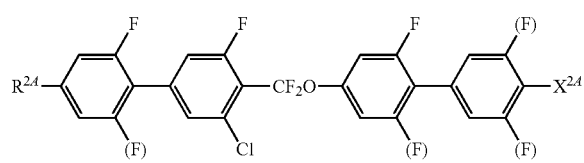
(2-1-4-3)
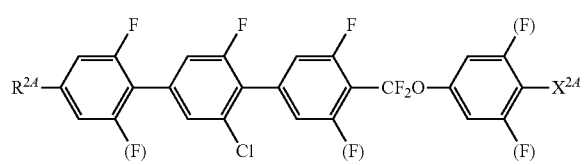
(2-1-5-1)
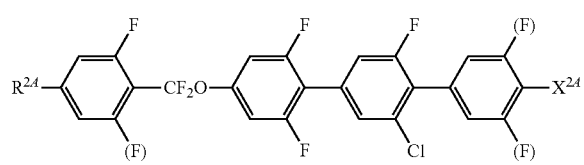

(2-1-5-2)
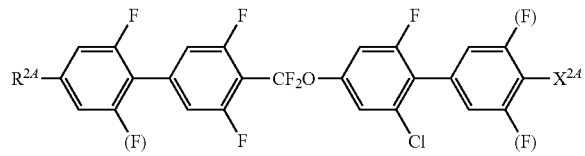

(2-1-5-3)
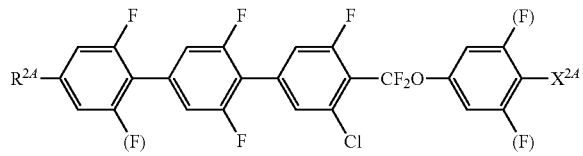

In the formulas, $R^{2A}$, (F) and $X^{2A}$ are defined in a manner identical with the definitions for formulas (2-1-1) to (2-1-5).

2-2. Properties of Compound (2-1)

Compound (2-1) used in the invention will be explained in more detail. Compound (2-1) is a liquid crystal compound having a chlorobenzene ring. The compound is significantly physically and chemically stable under conditions in which the device is ordinarily used, and has a good compatibility with other liquid crystal compounds. Furthermore, the compound is hard to exhibit a smectic phase. A composition containing the compound is stable under the conditions in which the device is ordinarily used. Accordingly, the temperature range of a cholesteric phase can be extended in the composition, and the composition can be used in the form of a display device in a wide temperature range. Furthermore, the compound has large dielectric anisotropy and refractive index anisotropy, and therefore is useful as a component for decreasing the driving voltage and increasing the reflectance in the composition to be driven in the cholesteric phase.

Physical properties such as the clearing point, the refractive index anisotropy and the dielectric anisotropy can be arbitrarily adjusted by suitably selecting a combination of n22 to n25, a left-terminal group $R^{2A}$, a group on the rightmost benzene ring and the substitution position thereof ((F) and $X^{2A}$), or the linking groups $Z^{22}$ to $Z^{26}$ in compound (2-1). The effects of the combination of n22, n23, n24 and n25, the kinds of left-terminal group $R^{2A}$, the right-terminal group $X^{2A}$, the linking groups $Z^{21}$ to $Z^{26}$, and (F) on the physical properties of compound (2-1) will be explained below.

In general, a compound satisfying the equation of n22+n23+n24+n25=2 has a high clearing point, and a compound satisfying the equation of n22+n23+n24+n25=1 has a low melting point.

When $R^{2A}$ is alkenyl, the preferred configuration depends on a position of a double bond. The trans configuration is preferred in alkenyl having a double bond at an odd-numbered position, such as —CH=CHCH$_3$, —CH=CHC$_2$H$_5$, —CH=CHC$_3$H$_7$, —CH=CHC$_4$H$_9$, —C$_2$H$_4$CH=CHCH$_3$ and —C$_2$H$_4$CH=CHC$_2$H$_5$. The cis configuration is preferred in alkenyl having a double bond at an even-numbered position, such as —CH$_2$CH=CHCH$_3$, —CH$_2$CH=CHC$_2$H$_5$ and —CH$_2$CH=CHC$_3$H$_7$. An alkenyl compound having the preferred configuration has a high maximum temperature or a wide temperature range of the liquid crystal phase. The detailed description is found in Mol. Cryst. Liq. Cryst., 1985, 131, 109 and Mol. Cryst. Liq. Cryst., 1985, 131, 327.

Bonding groups $Z^{21}$ to $Z^{26}$ are a single bond or —CF$_2$O—. Therefore, compound (2-1) is relatively chemically stable and is relatively hard to cause degradation. Furthermore, when the linking groups are single bonds, compound (2-1) has a small viscosity. Moreover, when a linking group is —CF$_2$O—, compound (2-1) has a large dielectric anisotropy.

When the right-terminal group $X^{2A}$ is fluorine, chlorine or —OCF$_3$, compound (2-1) has an excellent cold compatibility with other liquid crystal compounds. When $X^{2A}$ is —CF$_3$, compound (2-1) has a great effect on decreasing the driving voltage.

When (F) is hydrogen, compound (2-1) has a low melting point. When (F) is fluorine, compound (2-1) has a large dielectric anisotropy.

As described above, a compound having objective physical properties can be obtained by suitably selecting the kinds of the ring structures, the terminal groups, the linking groups and so on.

The compound represented by formula (2) has a good compatibility, a large dielectric anisotropy and a large refractive index anisotropy, and therefore the content thereof may be 0.5 to 70 wt %, and is preferably 5 to 60 wt %, further preferably 10 to 50 wt %, based on a total weight of component T.

Compound (2) used for the invention may be applied in one kind or two or more kinds thereof.

3-1. Compound (3)

A third embodiment of the liquid crystal composition of the invention is a composition containing a third component of the achiral component T including at least one compound selected from the group of compounds represented by formula (3), and the first component. The liquid crystal composition may further contain the second component in addition to the third component and the first component.

The compound represented by formula (3) will be explained.

(3)
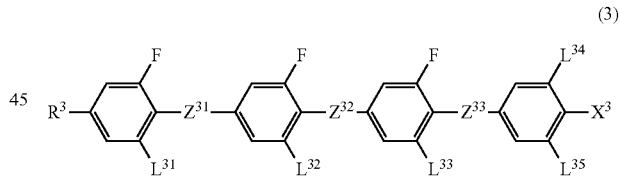

In formula (3), $R^3$ is hydrogen or alkyl having 1 to 20 carbons, at least one —CH$_2$— in the alkyl may be replaced by —O—, —S—, —COO— or —OCO—, at least one —CH$_2$—CH$_2$— in the alkyl may be replaced by —CH=CH—, —CF=CF— or —C≡C—, and in the alkyl, the group formed by replacing at least one —CH$_2$— in the alkyl by —O—, —S—, —COO— or —OCO—, or the group formed by replacing at least one of —CH$_2$—CH$_2$— in the alkyl by —CH=CH—, —CF=CF— or —C≡C—, at least one hydrogen may be replaced by halogen, provided that in $R^3$, —O— and —CH=CH— are not adjacent and —CO— and —CH=CH— are not adjacent; $Z^{31}$, $Z^{32}$ and $Z^{33}$ are independently a single bond, —COO— or —CF$_2$O—, but at least one thereof is —CF$_2$O—; $L^{31}$, $L^{32}$, $L^{33}$, $L^{34}$ and $L^{35}$ are independently hydrogen or fluorine; and $X^3$ is hydrogen, halogen, —SF$_5$ or alkyl having 1 to 10 carbons, at least one —CH$_2$— in the alkyl may be replaced by —O—, —S—, —COO— or —OCO—, at least one —CH$_2$—CH$_2$— in the alkyl may be replaced by —CH═CH—, —CF═CF— or —C≡C—, and in the alkyl, the group formed by replacing at least one —CH₂— in the alkyl by —O—, —S—, —COO— or —OCO—, or the group formed by replacing at least one —CH₂—CH₂— in the alkyl by —CH═CH—, —CF═CF— or —C≡C—, at least one hydrogen may be replaced by fluorine, provided that in $X^3$, —O— and —CH═CH— are not adjacent and —CO— and —CH═CH— are not adjacent.

The preferred configuration of —CH═CH— in alkenyl depends on the position of the double bond. The trans configuration is preferred in alkenyl having a double bond at an odd-numbered position, such as —CH═CHCH₃, —CH═CHC₂H₅, —CH═CHC₃H₇, —CH═CHC₄H₉, —C₂H₄CH═CHCH₃ and —C₂H₄CH═CHC₂H₅. The cis configuration is preferred in alkenyl having a double bond at an even-numbered position, such as —CH₂CH═CHCH₃, —CH₂CH═CHC₂H₅ and —CH₂CH═CHC₃H₇. An alkenyl compound having the preferred configuration has a high maximum temperature or a wide temperature range of the liquid crystal phase. The detailed description is found in Mol. Cryst. Liq. Cryst., 1985, 131, 109 and Mol. Cryst. Liq. Cryst., 1985, 131, 327.

Specific examples of alkyl include —CH₃, —C₂H₅, —C₃H₇, —C₄H₉, —C₅H₁₁, —C₆H₁₃, —C₇H₁₅, —C₈H₁₇, —C₉H₁₉, —C₁₀H₂₁, —C₁₁H₂₃, —C₁₂H₂₅, —C₁₃H₂₇, —C₁₄H₂₉ and —C₁₅H₃₁.

Specific examples of alkoxy include —OCH₃, —OC₂H₅, —OC₃H₇, —OC₄H₉, —OC₅H₁₁, —OC₆H₁₃, —OC₇H₁₅, —OC₈H₁₇, —OC₉H₁₉, —OC₁₀H₂₁, —OC₁₁H₂₃, —OC₁₂H₂₅, —OC₁₃H₂₇ and —OC₁₄H₂₉.

Specific examples of alkoxyalkyl include —CH₂OCH₃, —CH₂OC₂H₅, —CH₂OC₃H₇, —(CH₂)₂—OCH₃, —(CH₂)₂—OC₂H₅, —(CH₂)₂—OC₃H₇, —(CH₂)₃—OCH₃, —(CH₂)₄—OCH₃ and —(CH₂)₅—OCH₃.

Specific examples of alkenyl include —CH═CH₂, —CH═CHCH₃, —CH₂CH═CH₂, —CH═CHC₂H₅, —CH₂CH═CHCH₃, —(CH₂)₂—CH═CH₂, —CH═CHC₃H₇, —CH₂CH═CHC₂H₅, —(CH₂)₂—CH═CHCH₃ and —(CH₂)₃—CH═CH₂.

Specific examples of alkenyloxy include —OCH₂CH═CH₂, —OCH₂CH═CHCH₃ and —OCH₂CH═CHC₂H₅.

Specific examples of alkynyl include —C≡CH, —C≡CCH₃, —CH₂C≡CH, —C≡CC₂H₅, —CH₂C≡CCH₃, —(CH₂)₂—C≡CH, —C≡CC₃H₇, —CH₂C≡CC₂H₅, —(CH₂)₂—C≡CCH₃ and —C≡C(CH₂)₅.

In formula (3), $Z^{31}$, $Z^{32}$ and $Z^{33}$ are independently a single bond, —COO— or —CF₂O—, but at least one of $Z^{31}$, $Z^{32}$ and $Z^{33}$ is —CF₂O—.

Preferred examples of $Z^{31}$, $Z^{32}$ and $Z^{33}$ include a single bond and —CF₂O—.

In formula (3), $L^{31}$, $L^{32}$, $L^{33}$, $L^{34}$ and $L^{35}$ are independently hydrogen or fluorine. When $Z^{32}$ is —COO— or —CF₂O—, $L^{32}$, $L^{34}$ and $L^{35}$ are preferably fluorine, and when $Z^{33}$ is —COO— or —CF₂O—, $L^{33}$, $L^{34}$ and $L^{35}$ are preferably fluorine.

In formula (3), $X^3$ is hydrogen, halogen, —SF₅ or alkyl having 1 to 10 carbons, at least one —CH₂— in the alkyl may be replaced by —O—, —S—, —COO— or —OCO—, at least one —CH₂—CH₂— in the alkyl may be replaced by —CH═CH—, —CF═CF— or —C≡C—, and in the alkyl, the group formed by replacing at least one —CH₂— in the alkyl by —O—, —S—, —COO— or —OCO—, or the group formed by replacing at least one —CH₂—CH₂— in the alkyl by —CH═CH—, —CF═CF— or —C≡C—, at least one hydrogen may be replaced by fluorine.

Specific examples of alkyl in which at least one hydrogen is replaced by halogen include —CH₂F, —CHF₂, —CF₃, —(CH₂)₂—F, —CF₂CH₂F, —CF₂CHF₂, —CH₂CF₃, —CF₂CF₃, —(CH₂)₃—F, —(CF₂)₃—F, —CF₂CHFCF₃, —CHFCF₂CF₃, —(CH₂)₄—F, —(CF₂)₄—F, —(CH₂)₅—F and —(CF₂)₅—F.

Specific examples of alkoxy in which at least one hydrogen is replaced by halogen include —OCH₂F, —OCHF₂, —OCF₃, —O—(CH₂)₂—F, —OCF₂CH₂F, —OCF₂CHF₂, —OCH₂CF₃, —O—(CH₂)₃—F, —O—(CF₂)₃—F, —OCF₂CHFCF₃, —OCHFCF₂CF₃, —O(CH₂)₄—F, —O—(CF₂)₄—F, —O—(CH₂)₅—F and —O—(CF₂)₅—F.

Specific examples of alkenyl in which at least one hydrogen is replaced by halogen include —CH═CHF, —CH═CF₂, —CF═CHF, —CH═CHCH₂F, —CH═CHCF₃, —(CH₂)₂—CH═CF₂, —CH₂CH═CHCF₃, —CH═CHCF₃ and —CH═CHCF₂CF₃.

Preferred examples of $X^3$ are fluorine, chlorine, —CF₃, —CHF₂, —OCF₃ and —OCHF₂. Most preferred examples of $X^3$ are fluorine, chlorine, —CF₃ and —OCF₃.

Preferred structures for formula (3) are represented by formulas (3-1) to (3-3). Further preferred structures are represented by formulas (3-2) to (3-3).

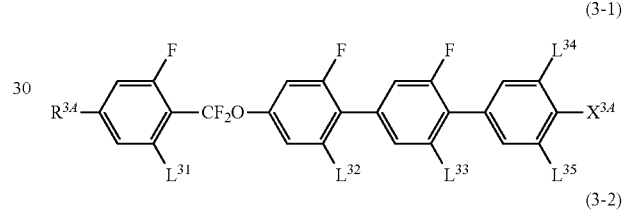

(3-1)

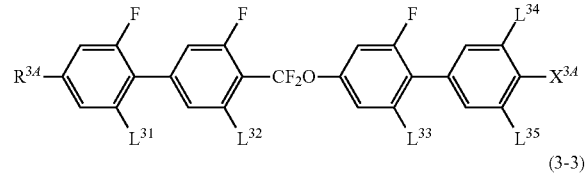

(3-2)

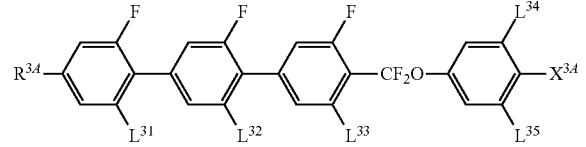

(3-3)

In the formulas, $R^{34}$ is independently alkyl having 1 to 12 carbons, alkoxy having 1 to 12 carbons, alkenyl having 2 to 12 carbons, or alkenyl having 2 to 12 carbons in which at least one hydrogen is replaced by fluorine, $X^{34}$ is fluorine, chlorine, —CF₃ or —OCF₃, and $L^{31}$ to $L^{35}$ are independently hydrogen or fluorine.

3-2. Properties of Compound (3)

Compound (3) used in the invention will be explained in more detail. Compound (3) has four benzene rings, and at least one —CF₂O— linking group. The compound is significantly physically and chemically stable under conditions in which the device is ordinarily used, and has a good compatibility with other liquid crystal compounds. A composition containing the compound is stable under the conditions in which the device is ordinarily used. Accordingly, the temperature range of the cholesteric phase can be extended in the composition, and the composition can be used in the form of a display device in a wide temperature range. Furthermore, the compound has large dielectric anisotropy and refractive index anisotropy, and therefore is useful as a component for decreasing the driving voltage and increasing the reflectance in the composition to be driven in the cholesteric phase.

Physical properties such as the clearing point, the refractive index anisotropy and the dielectric anisotropy can be arbitrarily adjusted by suitably selecting the left-terminal group $R^3$, the groups ($L^{31}$ to $L^{35}$, and $X^3$) on benzene rings, or the linking groups $Z^{31}$ to $Z^{33}$ in compound (3). The effects of the kinds of left-terminal group $R^3$, the groups ($L^{31}$ to $L^{35}$, and $X^3$) on the benzene rings, or the linking groups $Z^{31}$ to $Z^{33}$ on the physical properties of compound (3) will be explained below.

When $R^3$ is alkenyl, the preferred configuration of —CH=CH— in the alkenyl depends on the position of the double bond. The trans configuration is preferred in alkenyl having a double bond at an odd-numbered position, such as —CH=CHCH$_3$, —CH=CHC$_2$H$_5$, —CH=CHC$_3$H$_7$, —CH=CHC$_4$H$_9$, —C$_2$H$_4$CH=CHCH$_3$ and —C$_2$H$_4$CH=CHC$_2$H$_5$. The cis configuration is preferred in alkenyl having a double bond at an even-numbered position, such as —CH$_2$CH=CHCH$_3$, —CH$_2$CH=CHC$_2$H$_5$ and —CH$_2$CH=CHC$_3$H$_7$. An alkenyl compound having the preferred configuration has a high maximum temperature or a wide temperature range of the liquid crystal phase. The detailed description is found in Mol. Cryst. Liq. Cryst., 1985, 131, 109 and Mol. Cryst. Liq. Cryst., 1985, 131, 327.

When the linking groups $Z^{31}$, $Z^{32}$ and $Z^{33}$ are single bonds or —CF$_2$O—, compound (3) has a small viscosity. When the linking groups $Z^{31}$, $Z^{32}$ and $Z^{33}$ are —CF$_2$O—, compound (3) has a large dielectric anisotropy. When $Z^{31}$, $Z^{32}$ and $Z^{33}$ are single bonds or —CF$_2$O—, compound (3) is relatively chemically stable and relatively hard to cause degradation.

When the right-terminal group $X^3$ is fluorine, chlorine, —SF$_5$, —CF$_3$, —CHF$_2$, —CH$_2$F, —OCF$_3$, —OCHF$_2$ or —OCH$_2$F, compound (3) has a large dielectric anisotropy. When $X^3$ is fluorine, —OCF$_3$ or —CF$_3$, compound (3) is chemically stable.

When the number of fluorine in $L^{31}$ to $L^{35}$ is large, compound (3) has a large dielectric anisotropy. When $L^{31}$ is hydrogen, compound (3) has an excellent compatibility with other liquid crystals. When both $L^{34}$ and $L^{35}$ are fluorine, compound (3) has a particularly large dielectric anisotropy.

As described above, a compound having objective physical properties can be obtained by suitably selecting the kinds of the terminal groups, the linking groups and so on.

3-3. Specific Examples of Compound (3)

Preferred examples of compound (3) are represented by formulas (3-1) to (3-3). Specific examples of further preferred compounds are represented by formulas (3-2A) to (3-2H) and (3-3A) to (3-3D). Specific examples of still further preferred compounds are represented by formulas (3-2A) to (3-2D), (3-3A) and (3-3B). Specific examples of most preferred compounds are represented by formulas (3-2A), (3-2C) and (3-3A).

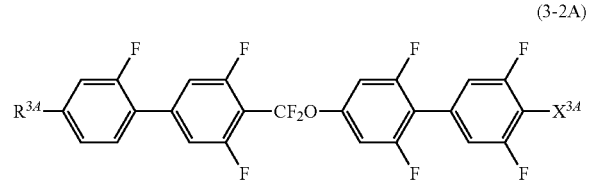

(3-2A)

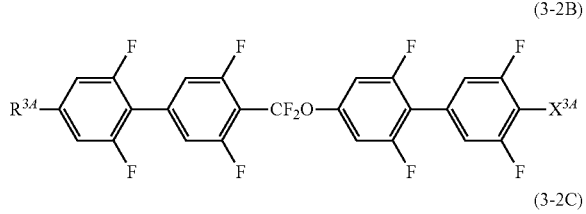

(3-2B)

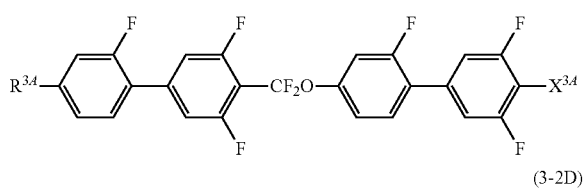

(3-2C)

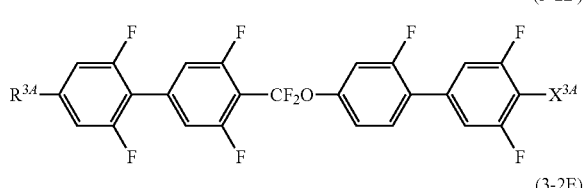

(3-2D)

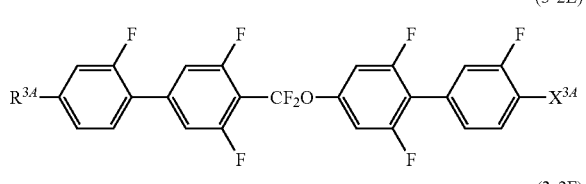

(3-2E)

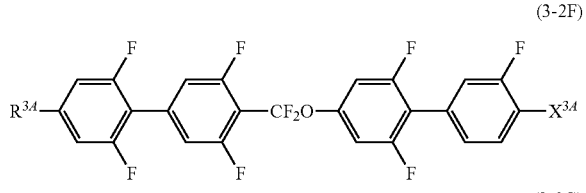

(3-2F)

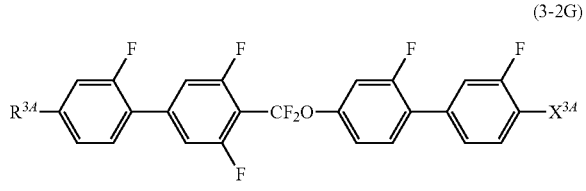

(3-2G)

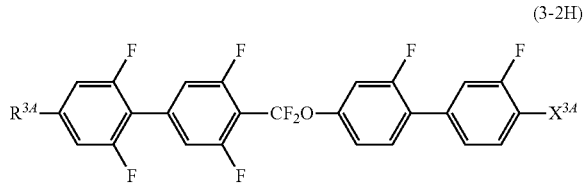

(3-2H)

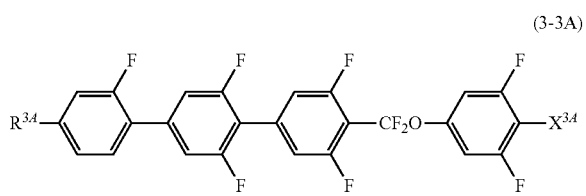

(3-3A)

(3-3B)

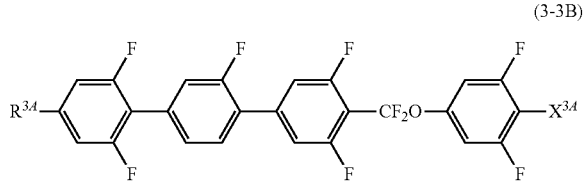

-continued

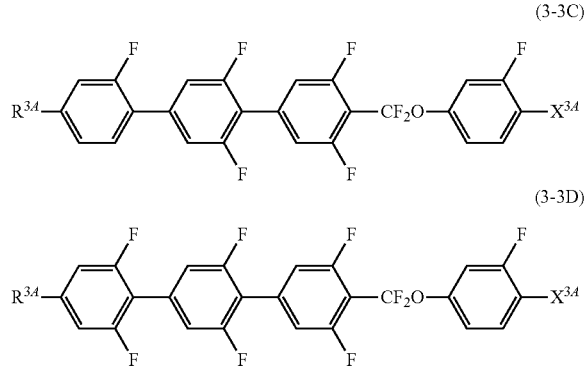

(3-3C)

(3-3D)

In the formulas, $R^{34}$ is independently alkyl having 1 to 12 carbons, alkoxy having 1 to 12 carbons, alkenyl having 2 to 12 carbons, or alkenyl having 2 to 12 carbons in which at least one hydrogen is replaced by fluorine, and $X^{34}$ is fluorine, chlorine, —$CF_3$ or —$OCF_3$.

The compound represented by formula (3) has a relatively high clearing point, a large dielectric anisotropy and a large refractive index anisotropy, and therefore the content thereof may be 0.5 to 70 wt %, and is preferably 5 to 60 wt %, further preferably 10 to 50 wt %, based on a total weight of component T.

Compound (3) used for the invention may be applied in one kind or two or more kinds.

4. Compound (4)

A fourth embodiment of the invention is a composition that contains component A, which includes the compound represented by formula (1) and, as additional components, the compounds represented by formulas (2) and (3), and a fourth component of the achiral component T including at least one compound selected from the group of compounds represented by the formula (4). The compound represented by formula (4) will be explained.

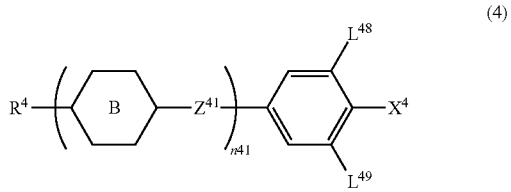

(4)

In formula (4), $R^4$ is alkyl having 1 to 12 carbons, alkoxy having 1 to 12 carbons, alkenyl having 2 to 12 carbons, or alkenyl having 2 to 12 carbons in which at least one hydrogen is replaced by fluorine; ring B is independently 1,4-cyclohexylene, 1,4-phenylene, 2-fluoro-1,4-phenylene, 3-fluoro-1,4-phenylene, 3,5-difluoro-1,4-phenylene, 3,5-dichloro-1,4-phenylene or pyrimidine-2,5-diyl; $Z^{41}$ is independently a single bond, ethylene, —COO—, —OCO—, —$CF_2O$— or —$OCF_2$—; $L^{23}$ and $L^{24}$ are independently hydrogen, fluorine or chlorine; $X^4$ is fluorine, chlorine, —$CF_3$ or —$OCF_3$; n41 is 1, 2, 3 or 4, provided that when n41 is 3 or 4, one $Z^{41}$ is —$CF_2O$— or —$OCF_2$—; when n41 is 3, a case where all of the rings B are 1,4-phenylene replaced by fluorine is excluded.

The fourth component of the achiral component T is suitable for preparation of a composition having a large dielectric anisotropy or compatibility at a low temperature. The preferred content of the fourth component is about 5 wt % to about 40 wt % based on the total weight of the component T for increasing the compatibility at a low temperature. The further preferred proportion is in the range of about 5 wt % to about 30 wt %. The particularly preferred proportion is in the range of about 5 wt % to about 20 wt %.

Compound (4) used for the invention may be applied in one kind or two or more kinds.

$R^4$ is alkyl having 1 to 12 carbons, alkoxy having 1 to 12 carbons, alkenyl having 2 to 12 carbons, or alkenyl having 2 to 12 carbons in which at least one hydrogen is replaced by fluorine. Preferred $R^4$ for increasing the stability to ultraviolet light or the stability to heat is alkyl having 1 to 12 carbons. Preferred $R^4$ for decreasing the viscosity is alkenyl having 2 to 12 carbons. Preferred $R^4$ for increasing the stability to ultraviolet light or the stability to heat is alkyl having 1 to 12 carbons.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. The preferred configuration of —CH=CH— in the alkenyl depends on the position of the double bond. For decreasing the viscosity, trans is preferred in alkenyl such as 1-propenyl, 1-butenyl, 1-pentenyl, 1-hexenyl, 3-pentenyl and 3-hexenyl. C is preferred in alkenyl such as 2-butenyl, 2-pentenyl and 2-hexenyl. Among the alkenyl groups, straight-chain alkenyl is preferred to branched alkenyl.

Preferred examples of alkenyl in which at least one hydrogen is replaced by fluorine are 2,2-difluorovinyl, 3,3-difluoro-2-propenyl, 4,4-difluoro-3-butenyl, 5,5-difluoro-4-pentenyl and 6,6-difluoro-5-hexenyl. Further preferred examples are 2,2-difluorovinyl and 4,4-difluoro-3-butenyl for decreasing the viscosity.

The alkyl does not include cyclic alkyl. The alkoxy does not include cyclic alkoxy. The alkenyl does not include cyclic alkenyl. The alkenyl in which at least one hydrogen is replaced by fluorine does not include cyclic alkenyl in which at least one hydrogen is replaced by fluorine.

Ring B is independently 1,4-cyclohexylene, 1,4-phenylene, 2-fluoro-1,4-phenylene, 3-fluoro-1,4-phenylene, 3,5-difluoro-1,4-phenylene, 3,5-dichloro-1,4-phenylene or pyrimidine-2,5-diyl, and arbitrary two rings B when n41 is 2 or more may be identical or different. Preferred ring B is 1,4-phenylene or 3-fluoro-1,4-phenylene for increasing the optical anisotropy, or 1,4-cyclohexylene for decreasing the viscosity.

$Z^{41}$ is independently a single bond, ethylene, —COO—, —OCO—, —$CF_2O$— or —$OCF_2$—, provided that one of $Z^{12}$ when n41 is 3 or 4 is —$CF_2O$—. Arbitrary two $Z^{12}$ when n41 is 2 or more may be identical or different. Preferred $Z^{41}$ for decreasing the viscosity is a single bond. Preferred $Z^{41}$ for increasing the dielectric anisotropy or improving the compatibility is —$CF_2O$—.

$L^{48}$ and $L^{49}$ are independently hydrogen or fluorine, and it is preferred that both $L^{48}$ and $L^{49}$ are fluorine for increasing the dielectric anisotropy, or both $L^{48}$ and $L^{49}$ are hydrogen for increasing the clearing point.

$X^4$ is fluorine, chlorine, —$CF_3$ or —$OCF_3$. $X^4$ is preferably —$CF_3$ for increasing the dielectric anisotropy, fluorine or —OCF₃ for improving the compatibility, or chlorine for increasing the refractive index anisotropy.

Preferred compounds for formula (4) are represented by formulas (4-1) to (4-9).

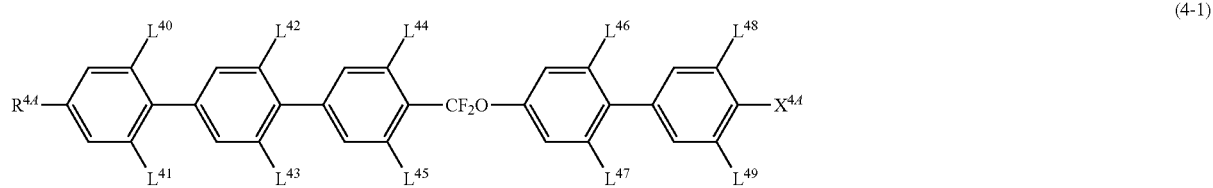

(4-1)

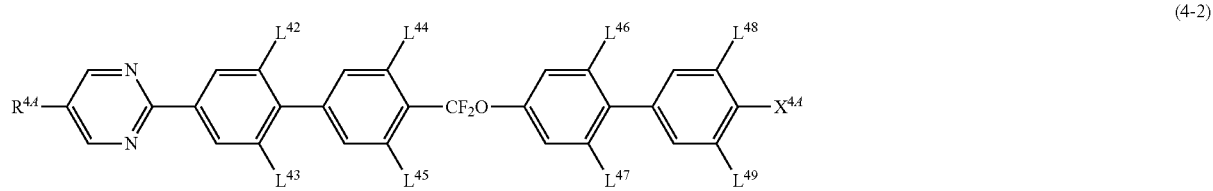

(4-2)

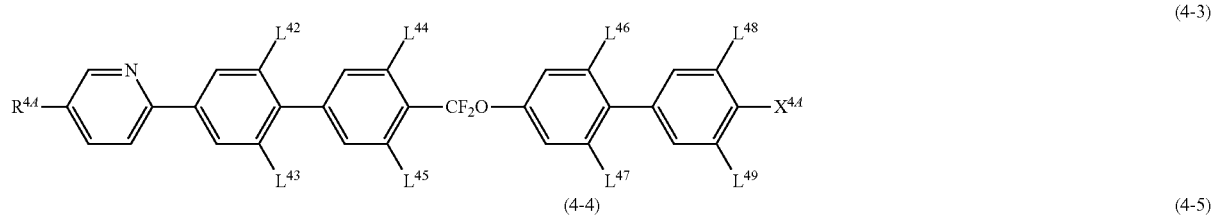

(4-3)

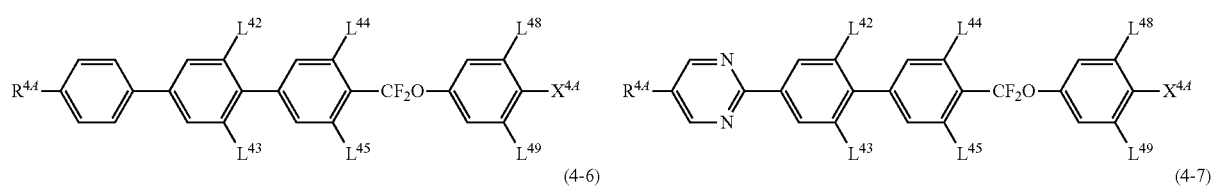

(4-4) (4-5)

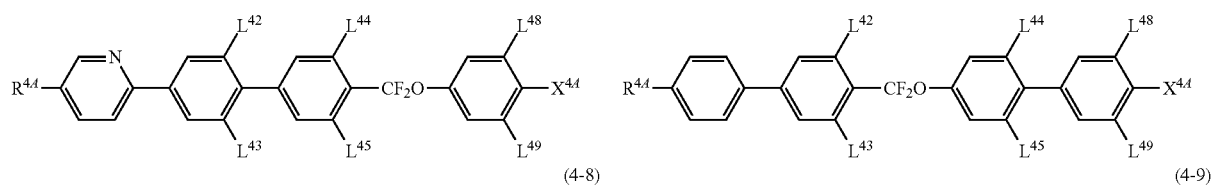

(4-6) (4-7)

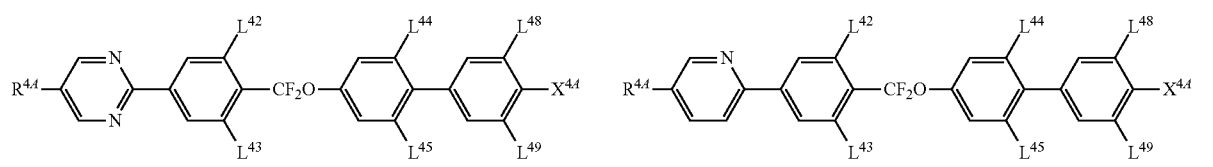

(4-8) (4-9)

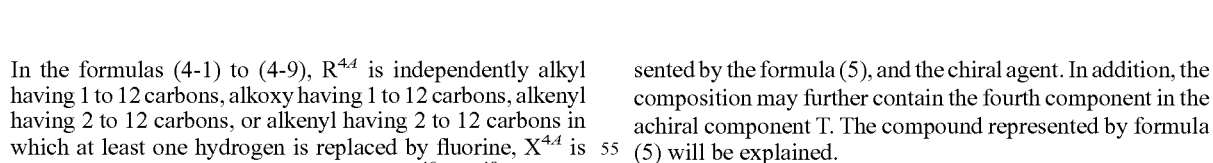

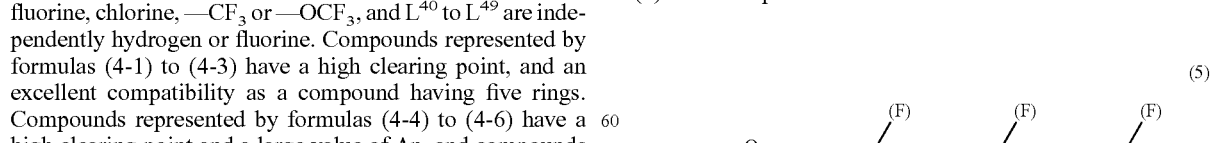

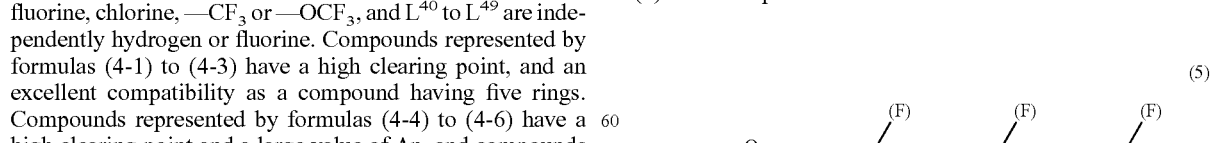

In the formulas (4-1) to (4-9), $R^{4A}$ is independently alkyl having 1 to 12 carbons, alkoxy having 1 to 12 carbons, alkenyl having 2 to 12 carbons, or alkenyl having 2 to 12 carbons in which at least one hydrogen is replaced by fluorine, $X^{4A}$ is fluorine, chlorine, —CF₃ or —OCF₃, and $L^{40}$ to $L^{49}$ are independently hydrogen or fluorine. Compounds represented by formulas (4-1) to (4-3) have a high clearing point, and an excellent compatibility as a compound having five rings. Compounds represented by formulas (4-4) to (4-6) have a high clearing point and a large value of Δn, and compounds represented by formulas (4-7) to (4-9) have an excellent compatibility. In $L^{40}$ to $L^{49}$, as the number of fluorine is larger, the dielectric anisotropy is larger.

5. Compound (5)

A fifth embodiment of the invention is a composition that contains component A, which includes the compound represented by formula (1) and, as additional components, the compounds represented by formulas (2) and (3), a fifth component of the achiral component T including at least one compound selected from the group of compounds represented by the formula (5), and the chiral agent. In addition, the composition may further contain the fourth component in the achiral component T. The compound represented by formula (5) will be explained.

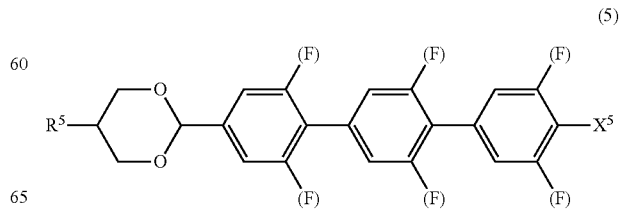

(5)

In formula (5), $R^5$ is hydrogen or alkyl having 1 to 20 carbons, at least one —$CH_2$— in the alkyl may be replaced by —O—, —S—, —COO— or —OCO—, at least one —$CH_2$—$CH_2$— in the alkyl may be replaced by —CH=CH—, —CF=CF— or —C≡C—, and in the alkyl, the group formed by replacing at least one —$CH_2$— in the alkyl by —O—, —S—, —COO— or —OCO—, or the group formed by replacing at least one —$CH_2$—$CH_2$— in the alkyl by —CH=CH—, —CF=CF— or —C≡C—, at least one hydrogen may be replaced by halogen, provided that in $R^5$, —O— and —CH=CH— are not adjacent and —CO— and —CH=CH— are not adjacent; (F) is independently hydrogen or fluorine; $X^5$ is hydrogen, halogen, —$SF_5$ or alkyl having 1 to 10 carbons, at least one —$CH_2$— in the alkyl may be replaced by —O—, —S—, —COO— or —OCO—, at least one —$CH_2$—$CH_2$— in the alkyl may be replaced by —CH=CH—, —CF=CF— or —C≡C—, and in the alkyl, the group formed by replacing at least one —$CH_2$— in the alkyl by —O—, —S—, —COO— or —OCO—, or the group formed by replacing at least one —$CH_2$—$CH_2$— in the alkyl by —CH=CH—, —CF=CF— or —C≡C—, at least one hydrogen may be replaced by fluorine, provided that in $X^5$, —O— and —CH=CH— are not adjacent and —CO— and —CH=CH— are not adjacent.

The preferred configuration of —CH=CH— in alkenyl depends on the position of the double bond. The trans configuration is preferred in alkenyl having a double bond at an odd-numbered position, such as —CH=$CHCH_3$, —CH=$CHC_2H_5$, —CH=$CHC_3H_7$, —CH=$CHC_4H_9$, —$C_2H_4$CH=$CHCH_3$ and —$C_2H_4$CH=$CHC_2H_5$. The cis configuration is preferred in alkenyl having a double bond at an even-numbered position, such as —$CH_2$CH=$CHCH_3$, —$CH_2$CH=$CHC_2H_5$ and —$CH_2$CH=$CHC_3H_7$. An alkenyl compound having the preferred configuration has a high maximum temperature or a wide temperature range of the liquid crystal phase. The detailed description is found in Mol. Cryst. Liq. Cryst., 1985, 131, 109 and Mol. Cryst. Liq. Cryst., 1985, 131, 327.

Specific examples of alkyl include —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$, —$C_{10}H_{21}$, —$C_{11}H_{23}$, —$C_{12}H_{25}$, —$C_{13}H_{27}$, —$C_{14}H_{29}$ and —$C_{15}H_{31}$.

Specific examples of alkoxy include —$OCH_3$, —$OC_2H_5$, —$OC_3H_7$, —$OC_4H_9$, —$OC_5H_{11}$, —$OC_6H_{13}$, —$OC_7H_{15}$, —$OC_8H_{17}$, —$OC_9H_{19}$, —$OC_{10}H_{21}$, —$OC_{11}H_{23}$, —$OC_{12}H_{25}$, —$OC_{13}H_{27}$ and —$OC_{14}H_{29}$.

Specific examples of alkoxyalkyl include —$CH_2OCH_3$, —$CH_2OC_2H_5$, —$CH_2OC_3H_7$, —$(CH_2)_2$—$OCH_3$, —$(CH_2)_2$—$OC_2H_5$, —$(CH_2)_2$—$OC_3H_7$, —$(CH_2)_3$—$OCH_3$, —$(CH_2)_4$—$OCH_3$ and —$(CH_2)_5$—$OCH_3$.

Specific examples of alkenyl include —CH=$CH_2$, —CH=$CHCH_3$, —$CH_2$CH=$CH_2$, —CH=$CHC_2H_5$, —$CH_2$CH=$CHCH_3$, —$(CH_2)_2$—CH=$CH_2$, —CH=$CHC_3H_7$, —$CH_2$CH=$CHC_2H_5$, —$(CH_2)_2$—CH=$CHCH_3$ and —$(CH_2)_3$—CH=$CH_2$.

Specific examples of alkenyloxy include —$OCH_2$CH=$CH_2$, —$OCH_2$CH=$CHCH_3$ and —$OCH_2$CH=$CHC_2H_5$.

Specific examples of alkynyl include —C≡CH, —C≡$CCH_3$, —$CH_2$C≡CH, —C≡$CC_2H_5$, —$CH_2$C≡$CCH_3$, —$(CH_2)_2$—C≡CH, —C≡$CC_3H_7$, —$CH_2$C≡$CC_2H_5$, —$(CH_2)_2$—C≡$CCH_3$ and —C≡C$(CH_2)_5$.

In formula (5), $X^5$ is hydrogen, halogen, —$SF_5$ or alkyl having 1 to 10 carbons, at least one —$CH_2$— in the alkyl may be replaced by —O—, —S—, —COO— or —OCO—, at least one —$CH_2$—$CH_2$— in the alkyl may be replaced by —CH=CH—, —CF=CF— or —C≡C—, and in the alkyl, the group formed by replacing at least one —$CH_2$— in the alkyl by —O—, —S—, —COO— or —OCO—, or the group formed by replacing at least one —$CH_2$—$CH_2$— in the alkyl by —CH=CH—, —CF=CF— or —C≡C—, at least one hydrogen may be replaced by fluorine.

Specific examples of alkyl in which at least one hydrogen is replaced by fluorine include —$CHF_2$, —$CF_3$, —$CF_2CH_2F$, —$CF_2CHF_2$, —$CH_2CF_3$, —$CF_2CF_3$, —$(CH_2)_3$—F, —$(CF_2)_3$—F, —$CF_2CHFCF_3$ and —$CHFCF_2CF_3$.

Specific examples of alkoxy in which at least one hydrogen is replaced by fluorine include —$OCHF_2$, —$OCF_3$, —$OCF_2CH_2F$, —$OCF_2CHF_2$, —$OCH_2CF_3$, —O—$(CF_2)_3$—F, —$OCF_2CHFCF_3$ and —$OCHFCF_2CF_3$.

Specific examples of alkenyl in which at least one hydrogen is replaced by fluorine include —CH=$CF_2$, —CF=CHF, —CH=$CHCH_2F$, —CH=$CHCF_3$, —$(CH_2)_2$—CH=$CF_2$, —$CH_2$CH=$CHCF_3$ and —CH=$CHCF_2CF_3$.

Specific examples of preferred $X^5$ include fluorine, chlorine, —$CF_3$, —$CHF_2$, —$OCF_3$ and —$OCHF_2$. Examples of further preferred $X^5$ are fluorine, chlorine, —$CF_3$ and —$OCF_3$. When $X^5$ is chlorine or fluorine, compound (4) has a low melting point, and a particularly excellent compatibility with other liquid crystal compounds. When $X^5$ is —$CF_3$, —$CHF_2$, —$OCF_3$ and —$OCHF_2$, compound (4) shows a large dielectric anisotropy.

Preferred compounds in formula (5) are represented by formulas (5-1) to (5-4).

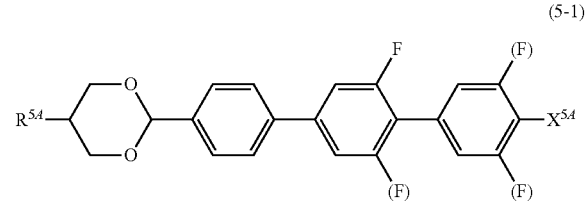

(5-1)

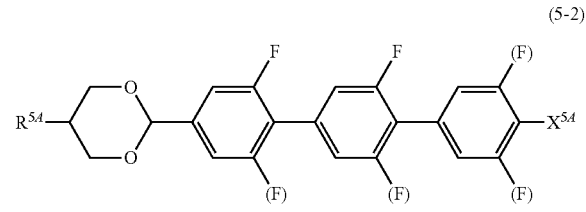

(5-2)

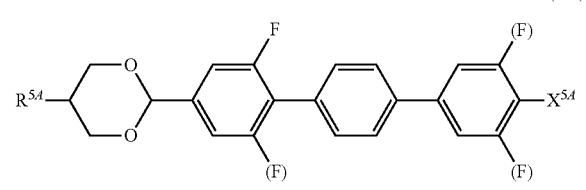

(5-3)

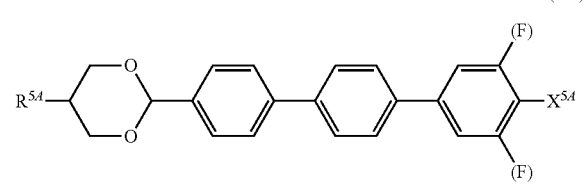

(5-4)

In formulas (5-1) to (5-4), $R^{5A}$ is alkyl having 1 to 12 carbons, alkoxy having 1 to 12 carbons, alkenyl having 2 to 12 carbons, or alkenyl having 2 to 12 carbons in which at least one hydrogen is replaced by fluorine; (F) is independently hydrogen or fluorine; and $X^{5A}$ is fluorine, chlorine, —$CF_3$ or —$OCF_3$.

Among the compounds represented by formulas (5-1) to (5-4), preferred compounds are represented by formulas (5-1) to (5-3). Further preferred compounds are represented by formulas (5-1-1), (5-1-2), (5-2-1) to (5-2-4), (5-3-1) and (5-3-2). Among the compounds, still further compounds are represented by formulas (5-2-1), (5-2-2) and (5-3-2).

(5-1-1)

(5-1-2)

(5-2-1)

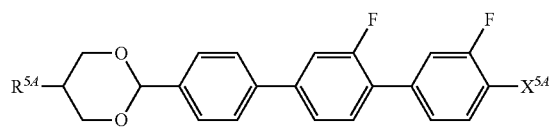

(5-2-2)

(5-2-3)

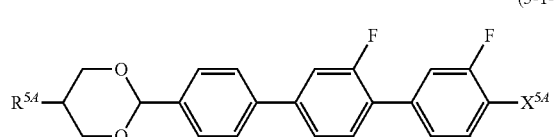

(5-2-4)

(5-3-1)

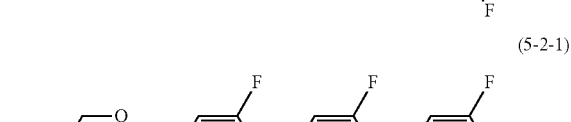

-continued (5-3-2)

In the formulas, $R^{5A}$ and $X^{5A}$ are defined as above.

The fifth component of the achiral component T is suitable for preparation of a composition having a large dielectric anisotropy. The preferred content of the fifth component is about 1.0 wt % or more for increasing the clearing point, and about 50 wt % or less for decrease the minimum temperature of the liquid crystal phase, based on the total weight of achiral component T. A further preferred proportion is about 1 to 25 wt %. A particularly preferred proportion is about 1 wt % to about 15 wt %.

Compound (5) used for the invention may be applied in one kind or two or more kinds.

5-1. Properties of Compound (5)

Compound (5) used in the invention will be explained in more details. Compound (5) is a liquid crystal compound having a dioxane ring and three benzene rings. The compound is significantly physically and chemically stable under conditions in which the device is ordinarily used, and has a relatively good compatibility with other liquid crystal compounds even though having a high clearing point. A composition containing the compound is stable under conditions in which the device is ordinarily used. Accordingly, the temperature range of the optically isotropic liquid crystal phase of the composition can be extended, and the composition can be used in the form of a display device in a wide temperature range. Furthermore, the compound is useful as a component for decreasing the driving voltage of the composition to be driven in the optically isotropic liquid crystal phase. Moreover, if a blue phase is exhibited by a composition prepared using compound (5) and the chiral agent, a uniform blue phase without coexistence of an N*phase or an isotropic phase is easily exhibited. More specifically, compound (5) easily develops a uniform blue phase.

When the right-terminal group $X^5$ is fluorine, chlorine, —$SF_5$, —$CF_3$, —$OCF_3$ or —CH=CH—$CF_3$, compound (5) has a large dielectric anisotropy. When $X^5$ is fluorine, —$CF_3$ or —$OCF_3$, compound (5) is chemically stable.

5-2. Synthesis of Compound (5)

Next, a synthesis of compound (5) will be explained. Compound (5) can be prepared by suitably combining techniques in synthetic organic chemistry. Methods for introducing objective terminal group, ring and bonding group into a starting material are described in Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Koza in Japanese) (Maruzen Co., Ltd.), or the like.

For example, the compound represented by formula (5) according to the invention can be prepared even by correspondingly applying the method described in JP 2959526 B.

The fifth component of the achiral component T easily develops a blue phase and is effective in increasing the clearing point.

6. Compound (6)

A sixth embodiment of the liquid crystal composition according to the invention is a composition containing a sixth component of the achiral component T including at least one compound selected from the group of compounds represented by formula (6), and the first component. The liquid crystal composition may further contain the second component to the fifth component in addition to the sixth component and the first component.

The compound represented by formula (6) will be explained.

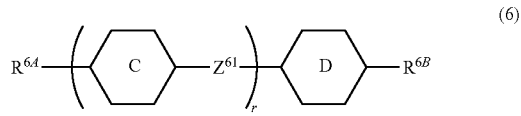

(6)

In formula (6), $R^{6A}$ and $R^{6B}$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine; ring C and ring D are independently 1,4-cyclohexylene, 1,4-phenylene, 2-fluoro-1,4-phenylene, 3-fluoro-1,4-phenylene or 2,5-difluoro-1,4-phenylene; $Z^{61}$ is independently a single bond, ethylene, —COO— or —OCO—; and r is 1, 2 or 3.

The sixth component of the achiral component T is a compound having a small absolute value of dielectric anisotropy, and being close to neutrality. A compound of formula (6) with r being 1 is effective mainly in adjusting the viscosity or adjusting the value of refractive index anisotropy, and a compound of formula (6) with r being 2 or 3 is effective in extending the temperature range of the optically isotropic liquid crystal phase, such as increasing the clearing point, or adjusting the value of refractive index anisotropy.

If the content of the compound represented by formula (6) is increased, the driving voltage of the liquid crystal composition increases and the viscosity decreases. Therefore, as long as a required value of the viscosity of the liquid crystal composition is satisfied, the content is desirably smaller from the viewpoint of the driving voltage. The content of the sixth component of the achiral component T is 1 wt % to 40 wt %, preferably 1 wt % to 20 wt %, based on the total weight of the achiral component T.

Compound (6) used for the invention may be applied in one kind or two or more kinds.

$R^{6A}$ and $R^{6B}$ are alkyl having 1 to 12 carbons, alkoxy having 1 to 12 carbons, alkenyl having 2 to 12 carbons, or alkenyl having 2 to 12 carbons in which at least one hydrogen is replaced by fluorine. Preferred $R^{6A}$ and $R^{6B}$ are alkenyl having 2 to 12 carbons for decreasing the viscosity, or are alkyl having 1 to 12 carbons for improving the stability to UV light or the stability to heat.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

The preferred configuration of —CH═CH— in alkenyl depends on the position of the double bond. The trans configuration is preferred in alkenyl having a double bond at an odd-numbered position, such as —CH═CHCH$_3$, —CH═CHC$_2$H$_5$, —CH═CHC$_3$H$_7$, —CH═CHC$_4$H$_9$, —C$_2$H$_4$CH═CHCH$_3$ and —C$_2$H$_4$CH═CHC$_2$H$_5$. The cis configuration is preferred in alkenyl having a double bond at an even-numbered position, such as —CH$_2$CH═CHCH$_3$, —CH$_2$CH═CHC$_2$H$_5$ and —CH$_2$CH═CHC$_3$H$_7$. An alkenyl compound having the preferred configuration has a high maximum temperature or a wide temperature range of the liquid crystal phase. The detailed description is found in Mol. Cryst. Liq. Cryst., 1985, 131, 109 and Mol. Cryst. Liq. Cryst., 1985, 131, 327.

Preferred examples of alkenyl in which at least one hydrogen is replaced by fluorine are 2,2-difluorovinyl, 3,3-difluoro-2-propenyl, 4,4-difluoro-3-butenyl, 5,5-difluoro-4-pentenyl and 6,6-difluoro-5-hexenyl. Further preferred examples are 2,2-difluorovinyl and 4,4-difluoro-3-butenyl for decreasing the viscosity.

Ring C and ring D are independently 1,4-cyclohexylene, 1,4-phenylene, 2-fluoro-1,4-phenylene, 3-fluoro-1,4-phenylene or 2,5-difluoro-1,4-phenylene, and arbitrary two rings C when r is 2 or more may be identical or different. Preferred ring C and ring D are 1,4-phenylene or 3-fluoro-1,4-phenylene for increasing the optical anisotropy, or are 1,4-cyclohexylene for decreasing the viscosity.

$Z^{61}$ is independently a single bond, ethylene, —COO— or —OCO—, arbitrary two $Z^{13}$ when r is 2 or more may be identical or different. Preferred $Z^{61}$ is a single bond for decreasing the viscosity.

Preferred compounds of formula (6) are represented by formulas (6-1) to (6-13).

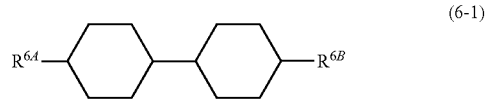

(6-1)

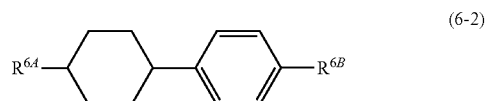

(6-2)

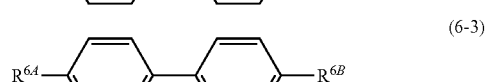

(6-3)

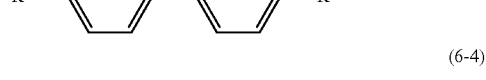

(6-4)

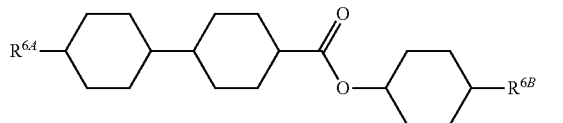

(6-5)

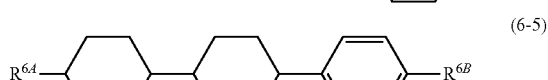

(6-6)

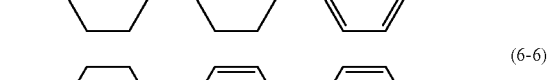

(6-7)

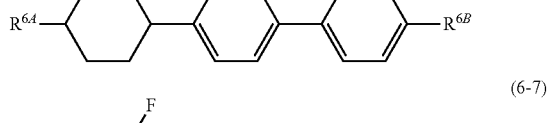

(6-8)

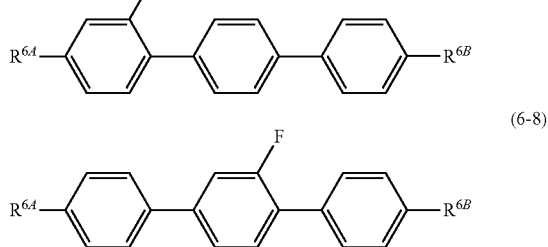

-continued (6-9)
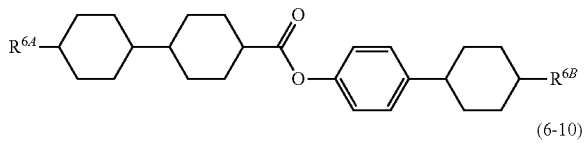

(6-10)
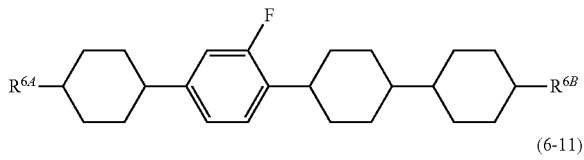

(6-11)
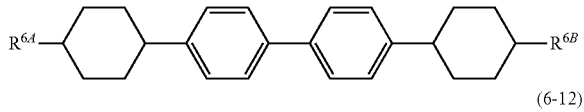

(6-12)
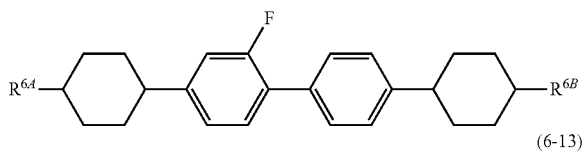

(6-13)
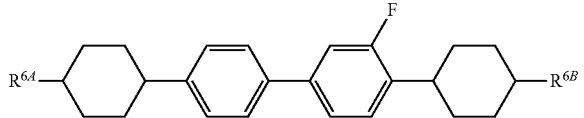

In formulas (6-1) to (6-13), $R^{6A}$ and $R^{6B}$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine. The compounds represented by formulas (6-1) to (6-3) have a low viscosity, the compounds represented by formulas (6-4) and (6-8) have a high clearing point, and the compounds represented by formulas (6-9) to (6-13) have a very high clearing point.

7. Compound (7)

A seventh embodiment of the liquid crystal composition according to the invention is a composition containing a seventh component of the achiral component T including at least one compound selected from the group of compounds represented by formula (7), and the first component. The liquid crystal composition may further contain the second component to the sixth component in addition to the seventh component and the first component.

The compound represented by formula (7) will be explained.

(7)
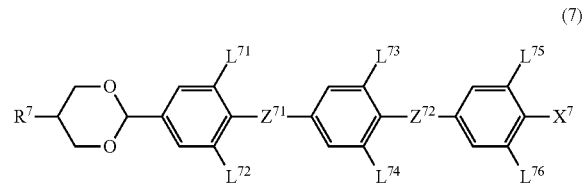

In formula (7), $R^7$ is hydrogen or alkyl having 1 to 20 carbons, at least one —CH$_2$— in the alkyl may be replaced by —O—, —S—, —COO— or —OCO—, at least one —CH$_2$—CH$_2$— in the alkyl may be replaced by —CH=CH—, —CF=CF— or —C≡C—, and in the alkyl, the group formed by replacing at least one —OH$_2$— in the alkyl by —O—, —S—, —COO— or —OCO—, or the group formed by replacing at least one —CH$_2$—CH$_2$— in the alkyl by —CH=CH—, —CF=CF— or —C≡C—, at least one hydrogen may be replaced by halogen, provided that in $R^7$, —O— and —CH=CH— are no adjacent and —CO— and —CH=CH— are no adjacent; $L^{71}, L^{72}, L^{73}, L^{74}, L^{75}$ and $L^{76}$ are independently hydrogen or fluorine; $Z^{71}$ and $Z^{72}$ are each independently a single bond or —CF$_2$O—, provided that at least one thereof is —CF$_2$O—; and $X^7$ is hydrogen, halogen, —SF$_5$ or alkyl having 1 to 10 carbons, at least one —CH$_2$— in the alkyl may be replaced by —O—, —S—, —COO— or —OCO—, at least one —CH$_2$—CH$_2$— in the alkyl may be replaced by —CH=CH—, —CF=CF— or —C≡C—, and in the alkyl, the group formed by replacing at least one —CH$_2$— in the alkyl by —O—, —S—, —COO— or —OCO—, or the group formed by replacing at least one —CH$_2$—CH$_2$— in the alkyl by —CH=CH—, —CF=CF— or —C≡C—, at least one hydrogen may be replaced by halogen, provided that in $X^7$, —O— and —CH=CH— are not adjacent and —CO— and —CH=CH— are not adjacent.

The preferred configuration of —CH=CH— in alkenyl depends on the position of the double bond. The trans configuration is preferred in alkenyl having a double bond at an odd-numbered position, such as —CH=CHCH$_3$, —CH=CHC$_2$H$_5$, —CH=CHC$_3$H$_7$, —CH=CHC$_4$H$_9$, —C$_2$H$_4$CH=CHCH$_3$ and —C$_2$H$_4$CH=CHC$_2$H$_5$. The cis configuration is preferred in alkenyl having a double bond at an even-numbered position, such as —CH$_2$CH=CHCH$_3$, —CH$_2$CH=CHC$_2$H$_5$ and —CH$_2$CH=CHC$_3$H$_7$. An alkenyl compound having the preferred configuration has a high maximum temperature or a wide temperature range of the liquid crystal phase. The detailed description is found in Mol. Cryst. Liq. Cryst., 1985, 131, 109 and Mol. Cryst. Liq. Cryst., 1985, 131, 327.

Specific examples of alkyl include —CH$_3$, —C$_2$H$_5$, —C$_3$H$_7$, —C$_4$H$_9$, —C$_5$H$_{11}$, —C$_6$H$_{13}$, —C$_7$H$_{15}$, —C$_8$H$_{17}$, —C$_9$H$_{19}$, —C$_{10}$H$_{21}$, —C$_{12}$H$_{25}$, —C$_{13}$H$_{27}$, —C$_{14}$H$_{29}$ and —C$_{15}$H$_{31}$.

Specific examples of alkoxy include —OCH$_3$, —OC$_2$H$_5$, —OC$_3$H$_7$, —OC$_4$H$_9$, —OC$_5$H$_{11}$, —OC$_6$H$_{13}$, —OC$_7$H$_{15}$, —OC$_8$H$_{17}$, —OC$_9$H$_{19}$, —OC$_{10}$H$_{21}$, —OC$_{11}$H$_{23}$, —OC$_{12}$H$_{25}$, —OC$_{13}$H$_{27}$ and —OC$_{14}$H$_{29}$.

Specific examples of alkoxyalkyl include —CH$_2$OCH$_3$, —CH$_2$OC$_2$H$_5$, —CH$_2$OC$_3$H$_7$, —(CH$_2$)$_2$—OCH$_3$, —(CH$_2$)$_2$OC$_2$H$_5$, —(CH$_2$)$_2$—OC$_3$H$_7$, —(CH$_2$)$_3$—OCH$_3$, —(CH$_2$)$_4$—OCH$_3$ and —(CH$_2$)$_5$—OCH$_3$.

Specific examples of alkenyl include —CH=CH$_2$, —CH=CHCH$_3$, —CH$_2$CH=CH$_2$, —CH=CHC$_2$H$_5$, —CH$_2$CH=CHCH$_3$, —(CH$_2$)$_2$—CH=CH$_2$, —CH=CHC$_3$H$_7$, —CH$_2$CH=CHC$_2$H$_5$, —(CH$_2$)$_2$—CH=CHCH$_3$ and —(CH$_2$)$_3$—CH=CH$_2$.

Specific examples of alkenyloxy include —OCH$_2$CH=CH$_2$, —OCH$_2$CH=CHCH$_3$ and —OCH$_2$CH=CHC$_2$H$_5$.

Specific examples of alkynyl include —C≡CH, —C≡CCH$_3$, —CH$_2$C≡CH, —C≡CC$_2$H$_5$, —CH$_2$C≡CCH$_3$, —(CH$_2$)$_2$C≡CH, —C≡CC$_3$H$_7$, —CH$_2$C≡CC$_2$H$_5$, —(CH$_2$)$_2$—C≡CCH$_3$ and —C≡C(CH$_2$)$_5$.

In formula (7), $X^7$ is hydrogen, halogen, —SF$_5$ or alkyl having 1 to 10 carbons, at least one —CH$_2$— in the alkyl may be replaced by —O—, —S—, —COO— or —OCO—, at least one —CH$_2$—CH$_2$— in the alkyl may be replaced by —CH=CH—, —CF=CF— or —C≡C—, and in the alkyl, the group formed by replacing at least one —CH$_2$— in the alkyl by —O—, —S—, —COO— or —OCO—, or the group formed by replacing at least one —CH$_2$—CH$_2$— in the alkyl by —CH═CH—, —CF═CF— or —C≡C—, at least one hydrogen may be replaced by fluorine, provided that in X$^7$, —O— and —CH═CH— are not adjacent and —CO— and —CH═CH— are not adjacent.

Specific examples of alkyl in which at least one hydrogen is replaced by fluorine include —CHF$_2$, —CF$_3$, —CF$_2$CH$_2$F, —CF$_2$CHF$_2$, —CH$_2$CF$_3$, —CF$_2$CF$_3$, —(CH$_2$)$_3$—F, —(CF$_2$)$_3$—F, —CF$_2$CHFCF$_3$ and —CHFCF$_2$CF$_3$.

Specific examples of alkoxy in which at least one hydrogen is replaced by fluorine include —OCHF$_2$, —OCF$_3$, —OCF$_2$CH$_2$F, —OCF$_2$CHF$_2$, —OCH$_2$CF$_3$, —O—(CF$_2$)$_3$—F, —OCF$_2$CHFCF$_3$ and —OCHFCF$_2$CF$_3$.

Specific examples of alkenyl in which at least one hydrogen is replaced by fluorine include —CH═CF$_2$, —CF═CHF, —CH═CHCH$_2$F, —CH═CHCF$_3$, —(CH$_2$)$_2$—CH═CF$_2$, —CH$_2$CH═CHCF$_3$ and —CH═CHCF$_2$CF$_3$.

Specific examples of preferred X$^7$ include fluorine, chlorine, —CF$_3$, —CHF$_2$, —OCF$_3$ and —OCHF$_2$. Examples of further preferred X$^7$ are fluorine, chlorine, —CF$_3$ and —OCF$_3$. When X$^7$ is chlorine or fluorine, compound (7) has a low melting point, and a particularly excellent compatibility with other liquid crystal compounds. When X$^7$ is —CF$_3$, —CHF$_2$, —OCF$_3$ and —OCHF$_2$, compound (7) shows a particularly large dielectric anisotropy.

Preferred compounds of formula (7) are represented by formulas (7-1) to (7-3).

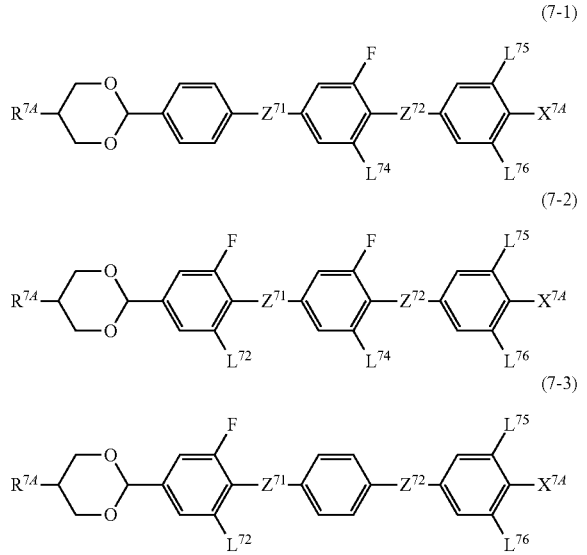

In formulas (7-1) to (7-3), R$^{74}$ is alkyl having 1 to 12 carbons, alkoxy having 1 to 12 carbons, alkenyl having 2 to 12 carbons, or alkenyl having 2 to 12 carbons in which at least one hydrogen is replaced by fluorine; L$^{72}$, L$^{74}$, L$^{75}$ and L$^{76}$ are independently hydrogen or fluorine; Z$^{71}$ and Z$^{72}$ are each independently a single bond or —CF$_2$O—, but at least one thereof is —CF$_2$O—; and X$^{74}$ is fluorine, chlorine, —CF$_3$ or —OCF$_3$.

Among the compounds represented by formulas (7-1) and (7-3), further preferred compounds are represented by formulas (7-1-1), (7-1-2), (7-2-1) to (7-2-5), (7-3-1) and (7-3-2). Still further preferred compounds are represented by formulas (7-2-1) to (7-2-5).

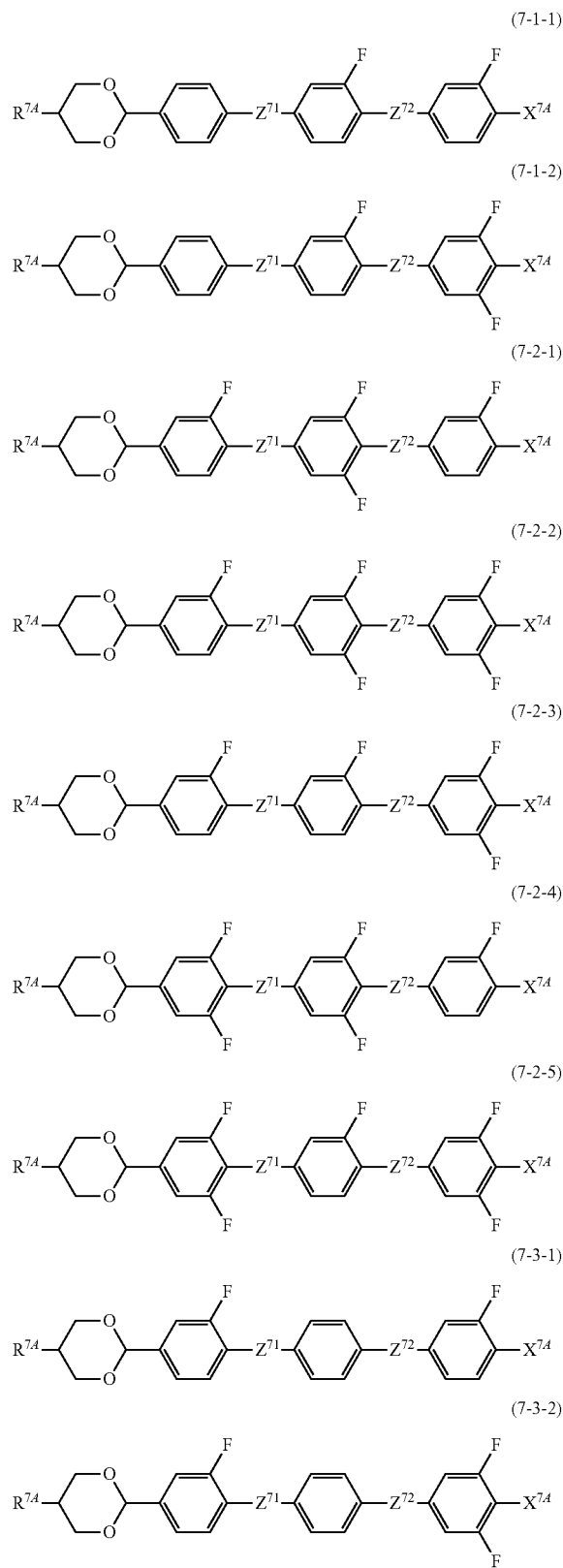

In the formulas, R$^{74}$, Z$^{71}$, Z$^{72}$ and X$^{74}$ are defined as above. In the scope of the formulas, furthermore preferred compounds are (7-2-2-1) and (7-2-5-1).

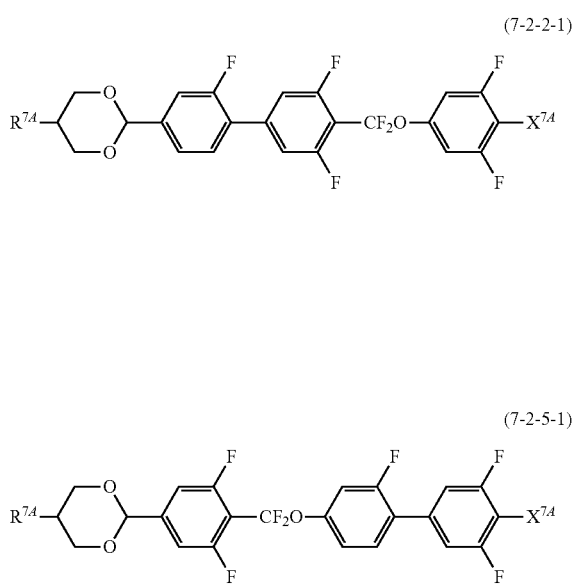

(7-2-2-1)

(7-2-5-1)

In the formulas, $R^{7A}$ is alkyl having 1 to 12 carbons, alkoxy having 1 to 12 carbons, alkenyl having 2 to 12 carbons, or alkenyl having 2 to 12 carbons in which at least one hydrogen is replaced by fluorine; and $X^{7A}$ is fluorine, chlorine or —$CF_3$.

7-2. Properties of Compound (7)

Compound (7) used in the invention will be explained in more details. Compound (7) is a liquid crystal compound having a dioxane ring, three benzene rings and at least one —$CF_2O$— linking group. The compound is significantly physically and chemically stable under conditions in which the device is ordinarily used, and has a relatively good compatibility with other liquid crystal compounds even though having a high clearing point. A composition containing the compound is stable under conditions in which the device is ordinarily used. Accordingly, the temperature range of the optically isotropic liquid crystal phase of the composition can be extended, and the composition can be used in the form of a display device in a wide temperature range. Furthermore, the compound is useful as a component for decreasing the driving voltage of the composition to be driven in the optically isotropic liquid crystal phase. Moreover, if a blue phase is exhibited by a composition prepared using compound (7) and the chiral agent, a uniform blue phase without coexistence of the N* phase or the isotropic phase is easily exhibited. More specifically, compound (7) easily develops a uniform blue phase. Moreover, compound (7) has a very large dielectric anisotropy.

When the right-terminal group $X^7$ is fluorine, chlorine, —$SF_5$, —$CF_3$, —$OCF_3$ or —CH=CH—$CF_3$, compound (7) has a large dielectric anisotropy. When $X^7$ is fluorine, —$CF_3$ or —$OCF_3$, compound (7) is chemically stable.

The seventh component of the achiral component T is suitable for preparation of a composition having a large dielectric anisotropy. The preferred content of the seventh component is preferably about 5.0 to 80 wt %, further preferably 20 to 75 wt % and particularly preferably about 30 to 75 wt % based on the total weight of the achiral component T, for decreasing the driving voltage.

Compound (7) used for the invention may be applied in one kind or two or more kinds.

7-3. Synthesis of Compound (7)

Next, a synthesis of compound (7) will be explained. Compound (7) can be prepared by suitably combining techniques in synthetic organic chemistry. Methods for introducing objective terminal group, ring and bonding group into a starting material are described in Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Koza in Japanese) (Maruzen Co., Ltd.), or the like.

For example, the compound represented by formula (7) according to the invention can be prepared even by correspondingly applying the method described in JP 2959526 B.

The liquid crystal composition of the invention is prepared by a publicly known method, for example, a method that dissolves required components under a high temperature.

8 Composition Having Optically Isotropic Liquid Crystal Phase 8.1 Formulation of Composition Having Optically Isotropic Liquid Crystal Phase An eighth embodiment of the invention is a composition containing the achiral component T and the chiral agent, and a liquid crystal composition that can be used in the optical device to be driven in an optically isotropic liquid crystal phase. The achiral component T contains component A including the compound represented by formula (1) and, as additional components, the compound represented by formula (2), (3), (5) or (7). The achiral component T contains, in addition to component A, a compound selected from the group of the fourth component of the achiral component T represented by formula (4) and the sixth component represented by formula (6), if required. The liquid crystal composition of the invention exhibits an optically isotropic liquid crystal phase. The achiral component T and the chiral agent according to the invention are preferably formed of compounds selected from compounds having no radically polymerizable group.

The content of the compound represented by formula (1) may be 3 to 80 wt % based on the total weight of the achiral component T, the content of the compound represented by formula (2) may be 0.5 to 70 wt % based on the total weight of the achiral component T, the content of the compound represented by formula (3) may be 0.5 to 70 wt % based on the total weight of the achiral component T, the content of the fourth component represented by formula (4) may be 5 to 40 wt % based on the total weight of the achiral component T, the content of the fifth component represented by formula (5) may be 1 to 50 wt % based on the total weight of the achiral component T, the content of the sixth component represented by formula (6) may be 0 to 40 wt % based on the total weight of the achiral component T, and the content of the seventh component represented by formula (7) may be 5 to 80 wt % based on the total weight of the achiral component T.

The content of the chiral agent is 1 to 40 wt % based on the total weight of the liquid crystal composition.

8-2. Chiral Agent

The chiral agent contained in the optically isotropic liquid crystal composition is an optically active compound, and is preferably a compound having a large helical twisting power. When a compound having the large helical twisting power is used, the amount of addition required for obtaining a desired pitch can be reduced. Therefore, a rise in the driving voltage can be suppressed, and the compound is advantageous in practical use. Specifically, compounds represented by formulas (K1) to (K5) below are preferred.

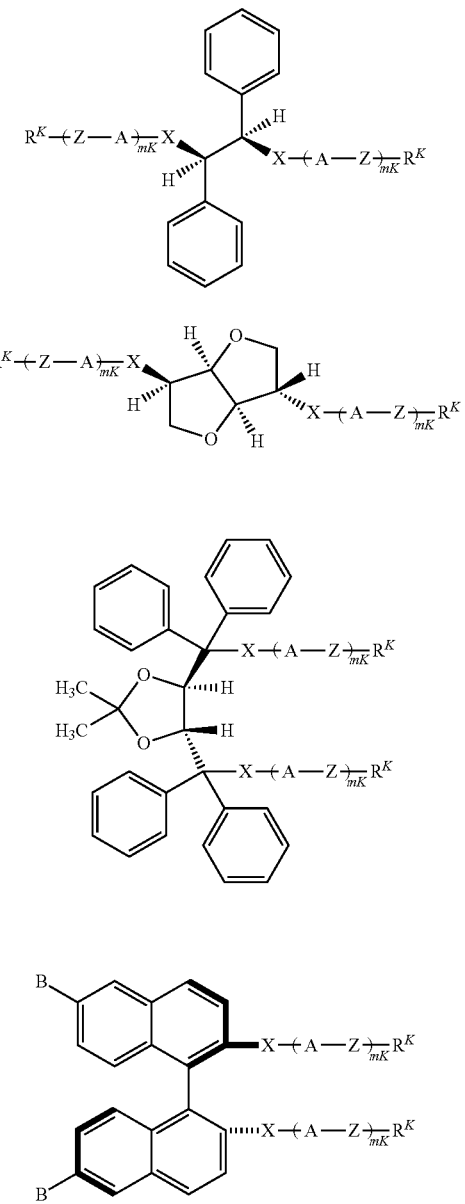

(K1)

(K2)

(K3)

(K4)

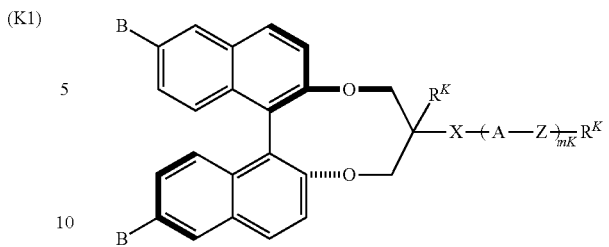

(K5)

In formulas (K1) to (K5), $R^K$ is independently hydrogen, halogen, —C≡N, —N═C═O, —N═C═S or alkyl having 1 to 20 carbons, at least one —CH$_2$— in the alkyl may be replaced by —O—, —S—, —COO— or —OCO—, at least one —CH$_2$—CH$_2$— in the alkyl may be replaced by —CH═CH—, —CF═CF— or —C≡C—, and at least one hydrogen in the alkyl may be replaced by halogen; each A is independently an aromatic six- to eight-membered ring, a non-aromatic three- to eight-membered ring, or a fused ring having 9 or more carbons, and in the rings, at least one hydrogen may be replaced by halogen, or alkyl or haloalkyl each having 1 to 3 carbons, —CH$_2$— may be replaced by —O—, —S— or —NH—, and —CH═ may be replaced by —N═; each B is independently hydrogen, halogen, alkyl having 1 to 3 carbons, haloalkyl having 1 to 3 carbons, an aromatic six- to eight-membered ring, a non-aromatic three- to eight-membered ring, or a fused ring having 9 or more carbons, and in the rings, at least one hydrogen may be replaced by halogen, or alkyl or haloalkyl each having 1 to 3 carbons, —CH$_2$— may be replaced by —O—, —S— or —NH—, and —CH═ may be replaced by —N═; each Z is independently a single bond or alkylene having 1 to 8 carbons, and in the alkylene, at least one —CH$_2$— may be replaced by —O—, —S—, —COO—, —OCO—, —CSO—, —OCS—, —N═N—, —CH═N— or —N═CH—, at least one —CH$_2$—CH$_2$— may be replaced by —CH═CH—, —CF═CF— or —C≡C—, and at least one hydrogen may be replaced by halogen; X is a single bond, —COO—, —OCO—, —CH$_2$O—, —OCH$_2$—, —CF$_2$O—, —OCF$_2$— or —CH$_2$CH$_2$—; and mK is 1 to 4.

Among the compounds, as the chiral agent to be added to the liquid crystal composition, the compounds represented by formula (K2-1) to formula (K2-8) included in formula (K2), the compounds represented by formula (K4-1) to formula (K4-6) included in formula (K4), and the compounds represented by formula (K5-1) to formula (K5-3) included in formula (K5) are further preferred, and the compounds represented by formula (K4-1) to formula (K4-6) and formula (K5-1) to formula (K5-3) are still further preferred.

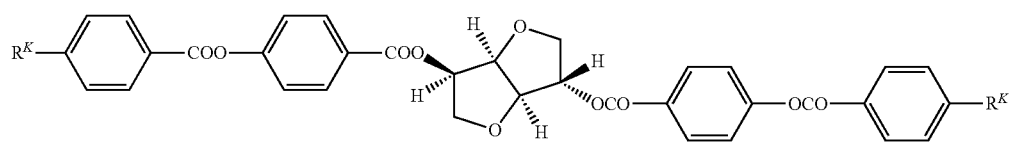

(K2-1)

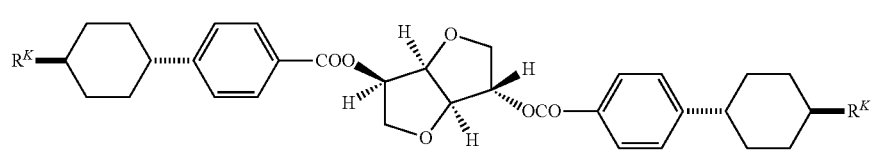

(K2-2)

-continued
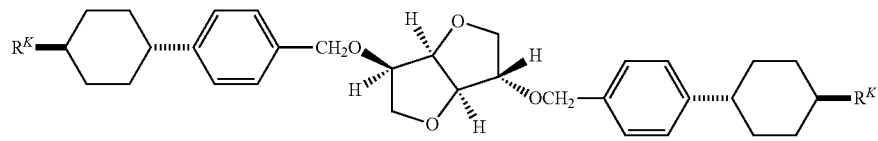
(K2-3)
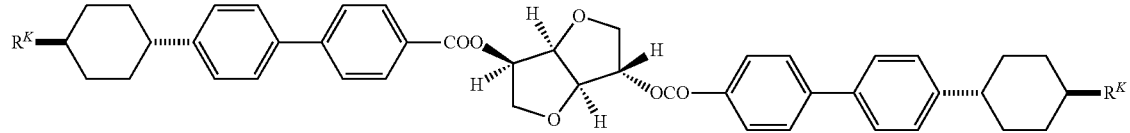
(K2-4)
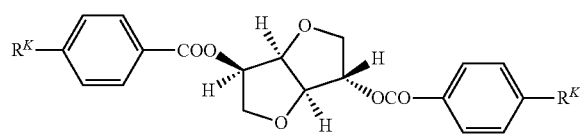
(K2-5)
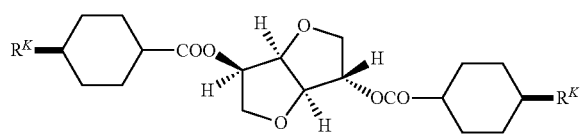
(K2-6)
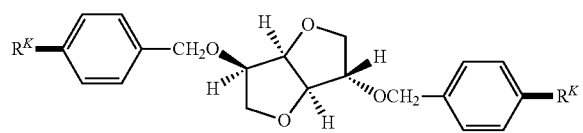
(K2-7)
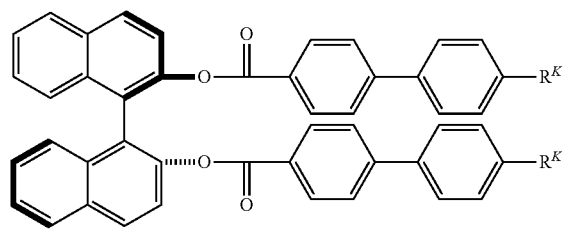
(K4-1)
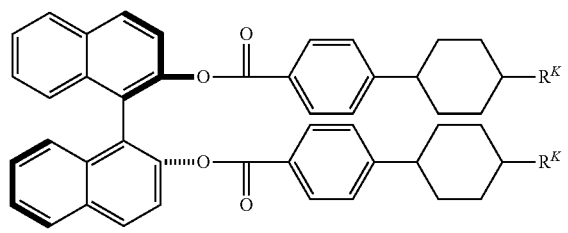
(K4-2)
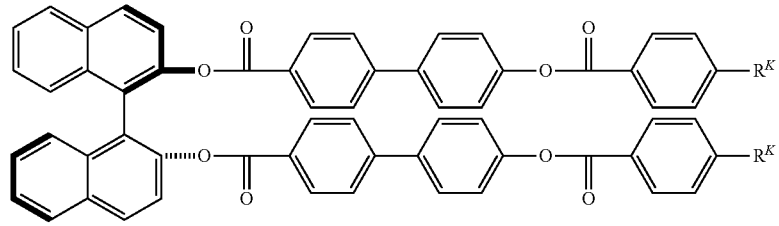
(K4-3)
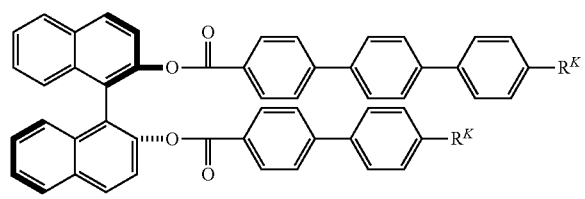
(K4-4)
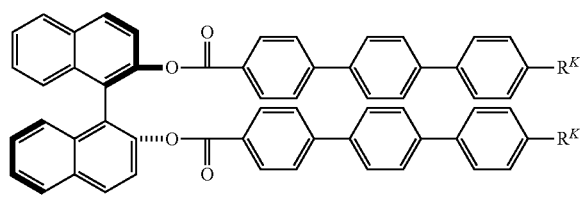
(K4-5)
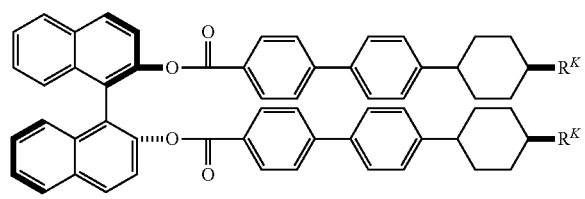
(K4-6)
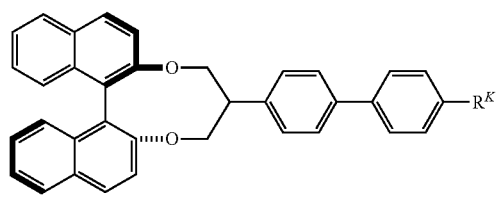
(K5-1)

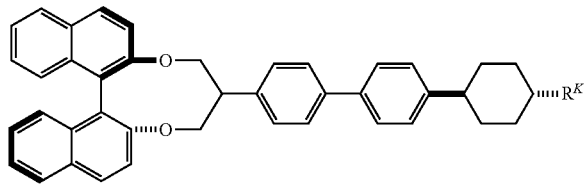 (K5-2)

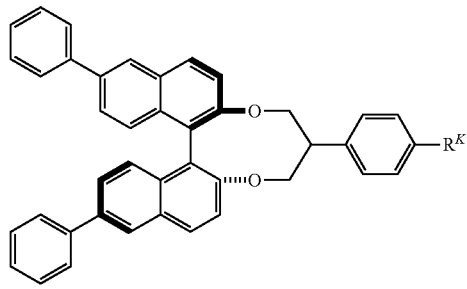 (K5-3)

wherein $R^K$ is independently alkyl having 3 to 10 carbons or alkoxy having 3 to 10 carbons, and at least one —$CH_2$—$CH_2$— in the alkyl or the alkoxy may be replaced by —CH=CH—.

The chiral agent to be contained in the liquid crystal composition may be applied in one kind or two or more kinds.

The chiral agent is preferably contained in an amount of preferably 1 to 40 wt %, further preferably 3 to 25 wt % and most preferably 5 to 25 wt %, based on the total weight of the liquid crystal composition. A liquid crystal composition containing the chiral agent in the above ranges easily exhibits an optically isotropic liquid crystal phase, and is preferred.

8-3. Optically Isotropic Liquid Crystal Phase

The expression "liquid crystal composition has optical isotropy" means that the liquid crystal composition shows optical isotropy because the macroscopic arrangement of liquid crystal molecules is isotropic, while liquid crystal order is present microscopically. "Pitch of the liquid crystal order that the liquid crystal composition microscopically has (hereinafter, occasionally referred to as a pitch)" is preferably 700 nm or less, further preferably 500 nm or less, and most preferably 350 nm or less.

Here, "non-liquid crystal isotropic phase" means a generally defined isotropic phase, more specifically, a disordered phase, and an isotropic phase in which, even if an area in which a local order parameter is not zero is produced by a fluctuation. For example, the isotropic phase exhibited on the higher temperature side of the nematic phase corresponds to the non-liquid crystal isotropic phase herein. A similar definition is applied to chiral liquid crystals herein. Then, "optically isotropic liquid crystal phase" herein means a phase that exhibits an optically isotropic liquid crystal phase not caused by fluctuation. One example is a phase that exhibits a platelet texture (blue phase in a narrow sense).

In the optically isotropic liquid crystal composition of the invention, the platelet texture typical to the blue phase is occasionally not observed in a polarizing microscope, although the liquid crystal composition has an optically isotropic liquid crystal phase. Then, the phase that exhibits the platelet texture is herein referred to as the blue phase, and the optically isotropic liquid crystal phase including the blue phase is referred to as the optically isotropic liquid crystal phase. More specifically, the blue phase is included in the optically isotropic liquid crystal phase.

In general, the blue phases are classified into three kinds, namely, blue phase I, blue phase II and blue phase III, and all of the three kinds of blue phases are optically active and also isotropic. In the blue phase of blue phase I or blue phase II, two or more kinds of diffracted light resulting from Bragg reflection from different lattice planes are observed. The blue phase is generally observed between the non-liquid crystal isotropic phase and a chiral nematic phase.

"State in which the optically isotropic liquid crystal phase does not show diffracted light having two or more colors" means that the optically isotropic liquid crystal phase has almost monochrome in everywhere in which the platelet texture to be observed in blue phase I and blue phase II is not observed. In the optically isotropic liquid crystal phase that shows no diffracted light having two or more colors, uniformity of contrast in the plane is unnecessary.

The optically isotropic liquid crystal phase that shows no diffracted light having two or more colors has advantages that the intensity of reflected light by Bragg reflection is suppressed, or the reflected light is shifted to the lower wavelength side.

Moreover, in a liquid crystal material that reflects visible light, color may occasionally become a problem when the liquid crystal material is utilized in the form of the display device. However, in the liquid crystals that show no diffracted light having two or more colors, the reflection wavelength is shifted to the lower wavelength side. Therefore, reflection of visible light is allowed to disappear by a pitch longer than the pitch of the blue phase in a narrow sense (the phase that exhibits the platelet texture).

The optically isotropic liquid crystal composition of the invention can be obtained by adding a chiral agent to a composition having a nematic phase. On the occasion, the chiral agent is preferably added in a concentration that makes the pitch become 700 nanometers or less. In addition, the composition having a nematic phase contains the compound represented by formula (1), and, if required, any other component. The optically isotropic liquid crystal composition of the invention also has a chiral nematic phase, and can also be obtained by adding a chiral agent to a composition having no optically isotropic liquid crystal phase. In addition, the composition having a chiral nematic phase but no optically isotropic liquid crystal phase contains the compound represented by formula (1), an optically active compound, and, if required, any other component. On the occasion, the optically active compound is added in a concentration that makes the pitch become 700 nm or more in order to avoid exhibition of an optically isotropic liquid crystal phase. Herein, as the optically active compound to be added, the compounds represented by formulas (K1) to (K5) as the compound having a large helical twisting power can be used. Further preferably, the compounds represented by formulas (K2-1) to (K2-8), formulas (K4-1) to (K4-6) and formulas (K5-1) to (K5-3) can be used. Moreover, the optically active compound to be added may have a helical twisting power being not so large. Specific examples of such optically active compounds include compounds to be added to the liquid crystal compositions for use in devices to be driven in the nematic phase (a TN mode or an STN mode).
Specific examples of the optically active compound having a helical twisting power being not so large include optically active compounds (Op-1) to (Op-13) below.
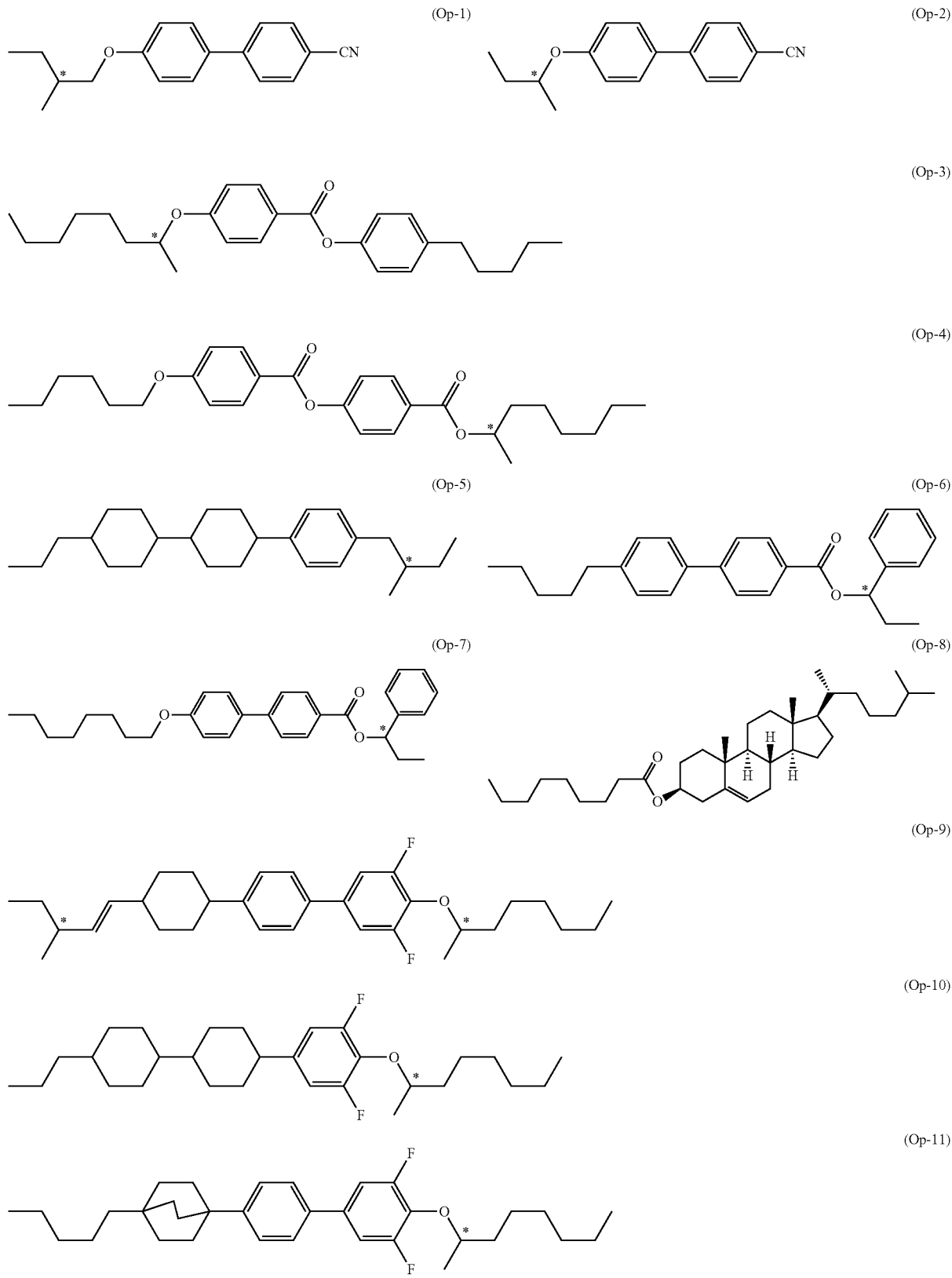

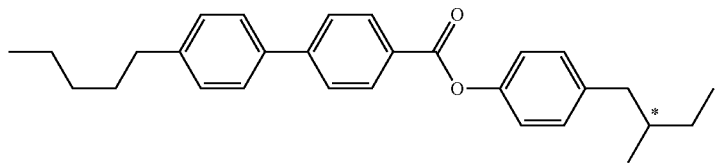
(Op-12)

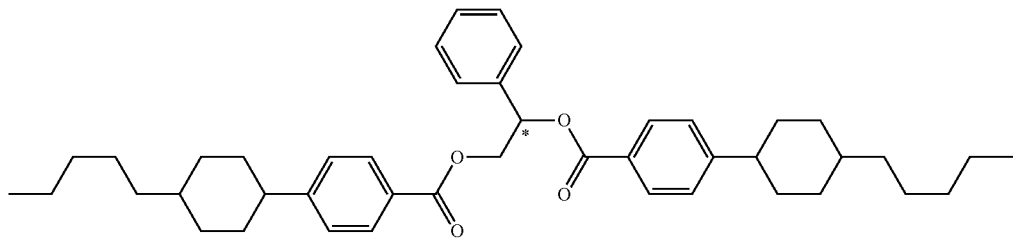
(Op-13)

The temperature range of the optically isotropic liquid crystal composition according to the invention can be extended by adding the chiral agent to a liquid crystal composition having a wide temperature range in which the nematic phase or the chiral nematic phase and the isotropic phase coexist to exhibit the optically isotropic liquid crystal phase. For example, the composition that exhibits the optically isotropic liquid crystal phase in a wide temperature range can be prepared by mixing a liquid crystal compound having a high clearing point and a liquid crystal compound having a low clearing point to prepare a liquid crystal composition having a wide temperature range in which the nematic phase and the isotropic phase coexist, and adding the chiral agent thereto.

As the liquid crystal composition having the wide temperature range in which the nematic phase or the chiral nematic phase and the isotropic phase coexist, a liquid crystal composition having a difference between the maximum temperature and the minimum temperature at which the chiral nematic phase and the non-liquid crystal isotropic phase coexist is 3 to 150° C. is preferred, and a liquid crystal composition having a difference in the range of 5 to 150° C. is further preferred. A compound having a difference between the maximum temperature and the minimum temperature at which the nematic phase and the non-liquid crystal isotropic phase coexist is 3 to 150° C. is also preferred.

If an electric field is applied to a liquid crystal medium of the invention in the optically isotropic liquid crystal phase, electric birefringence is caused, but the birefringence does not necessarily result from the Kerr effect.

The electric birefringence in the optically isotropic liquid crystal phase becomes larger as the pitch becomes longer. Therefore, the electric birefringence can be increased by adjusting the kind and content of the chiral agent to set a long pitch, as long as the demand for other optical characteristics (transmittance, diffraction wavelength and so on) is satisfied.

8-4. Any Other Component

Any other compound such as a polymer material may be further added to the optically isotropic liquid crystal composition of the invention within the range in which the characteristics of the composition are not adversely affected. The liquid crystal composition of the invention may contain, for example, a dichroic dye or a photochromic compound in addition to the polymer material. Specific examples of the dichroic dye include a merocyanine type, a styryl type, an azo type, an azomethine type, an azoxy type, a quinophthalone type, an anthraquinone type and a tetrazine type.

9. Optically Isotropic Polymer/Liquid Crystal Composite Material

A ninth embodiment of the invention is a composite material of a polymer and the liquid crystal composition containing the compound represented by formula (1) and the chiral agent, which shows optical isotropy. The composite material is an optically isotropic polymer/liquid crystal composite material that can be used for the optical device to be driven in an optically isotropic liquid crystal phase. Such a polymer/liquid crystal composite material is constituted of a polymer and the liquid crystal composition according to any one of items 1 to 32 (liquid crystal composition CLC), for example.

"Polymer/liquid crystal composite material" of the invention is not particularly limited as long as the composite material contains both the liquid crystal material and a polymeric compound, but may be in a state in which the polymer and the liquid crystal material cause phase separation in a state in which the polymer is not partially or entirely dissolved into the liquid crystal material. In addition, unless otherwise noted, the nematic phase herein means the nematic phase in a narrow sense without including the chiral nematic phase.

The optically isotropic polymer/liquid crystal composite material according to a preferred embodiment of the invention can exhibit an optically isotropic liquid crystal phase in a wide temperature range. Moreover, the polymer/liquid crystal composite material according to a preferred embodiment of the invention has a very high response speed. Moreover, the polymer/liquid crystal composite material of a preferred embodiment of the invention can be suitably used for optical devices such as display devices, based on the effects thereof.

9-2. Polymer

The composite material of the invention can be manufactured by mixing the optically isotropic liquid crystal composition and a polymer obtained by allowing polymerization in advance, but is preferably manufactured by mixing a low molecular weight monomer, macromonomer, oligomer or the like (hereinafter, collectively referred to as "monomer or the like") as a raw material of the polymer, and the liquid crystal composition CLC, and then performing a polymerization reaction in the mixture. The mixture containing the monomer or the like and the liquid crystal composition is referred to as "polymerizable monomer/liquid crystal mixture" herein. "polymerizable monomer/liquid crystal mixture" may contain, if required, a polymerization initiator, a curing agent, a catalyst, a stabilizer, a dichroic dye or a photochromic compound as described later, in the range in which advantageous effects of the invention are not adversely affected. For example, the polymerizable monomer/liquid crystal mixture of the invention may contain, if required, 0.1 to 20 weight parts of the polymerization initiator based on 100 weight parts of the polymerizable monomer. "Polymerizable monomer/liquid crystal mixture" is essentially a liquid crystal medium when the mixture is polymerized in the blue phase, but when the mixture is polymerized in the isotropic phase, the mixture is not necessary a liquid crystal medium.

The polymerization temperature is preferably a temperature at which the polymer/liquid crystal composite material shows a high transparency and isotropy. It is more preferred that the polymerization temperature is a temperature at which the mixture of the monomer and the liquid crystal material exhibits the isotropic phase or the blue phase, and the polymerization is terminated in the isotropic phase or the optically isotropic liquid crystal phase. More specifically, the polymerization temperature is preferably a temperature at which, after polymerization, the polymer/liquid crystal composite material does not substantially scatter light at the longer-wavelength side of visible light and exhibits an optically isotropic state.

As the raw material of the polymer that constitutes the composite material according to the invention, a low molecular weight monomer, macromonomer or oligomer can be used, for example. The term "raw material monomer of the polymer" herein is used in the meaning including the low molecular weight monomer, macromonomer or oligomer. Moreover, the polymer obtained preferably has a three-dimensional crosslinking structure, and therefore a polyfunctional monomer having two or more polymerizable functional groups is preferably used as the raw material monomer of the polymer. The polymerizable functional group is not particularly limited. Specific examples include an acrylic group, a methacrylic group, a glycidyl group, an epoxy group, an oxetanyl group and a vinyl group, preferably, an acrylic group and a methacrylic group from the viewpoint of the polymerization rate. Among the raw material monomers of the polymer, the content of a monomer having two or more polymerizable functional groups in the monomers is preferably 10 wt % or more to allow the composite material of the invention to easily exhibit high transparency and isotropy.

In order to obtain a suitable composite material, the polymer preferably has a mesogen moiety, and a raw material monomer having the mesogen moiety can be used as a part or the entirety of the raw material monomer of the polymer.

9-2-1. Mono- or Bi-Functional Monomer Having Mesogen Moiety

A monof- or bi-functional monomer having a mesogen moiety is not particularly limited structurally. Specific examples include a compound represented by formula (M1) or formula (M2) below.

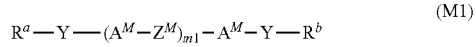
(M1)

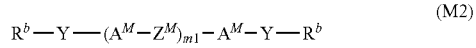
(M2)

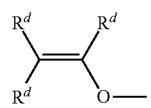
(M3-1)

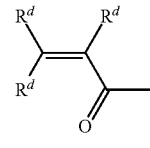
(M3-2)

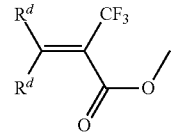
(M3-3)

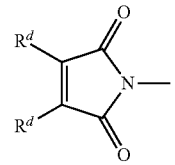
(M3-4)

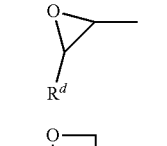
(M3-5)

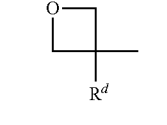
(M3-6)

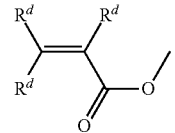
(M3-7)

In formula (M1), $R^a$ is hydrogen, halogen, —C≡N, —N═C═O, —N═C═S or alkyl having 1 to 20 carbons, at least one —CH$_2$— in the alkyl may be replaced by —O—, —S—, —CO—, —COO— or —OCO—, at least one —CH$_2$—CH$_2$— in the alkyl may be replaced by —CH═CH—, —CF═CF— or —C≡C—, and at least one hydrogen in the alkyl may be replaced by halogen or —C≡N. Each $R^b$ is independently a polymerizable group represented by formula (M3-1) to formula (M3-7).

Preferred $R^a$ is hydrogen, halogen, —C≡N, —CF$_3$, —CF$_2$H, —CFH$_2$, —OCF$_3$, —OCF$_2$H, alkyl having 1 to 20 carbons, alkoxy having 1 to 19 carbons, alkenyl having 2 to 21 carbons, and alkynyl having 2 to 21 carbons. Particularly preferred $R^a$ is —C≡N, alkyl having 1 to 20 carbons and alkoxy having 1 to 19 carbons.

In formula (M2), each $R^b$ is independently a polymerizable group represented by formula (M3-1) to formula (M3-7).

In the formulas, each $R^d$ in formulas (M3-1) to (M3-7) is independently hydrogen, halogen or alkyl having 1 to 5 carbons, and at least one hydrogen in the alkyl may be replaced by halogen. Preferred groups $R^d$ are hydrogen, halogen and methyl. Particularly preferred groups $R^d$ are hydrogen, fluorine and methyl.

A monomer represented by formula (M3-2), (M3-3), (M3-4) or (M3-7) is suitably polymerized through radical polymerization. A monomer represented by formula (M3-1), (M3-5) or (M3-6) is suitably polymerized through cationic polymerization. Any polymerization progresses in the form of living polymerization, and therefore starts as long as a small amount of radicals or cation active species is generated in the reaction system. A polymerization initiator can be used in order to accelerate generation of the active species. For example, light or heat can be used to generate the active species.

In formulas (M1) and (M2), $A^M$ is each independently an aromatic or non-aromatic five- or six-membered ring, or a fused ring having 9 or more carbons, —$CH_2$— in the rings may be replaced by —O—, —S—, —NH— or —$NCH_3$—, —CH= in the rings may be replaced by —N=, and a hydrogen atom on the rings may be replaced by halogen, or alkyl or haloalkyl each having 1 to 5 carbons. Specific examples of preferred $A^M$ include 1,4-cyclohexylene, 1,4-cyclohexenylene, 1,4-phenylene, naphthalene-2,6-diyl, tetrahydronaphthalene-2,6-diyl, fluorene-2,7-diyl or bicyclo[2.2.2]octane-1,4-diyl, wherein at least one —$CH_2$— in the rings may be replaced by —O—, at least one —CH= in the rings may be replaced by —N=, and at least one hydrogen in the rings may be replaced by halogen, alkyl having 1 to 5 carbons or haloalkyl having 1 to 5 carbons.

In consideration of the stability of the compound, —$CH_2$—O—$CH_2$—O— in which oxygen and oxygen are not adjacent is preferred to —$CH_2$—O—O—$CH_2$— in which oxygen and oxygen are adjacent. A similar explanation is applied also to sulfur.

Among these kinds of $A^M$, particularly preferred groups $A^M$ are 1,4-cyclohexylene, 1,4-cyclohexenylene, 1,4-phenylene, 2-fluoro-1,4-phenylene, 2,3-difluoro-1,4-phenylene, 2,5-difluoro-1,4-phenylene, 6-difluoro-1,4-phenylene, 2-methyl-1,4-phenylene, 2-trifluoromethyl-1,4-phenylene, 2,3-bis(trifluoromethyl)-1,4-phenylene, naphthalene-2,6-diyl, tetrahydronaphthalene-2,6-diyl, fluorene-2,7-diyl, 9-methylfluorene-2,7-diyl, 1,3-dioxane-2,5-diyl, pyridine-2,5-diyl and pyrimidine-2,5-diyl. In addition, with regard to the configuration of 1,4-cyclohexylene and 1,3-dioxane-2,5-diyl described above, trans is preferred to cis.

Because 2-fluoro-1,4-phenylene is structurally identical with 3-fluoro-1,4-phenylene, the latter is not listed in the specific examples. The rule also applies to the relationship between 2,5-difluoro-1,4-phenylene and 3,6-difluoro-1,4-phenylene, or the like.

In formulas (M1) and (M2), each Y is independently a single bond or alkylene having 1 to 20 carbons. In the alkylene, at least one —$CH_2$— may be replaced by —O— or —S—, and at least one —$CH_2$—$CH_2$— in the alkylene may be replaced by —CH=CH—, —C=C—, —C≡C—, —COO— or —OCO—. Preferred groups Y are a single bond, —$(CH_2)_{m2}$—, —$O(CH_2)_{m2}$— and —$(CH_2)_{m2}O$— (in the formulas, m2 is an integer of 1 to 20). Particularly preferred groups Y are a single bond, —$(CH_2)_{m2}$—, —$O(CH_2)_{m2}$— and —$(CH_2)_{m2}O$— (in the formulas, m2 is an integer of 1 to 10). In consideration of the stability of the compound, —Y—$R^a$ and —Y—$R^b$ preferably does not have —O—O—, —O—S—, —S—O— or —S—S— in the groups.

In formulas (M1) and (M2), $Z^M$ is each independently a single bond, —$(CH_2)_{m3}$—, —$O(CH_2)_{m3}$—, —$(CH_2)_{m3}O$—, —$O(CH_2)_{m3}O$—, —CH=CH—, —C≡C—, —COO—, —OCO—, —$(CF_2)_2$—, —$(CH_2)_2$—COO—, —OCO—$(CH_2)_2$—, —CH=CH—COO—, —OCO—CH=CH—, —C≡C—OCO—, —OCO—C≡C—, —CH=CH—$(CH_2)_2$—, —$(CH_2)_2$—CH=CH—, —CF=CF—, —C≡C—CH=CH—, —CH=CH—C≡C—, —$OCF_2$—$(CH_2)_2$—, —$(CH_2)_2$—$CF_2O$—, —$OCF_2$— or —$CF_2O$— (in the formulas, m3 is an integer of 1 to 20).

Preferred groups $Z^M$ are a single bond, —$(CH_2)_{m3}$—, —$O(CH_2)_{m3}$—, —$(CH_2)_{m3}O$—, —CH=CH—, —C≡C—, —COO—, —OCO—, —$(CH_2)_2$—COO—, —OCO—$(CH_2)_2$—, —CH=CH—COO—, —OCO—CH=CH—, —$OCF_2$— and —$CF_2O$—.

In formulas (M1) and (M2), m1 is an integer of 1 to 6. Preferred m1 is an integer of 1 to 3. When m1 is 1, the monomer is a bicyclic compound having two rings such as six-membered rings. When m1 is 2 or 3, the monomer is a tricyclic compound or a tetracyclic compound, respectively. For example, two groups $A^M$ when m1 is 1 may be identical or different. For example, three groups $A^M$ (or two groups $Z^M$) when m1 is 2 may also be identical or different. When m1 is 3 to 6, the same rule applies. The same rule also applies to $R^a$, $R^b$, $R^d$, $Z^M$, $A^M$ and Y.

If compound (M1) represented by formula (M1) and compound (M2) represented by formula (M2) contain an isotope such as $^2H$ (deuterium) and $^{13}C$ in an amount higher than the natural abundance, they still can be used as having the same characteristics mentioned above.

Further preferred examples of compound (M1) and compound (M2) include compounds (M1-1) to (M1-41) and compounds (M2-1) to (M2-27) as represented by formulas (M1-1) to (M1-41) and (M2-1) to (M2-27), respectively. In the compounds, $R^a$, $R^b$, $R^d$, $Z^M$ and Y are defined in a manner identical with the definitions for formulas (M1) and (M2) as described in the embodiment of the invention.

The partial structures as described below in compounds (M1-1) to (M1-41) and (M2-1) to (M2-27) will be explained. Partial structure (a1) represents 1,4-phenylene in which at least one hydrogen is replaced by fluorine. Partial structure (a2) represents 1,4-phenylene in which at least one hydrogen may be replaced by fluorine. Partial structure (a3) represents 1,4-phenylene in which at least one hydrogen may be replaced by either fluorine or methyl. Partial structure (a4) represents fluorene in which hydrogen on 9-position may be replaced by methyl.

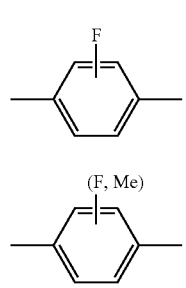

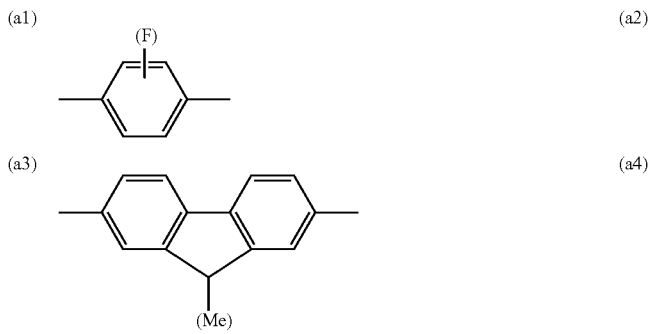

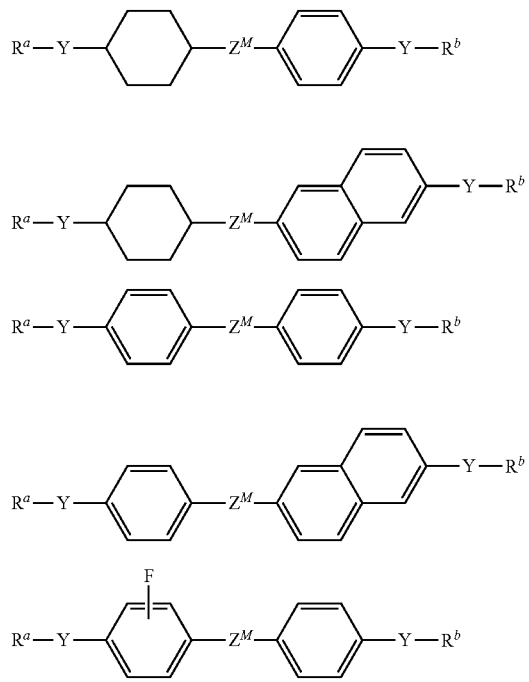

-continued
(M1-23)
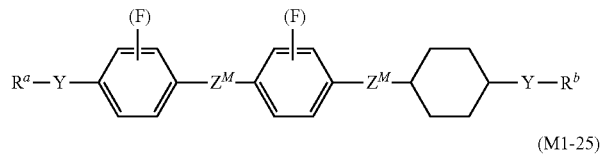
(M1-24)
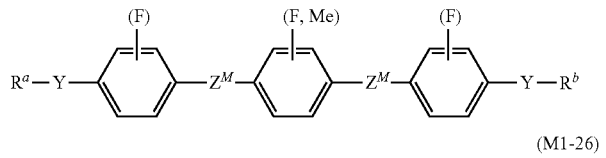
(M1-25)
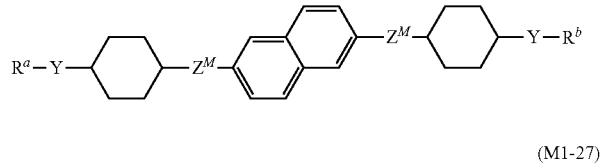
(M1-26)
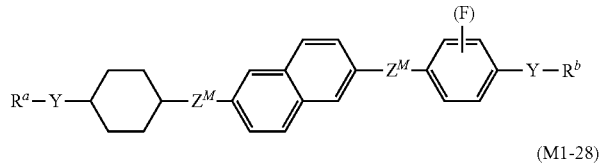
(M1-27)
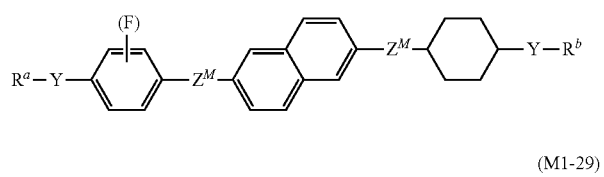
(M1-28)
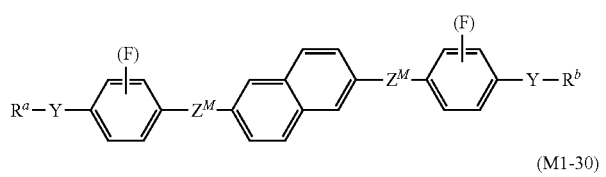
(M1-29)
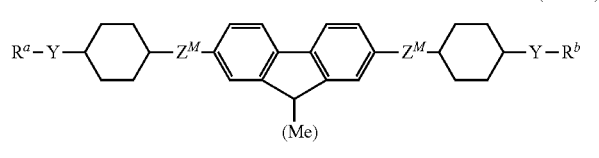
(M1-30)
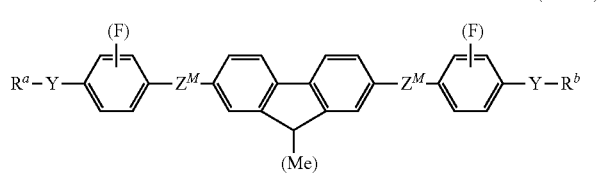
(M1-31)
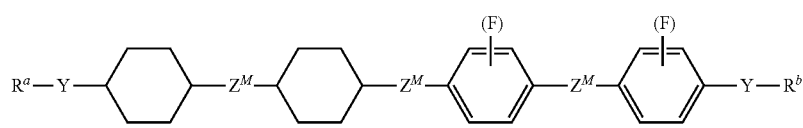
(M1-32)
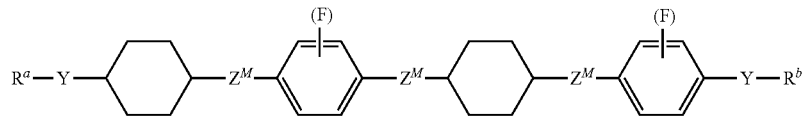
(M1-33)
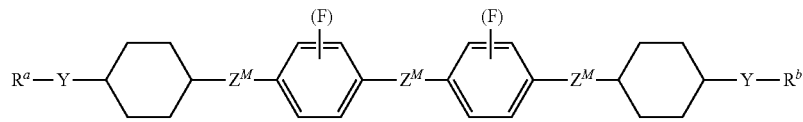
(M1-34)
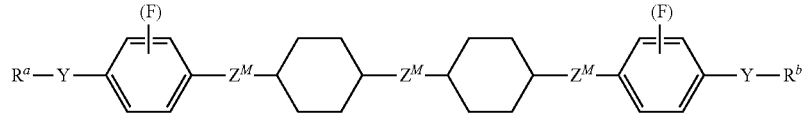
(M1-35)
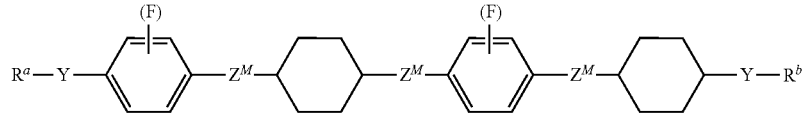
(M1-36)
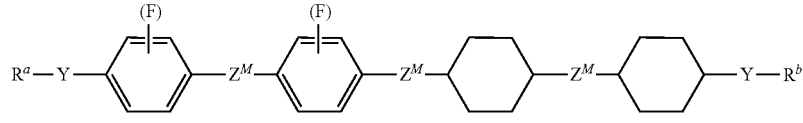
(M1-37)
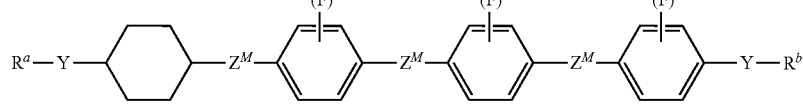

(M1-38)
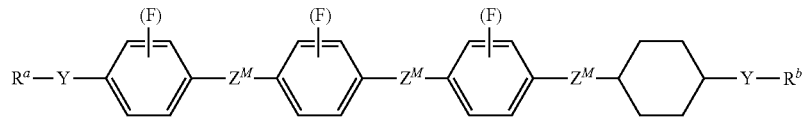
(M1-39)
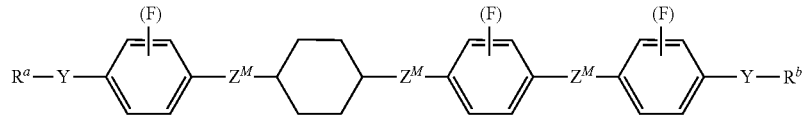
(M1-40)
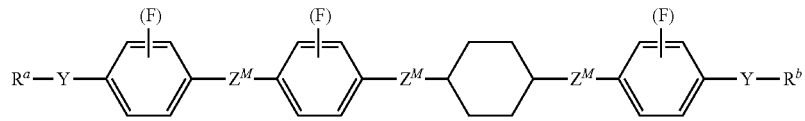
(M1-41)
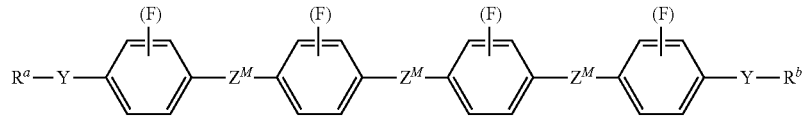
(M2-1)
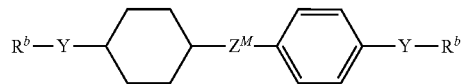
(M2-2)
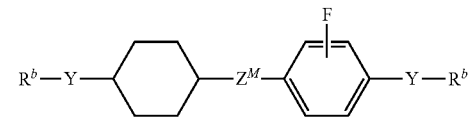
(M2-3)
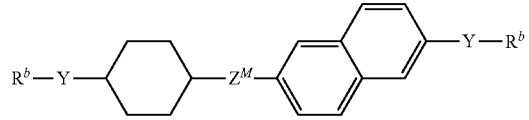
(M2-4)
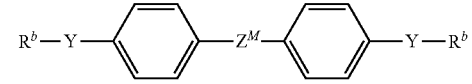
(M2-5)
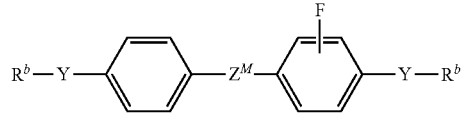
(M2-6)
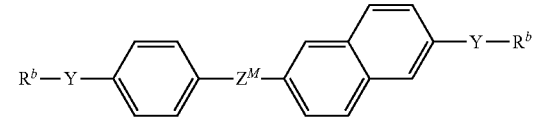
(M2-7)
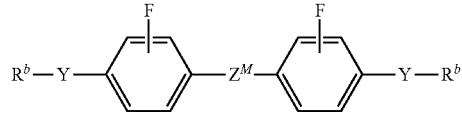
(M2-8)
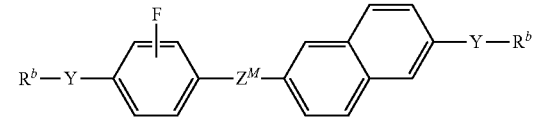
(M2-9)
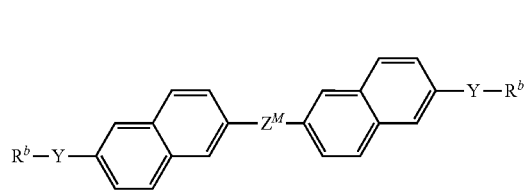
(M2-10)
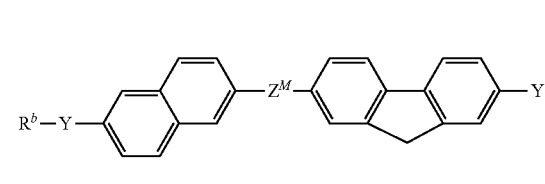
(M2-11)
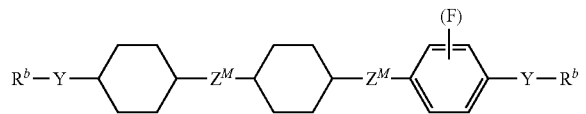
(M2-12)
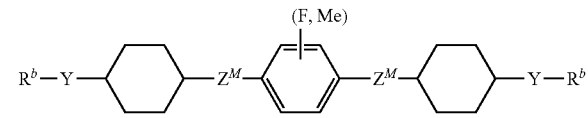
(M2-13)
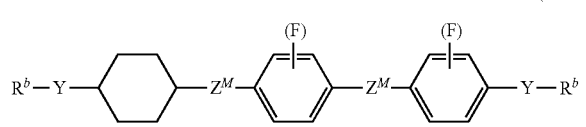
(M2-14)
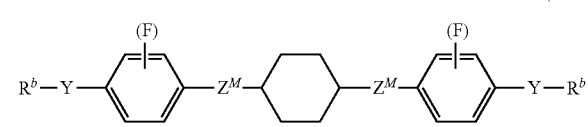

(M2-15)
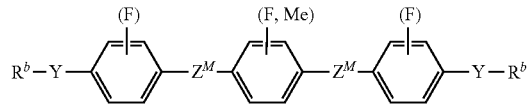

(M2-16)
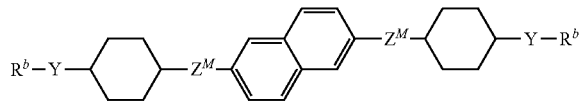

(M2-17)
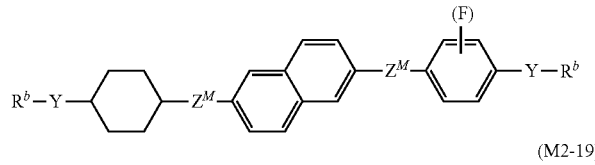

(M2-18)
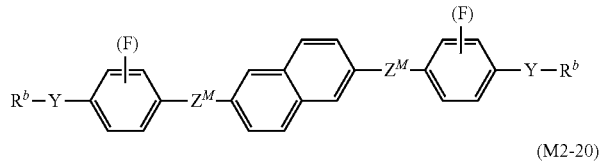

(M2-19)
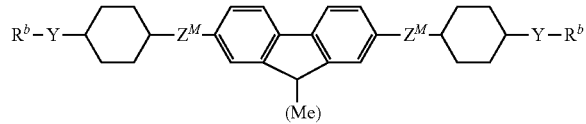

(M2-20)
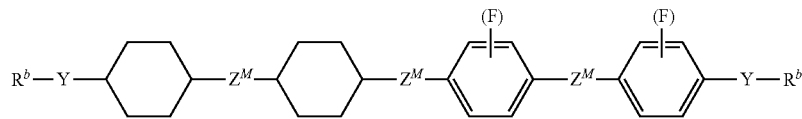

(M2-21)
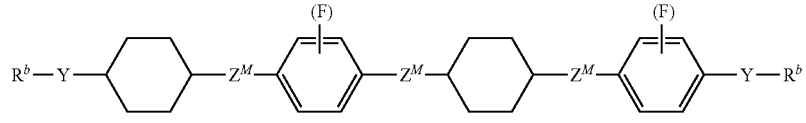

(M2-22)
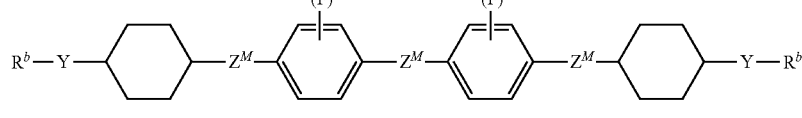

(M2-23)
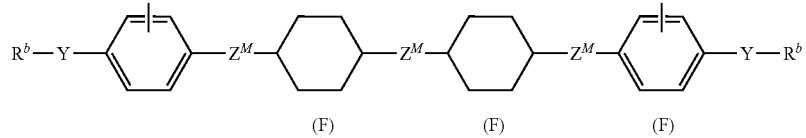

(M2-24)
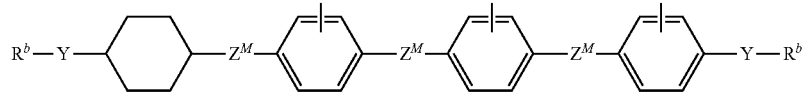

(M2-25)

(M2-26)

(M2-27)
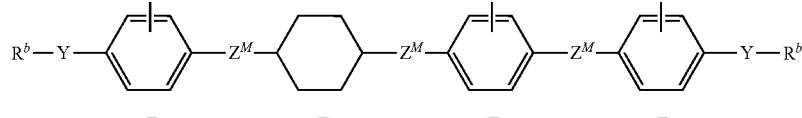

A monomer having no aforementioned mesogen moiety, and a polymerizable compound having a mesogen moiety other than monomers (M1) and (M2) can be used, if required.

For the purpose of optimizing the optical isotropy of the polymer/liquid crystal composite material according to the invention, a monomer having a mesogen moiety and three or more polymerizable functional groups can also be used. As the monomer having a mesogen moiety and three or more polymerizable functional groups, a well-known compound can be suitably used. Specific examples of the compounds are represented by formulas (M4-1) to (M4-3), and further specific examples of the compounds are described in JP 2000-327632 A, JP 2004-182949 A and JP 2004-59772 A. However, in formulas (M4-1) to (M4-3), $R^b$, $Z^M$, Y and (F) are defined as above.

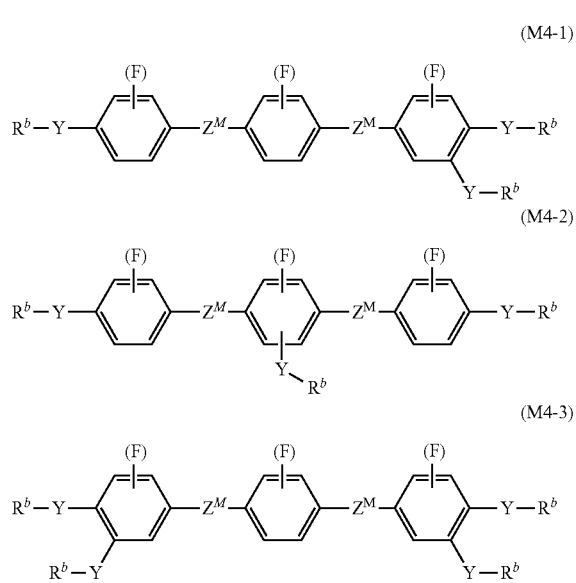

(M4-1)

(M4-2)

(M4-3)

9-2-2. Monomer Having Polymerizable Functional Group but No Mesogen Moiety

Specific examples of monomers having a polymerizable functional group but no mesogen moiety include straight-chain or branched acrylate having 1 to 30 carbons, straight-chain or branched diacrylate having 1 to 30 carbons, and monomers having three or more functional groups, such as glycerol propoxylate (1PO/OH) triacrylate, pentaerythritol propoxylate triacrylate, pentaerythritol triacrylate, trimethylolpropane ethoxylated triacrylate, trimethylolpropane propoxylate triacrylate, trimethylolpropane triacrylate, di(trimethylolpropane)tetraacrylate, pentaerythritol tetraacrylate, di(pentaerythritol)pentaacrylate, di(pentaerythritol)hexaacrylate, trimethylolpropane triacrylate and so on, but the monomers are not limited thereto.

9-2-3. Polymerization Initiator

The polymerization reaction in manufacturing the polymer constituting the composite material according to the invention is not particularly limited. For example, photoradical polymerization, thermal radical polymerization, photocationic polymerization or the like is performed.

Specific examples of a photoradical polymerization initiator that can be used in the photoradical polymerization include DAROCUR (registered trade name) 1173 and 4265 (both being trade names, from BASF Japan Ltd.) and IRGACURE (registered trade name) 184, 369, 500, 651, 784, 819, 907, 1300, 1700, 1800, 1850 and 2959 (all being trade names, from BASF Japan Ltd.).

Specific examples of a preferred initiator for thermal radical polymerization by heat that can be used in the thermal radical polymerization include benzoyl peroxide, diisopropyl peroxydicarbonate, t-butyl peroxy-2-ethylhexanoate, t-butyl peroxypivalate, t-butyl peroxydiisobutyrate, lauroyl peroxide, dimethyl-2,2'-azobisisobutyrate (MAIB), di-t-butyl peroxide (DTBPO), azobisisobutyronitrile (AIBN), azobiscyclohexanecarbonitrile (ACN) and so on.

Specific examples of a photocationic polymerization initiator that can be used in the photocationic polymerization include diaryliodonium salt (hereinafter, referred to as "DAS") and a triarylsulfonium salt (hereinafter as "TAS"), etc.

Specific examples of DAS include diphenyliodonium tetrafluoroborate, diphenyliodonium hexafluorophosphonate, diphenyliodonium hexafluoroarsenate, diphenyliodonium trifluoromethanesulfonate, diphenyliodonium trifluoroacetate, diphenyliodonium p-toluenesulfonate, diphenyliodonium tetra(pentafluorophenyl)borate, 4-methoxyphenyphenyliodonium tetrafluoroborate, 4-methoxyphenyphenyliodonium hexafluorophosphonate, 4-methoxyphenyphenyliodonium hexafluoroarsenate, 4-methoxyphenyphenyliodonium trifluoromethanesulfonate, 4-methoxyphenylphenyliodonium trifluoroacetate and 4-methoxyphenyphenyliodonium p-toluenesulfonate, etc.

An improvement in sensitivity can be achieved by adding a photosensitizer such as thioxanthone, phenothiazine, chlorothioxanthone, xanthone, anthracene, diphenylanthracene or rubrene to DAS.

Specific examples of TAS include triphenylsulfonium tetrafluoroborate, triphenylsulfonium hexafluorophosphonate, triphenylsulfonium hexafluoroarsenate, triphenylsulfonium trifluoromethanesulfonate, triphenylsulfoniumtrifluoroacetate, triphenylsulfonium-p-toluenesulfonate, triphenylsulfonium tetra(pentafluorophenyl)borate, 4-methoxyphenydiphenylsulfonium tetrafluoroborate, 4-methoxyphenydiphenylsulfonium hexafluorophosphonate, 4-methoxyphenydiphenylsulfonium hexafluoroarsenate, 4-methoxyphenyldiphenylsulfonium trifluoromethanesulfonate, 4-methoxyphenyldiphenylsulfonium trifluoroacetate and 4-methoxyphenydiphenylsulfonium-p-toluenesulfonate.

Specific examples of trade names of the photocationic polymerization initiators include Cyracure (registered trade name) UVI-6990, Cyracure UVI-6974 and Cyracure UVI-6992 (each being a trade name, from UCC), Adekaoptomer SP-150, SP-152, SP-170 and SP-172 (each being a trade name, from ADEKA Corporation) and Rhodorsil Photoinitiator 2074 (trade name, from Rhodia Japan, Ltd.), IRGACURE (registered trade name) 250 (a trade name, from BASF Japan Ltd.) and UV-9380C (a trade name, from GE Toshiba Silicones Co., Ltd.).

9-2-4. Curing Agent or the Like

In manufacturing the polymer constituting the composite material according to the invention, one kind or two or more kinds of other suitable components, for example, a curing agent, a catalyst and a stabilizer, etc., may be added in addition to the monomer and so on and the polymerization initiator.

As the curing agent, a well-known latent curing agent that has been ordinarily used as a curing agent for an epoxy resin so far can be ordinarily used. Specific examples of the latent curing agent for the epoxy resin include an amine-type curing agent, a novolak resin-type curing agent, an imidazole-type curing agent and an acid anhydride-type curing agent. Specific examples of the amine-type curing agent include: aliphatic polyamines, such as diethylenetriamine, triethylenetetramine, tetraethylenepentamine, m-xylenediamine, trimethylhexamethylenediamine, 2-methylpentamethylenediamine and diethylaminopropylamine, etc.; alicyclic polyaminea, such as isophoronediamine, 1,3-bisaminomethylcyclohexane, bis(4-aminocyclohexyl)methane, norbornenediamine, 1,2-diaminocyclohexane and Laromine, etc.; and aromatic polyamines, such as diaminodiphenylmethane, diaminodiphenylethane and metaphenylenediamine, etc.

Specific examples of the novolak resin-type curing agent include a phenol novolak resin and a bisphenol novolak resin, etc. Specific examples of the imidazole-type curing agent include 2-methylimidazole, 2-ethylhexylimidazole, 2-phenylimidazole and 1-cyanoethyl-2-phenylimidazolium-trimellitate, etc.

Specific examples of the acid anhydride-type curing agent include tetrahydrophthalic anhydride, hexahydrophthalic anhydride, methyltetrahydrophthalic anhydride, methylhexahydrophthalic anhydride, methylcyclohexenetetracarboxylic dianhydride, phthalic anhydride, trimellitic anhydride, pyromellitic anhydride and benzophenonetetracarboxylic dianhydride, etc.

Moreover, a curing accelerator for accelerating the curing reaction between a polymerizable compound having a glycidyl group, an epoxy group or an oxetanyl group and the curing agent may be further used. Specific examples of the curing accelerator include: tertiary amines, such as benzyldimethyl amine, tris(dimethylaminomethyl)phenol and dimethylcyclohexylamine, etc.; imidazoles, such as 1-cyanoethyl-2-ethyl-4-methylimidazole and 2-ethyl-4-methylimidazole, etc.; organic phosphorus compounds, such as triphenyl phosphine, etc.; quaternary phosphonium salts, such as tetraphenylphosphonium bromide, etc.; diazabicycloalkenes, such as 1,8-diazabicyclo[5.4.0]undecene-7 and an organic acid salt thereof, etc.; quaternary ammonium salts, such as tetraethylammonium bromide and tetrabutylammonium bromide, etc.; and boron compounds, such as boron trifluoride and triphenyl borate, etc. The curing accelerators can be used alone or in combination of two or more kinds.

In order to prevent unwanted polymerization during storage, for example, a stabilizer is preferably added. Any stabilizer known by those of ordinary skill in the art can be used. Representative examples of the stabilizer include 4-ethoxyphenol, hydroquinone and butylated hydroxytoluene (BHT), etc.

9-3. Content of Liquid Crystal Composition or the Like

The content of the liquid crystal composition in the polymer/liquid crystal composite material according to the invention is preferably as high as possible, as long as the composite material can exhibit the optically isotropic liquid crystal phase. The reason is that the value of electric birefringence of the composite material of the invention becomes larger as the content of the liquid crystal composition is higher.

In the polymer/liquid crystal composite material of the invention, the content of the liquid crystal composition is preferably in the range of 60 to 99 wt %, further preferably in the range of 60 to 98 wt % and particularly preferably in the range of 80 to 97 wt %, based on the composite material. The content of the polymer is preferably in the range of 1 to 40 wt %, further preferably in the range of 2 to 40 wt % and particularly preferably in the range of 3 to 20 wt %, based on the composite material.

9.4 Any Other Component

The polymer/liquid crystal composite material of the invention may contain, for example, a dichroic dye and a photochromic compound in the range in which the advantageous effects of the invention are not adversely affected.

10. Optical Device

A tenth embodiment of the invention is the optical device including the liquid crystal composition or the polymer/liquid crystal composite material (hereinafter, the liquid crystal composition and the polymer/liquid crystal composite material according to the invention may be occasionally referred to generically as the liquid crystal medium) and to be driven in a optically isotropic liquid crystal phase.

The liquid crystal medium is optically isotropic during no application of electric field, but when the electric field is applied, optical anisotropy is caused in the liquid crystal medium to allow optical modulation by the electric field.

A specific example of the structure of the liquid crystal display device includes, as shown in FIG. 1, a structure in which an electrode 1 extended from the left side and an electrode 2 extended from the right side are alternately arranged in the electrodes of a comb-shaped electrode substrate. When a potential difference exists between the electrode 1 and the electrode 2, a state in which an electric field of two directions, namely, an upward direction and a downward direction on the figure, can be provided on the comb-shaped electrode substrate as shown in FIG. 1, if attention is paid to one electrode.

11. Use to Optical Device

An eleventh embodiment of the invention is use, for the optical device, of the liquid crystal composition containing the achiral component T containing at least one compound selected from the group of compounds represented by formula (1) and the chiral agent, and exhibiting the optically isotropic liquid crystal phase. The liquid crystal composition has a low driving voltage and a short response time, and therefore is effective in achieving low-voltage driving and fast response of the optical device.

EXAMPLES

Because a compound obtained was identified on the basis of a nuclear magnetic resonance spectrum obtained by means of $^1$H-NMR analysis, a gas chromatogram obtained by means of gas chromatography (GC) analysis and so forth, the analytical methods will be explained first.

$^1$H-NMR Analysis:

DRX-500 (made by Bruker BioSpin Corporation) was used as the measuring apparatus. A sample prepared in Examples and so forth was dissolved into a deuterated solvent in which the sample was soluble, such as $CDCl_3$, and measurement was carried out under the conditions of room temperature, 500 MHz and 24 times of accumulation. In the explanation of the nuclear magnetic resonance spectrum obtained, s, d, t, q and m stand for a singlet, a doublet, a triplet, a quartet and a multiplet, respectively. Tetramethylsilane (TMS) was used as a reference material for a zero point of chemical shift (δ value).

GC Analysis:

GC-14B Gas Chromatograph made by Shimadzu Corporation was used as the measuring apparatus. A capillary column CBP1-M25-025 (length 25 m, bore 0.22 mm, film thickness 0.25 micrometer; dimethylpolysiloxane as a stationary liquid phase; non-polar) made by Shimadzu Corporation was used. Helium was used as a carrier gas, of which the flow rate was adjusted at 1 ml/min. The temperature in the sample injector was set at 300° C. The temperature of the detector (FID) part was set at 300° C.

A sample was dissolved into toluene to prepare a 1 wt % solution, and then 1 microliter of the solution obtained was injected into the sample injector.

C-R6A Chromatopac made by Shimadzu Corporation or an equivalent thereof was used as the recorder. The resultant gas chromatogram showed the retention time of the peak and the value of the peak area corresponding to each of component compounds.

Chloroform or hexane, for example, may also be used as a solvent for diluting the sample. Moreover, as the column, capillary column DB-1 (length 30 m, bore 0.32 mm, film thickness 0.25 μm) made by Agilent Technologies Inc., HP-1 (length 30 m, bore 0.32 mm, film thickness 0.25 μm) made by Agilent Technologies Inc., Rtx-1 (length 30 m, bore 0.32 mm, film thickness 0.25 μm) made by Restek Corporation, BP-1

(length 30 m, bore 0.32 mm, film thickness 0.25 µm) made by SGE International Pty. Ltd. or the like may be used.

The proportions of the peak areas in the gas chromatogram correspond to the proportions of the component compounds. In general, the weight percent of each component compound in an analytical sample is not completely identical with the percentage of its peak area in the analytical sample. However, when the column described above was used in the invention, the weight percent of each component compound in the analytical sample substantially corresponds to the percentage of its peak area in the analytical sample because the correction coefficient is essentially equal to one. The reason is that no significant difference exists between the correction coefficients of the component compounds. In order to more accurately determine the composition ratio of the liquid crystal compounds in the liquid crystal composition by the chromatogram, an internal standard method by the chromatogram is applied. Each component (test-component) of the liquid crystal compounds and a liquid crystal compound as a standard (standard reference material) as weighed accurately in a fixed amount are simultaneously measured by means of gas chromatography, and a relative intensity is calculated in advance as the ratio of the peak area of the test-component to the peak area of the standard reference material. When a correction is performed using the relative intensity of the peak area of each component to the peak area of the standard reference material, the composition ratio of the liquid crystal compounds in the liquid crystal composition can be more accurately determined from the gas chromatographic analysis.

Sample for Determining Values of Physical Properties of Liquid Crystal Compound and so on There were two cases of using a sample for determining the values of physical properties of the liquid crystal compound, including a case where a compound per se is used as the sample, and a case where the compound is mixed with a mother liquid crystal to prepare the sample.

In the latter case where a sample prepared by mixing a compound with the mother liquid crystal was used, measurement was carried out according to the method described below. First, a sample is prepared by mixing 15% of the liquid crystal compound obtained and 85% of the mother liquid crystal. Then, according to an extrapolation method based on the equation as described below, extrapolated values are calculated from the measured values of the sample obtained. The extrapolated values are described as the values of physical properties of the compound.

(Extrapolated value)={100×(measured value of a sample)−(wt % of mother liquid crystal)×(measured value of the mother liquid crystal)}/(wt % of the compound).

When a smectic phase or crystals precipitated at 25° C. even at the above ratio of the compound to the mother liquid crystal, a ratio of the compound to the mother liquid crystal was changed in the order of (10%:90%), (5%:95%) and (1%: 99%). The physical properties of the sample were measured using a composition at a ratio in which the smectic phase or the crystals did not precipitate at 25° C. The extrapolated values were determined according to the above equation, and described as the values of physical properties of the compound.

As the mother liquid crystal used for the measurement, various kinds exist. For example, a composition (wt %) of mother liquid crystal A is as described below.

Mother Liquid Crystal A:

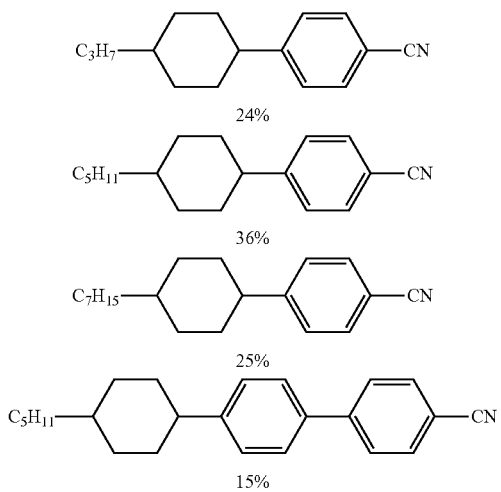

Methods for Determining Values of Physical Properties of Liquid Crystal Compound and so on The values of physical properties were determined according to the methods described below. Most of the measuring methods are described in EIAJ ED-2521A of the Standard of Electronic Industries Association of Japan, or are modified versions thereof. Moreover, no TFT was attached to a TN device used for measurement.

Among the measured values, in the case where a liquid crystal compound per se was used as the sample, the values obtained were described as experimental data. In the case where a mixture of a liquid crystal compound with the mother liquid crystal was used as the sample, the values obtained according to the extrapolation method were described as experimental data.

Phase structure and phase transition temperature (° C.): The measurement was carried out according to method (1) and method (2) as described below.

(1) A compound was placed on a hot plate of a melting point apparatus (FP52 Hot Stage made by Mettler-Toledo International Inc.) equipped with a polarizing microscope, and the state of the phase and the change thereof were observed with the polarizing microscope while the compound was heated at a rate of 3° C./min, and the kind of the liquid crystal phase was specified.

(2) A sample was heated and then cooled at a rate of 3° C./min using a differential scanning calorimeter, DSC-7 System or Diamond DSC System, made by PerkinElmer, Inc. The starting point (on set) of an endothermic peak or an exothermic peak caused by a phase change of the sample was determined by extrapolation, and thus a phase transition temperature was determined.

Hereinafter, the crystals are expressed as K, and when the crystals are to be further distinguished, each of the crystals is expressed as $K_1$ or $K_2$. The smectic phase is expressed as Sm and a nematic phase as N. A liquid (isotropic) is expressed as I. When smectic B phase or smectic A phase is to be distinguished among the smectic phases, the phase is expressed as SmB or SmA, respectively. BP stands for a blue phase or an optically isotropic liquid crystal phase. A coexistence state of two phases may be occasionally expressed in the form of (N*+I) or (N*+BP). Specifically, (N*+I) stands for a phase in which a non-liquid crystal isotropic phase and a chiral nematic phase coexist, and (N*+BP) stands for a phase in which a BP phase or an optically isotropic liquid crystal phase and a chiral nematic phase coexist. Un stands for an unidentified phase that is not optically anisotropic. As an expression of the phase transition temperature, for example, "K 50.0 N 100.0 I" shows that the phase transition temperature (KN) from the crystals to the nematic phase is 50.0° C., and the phase transition temperature (NI) from the nematic phase to the liquid is 100.0° C. The same rule applies to other expressions.

Maximum temperature of a nematic phase ($T_{NI}$; ° C.): A sample (a mixture of a liquid crystal compound and a mother liquid crystal) was placed on a hot plate of a melting point apparatus (FP52 Hot Stage made by Mettler-Toledo International Inc.) equipped with a polarizing microscope, and was observed with the polarizing microscope while being heated at a rate of 1° C./min. The temperature at which apart of the sample changed from the nematic phase to the isotropic liquid was described as a maximum temperature of the nematic phase. Hereinafter, the maximum temperature of the nematic phase may be occasionally abbreviated simply as "maximum temperature."

Compatibility at a low temperature: Samples prepared by mixing a liquid crystal compound with a mother liquid crystal in amounts of 20 wt %, 15 wt %, 10 wt %, 5 wt %, 3 wt % and 1 wt %, respectively, were put in glass vials. After the glass vials were kept in freezers at −10° C. or −20° C. for a predetermined period of time, whether or not the crystals or the smectic phase precipitated was observed.

Viscosity ($\eta$; measured at 20° C.; mPa·s): A mixture of a liquid crystal compound and the mother liquid crystal was measured using a cone-plate (E type) viscometer.

Refractive index anisotropy ($\Delta n$): Measurement was carried out by means of an Abbe refractometer with a polarizing plate mounted on an ocular by using light at the wavelength of 589 nanometers at the temperature of 25° C. The surface of the main prism was rubbed in one direction, and then a sample (a mixture of a liquid crystal compound and the mother liquid crystal) was dripped onto the main prism. The refractive index $n_\parallel$ was measured when the direction of polarized light was parallel to the direction of rubbing. The refractive index $n_\perp$ was measured when the direction of polarized light was perpendicular to the direction of rubbing. The value of refractive index anisotropy ($\Delta n$) was calculated from an equation: $\Delta n = n_\parallel - n_\perp$.

Dielectric anisotropy ($\Delta\epsilon$; measured at 25° C.): A sample (a mixture of a liquid crystal compound and the mother liquid crystal) was put in a liquid crystal cell in which the distance (gap) between two glass substrates was about 9 μmm and the twist angle was 80°. A voltage of 20 V was applied to the cell, and the dielectric constant $\epsilon_\parallel$ in the major axis direction of liquid crystal molecules was measured. A voltage of 0.5 V was applied to the cell, and the dielectric constant $\epsilon_\perp$ in the minor axis direction of the liquid crystal molecules was measured. The value of dielectric anisotropy were calculated from the equation of $\Delta\epsilon = \epsilon_\parallel - \epsilon_\perp$.

Pitch (P; Measured at 25° C.; nm)

The pitch length was measured utilizing selective reflection (Handbook of Liquid Crystals (Ekisho Binran in Japanese), page 196, issued in 2000, Maruzen Co., Ltd.). The equation of $<n>p/\lambda = 1$ applies for the selective reflection wavelength $\lambda$, wherein $<n>$ represents an average refractive index and is provided by the equation of $<n> = \{(n_\parallel^2 + n_\perp^2)/2\}^{1/2}$. The selective reflection wavelength was measured with a micro-spectrophotometer (trade name: MSV-350, JEOL Co., Ltd.). The pitch was determined by dividing the reflection wavelength obtained by the average refractive index. The pitch of a cholesteric liquid crystal having a reflection wavelength longer than the wavelengths of visible light is proportional to the reciprocal number of the concentration of the optically active compound when the concentration of the optically active compound is low. Thus, the pitch length of a liquid crystal having a selective reflection wavelength in the visible light region was measured at several points, and the pitch was determined with a linear extrapolation method. "Optically active compound" corresponds to a chiral agent in the invention.

The values of physical properties can be determined with the methods described below. Most of the measuring methods are described in EIAJ ED-2521A of the Standard of Electronic Industries Association of Japan, or are modified versions thereof. Moreover, no TFT was attached to a TN device used for measurement.

Maximum temperature of a nematic phase ($T_{NI}$; ° C.): A sample was placed on a hot plate of a melting point apparatus equipped with a polarizing microscope, and was heated at a rate of 1° C./min. The temperature at which a part of the sample changed from the nematic phase to the isotropic liquid was measured. The maximum temperature of the nematic phase may be occasionally abbreviated simply as "maximum temperature."

Minimum temperature of a nematic phase ($T_c$; ° C.): Samples each having a nematic phase were kept in freezers at 0° C., −10° C., −20° C., −30° C. and −40° C. for 10 days, and then liquid crystal phases thereof were observed. For example, when a sample maintained the nematic phase at −20° C. and changed to crystals (or a smectic phase) at −30° C., $T_c$ was expressed as $T_c \leq -20°$ C. The minimum temperature of the nematic phase may be occasionally abbreviated as "minimum temperature."

Transition temperature of optically isotropic liquid crystal phase: A sample was placed on a hot plate of a melting point apparatus equipped with a polarizing microscope, and was, in a state of a crossed Nicol, first heated until reaching a temperature at which the sample became a non-liquid crystal isotropic phase, and then cooled at a rate of 1° C./min to completely exhibit a chiral nematic phase or an optically isotropic liquid crystal phase. The temperature at which phase transition was caused in the cooling process was measured, and then the temperature was increased at a rate of 1° C./min, and the temperature at which phase transition was caused in the heating process was measured. In the invention, unless otherwise noted, the temperature at which the phase transition was caused in the heating process was described as a phase transition temperature. When judgment of the phase transition temperature was difficult in a dark field under the crossed Nicol in the optically isotropic liquid crystal phase, the phase transition temperature was measured by shifting the polarizing plate by 1° to 10° from the state of the crossed Nicol.

Viscosity ($\eta$; measured at 20° C.; mPa·s): An E-type viscometer was used for measurement.

Rotational Viscosity ($\gamma 1$; Measured at 25° C.; mPa·s):

(1) Sample with a positive dielectric anisotropy: Measurement was carried out by the method described in M. Imai et al., Molecular Crystals and Liquid Crystals, Vol. 259, p. 37 (1995). A sample was put in a TN device in which the twist angle was 0° and the distance (cell gap) between two glass substrates was 5 μm. A voltage was stepwise applied to the device in the range of 16 V to 19.5 V at an increment of 0.5 V. After a period of 0.2 second with no voltage application, a voltage was applied repeatedly under the conditions of only one of rectangular waves (rectangular pulse; 0.2 second) and no voltage application (2 seconds). The peak current and the peak time of the transient current generated by the applied voltage were measured. The value of rotational viscosity was obtained from the measured values and Equation (8) on page 40 of the paper presented by M. Imai et al. A value of dielectric anisotropy necessary for the calculation was determined by a method described below, using the device used for measuring the rotational viscosity.

(2) Sample with a negative dielectric anisotropy: Measurement was carried out by the method described in M. Imai et al., Molecular Crystals and Liquid Crystals, Vol. 259, p. 37 (1995). A sample was put in a VA device in which the distance (cell gap) between two glass substrates was 20 µm. A voltage was stepwise applied to the device in the range of 30 V to 50 V at an increment of 1 V. After a period of 0.2 second with no voltage application, a voltage was applied repeatedly under the conditions of only one of rectangular waves (rectangular pulse; 0.2 second) and no voltage application (2 seconds). The peak current and the peak time of the transient current generated by the applied voltage were measured. A value of rotational viscosity was obtained from the measured values and Equation (8) on page 40 of the paper presented by M. Imai et al. As for the value of dielectric anisotropy necessary for the calculation, the value of dielectric anisotropy measured as described below was used.

Refractive index anisotropy ($\Delta n$; measured at 25° C.) Measurement was carried out by means of an Abbe refractometer with a polarizing plate mounted on an ocular, using light at the wavelength of 589 nm. The surface of the main prism was rubbed in one direction, and then a sample was added dropwise onto the main prism. The refractive index $n_\parallel$ was measured when the direction of polarized light was parallel to the direction of rubbing. The refractive index $n_\perp$ was measured when the direction of polarized light was perpendicular to the direction of rubbing. The value of refractive index anisotropy was calculated from the equation of $\Delta n = n_\parallel - n_\perp$. When the sample was a composition, the refractive index anisotropy was measured by the method.

Dielectric Anisotropy ($\Delta \epsilon$; Measured at 25° C.)

(1) Composition having a positive dielectric anisotropy: A sample was put in a liquid crystal cell in which the distance (gap) between two glass substrates was about 9 µm and the twist angle was 80°. A voltage of 20 V was applied to the device, and the dielectric constant $\epsilon_\parallel$ in the major axis direction of liquid crystal molecules was measured. A voltage of 0.5 V was applied to the device, and the dielectric constant $\epsilon_\perp$ in the minor axis direction of the liquid crystal molecules was measured. The value of dielectric anisotropy was calculated by "$\Delta \epsilon = \epsilon_\parallel - \epsilon_\perp$."

(2) Composition having a negative dielectric anisotropy: A sample was put in a liquid crystal cell subjected to treatment in homeotropic alignment, a voltage of 0.5 V was applied to the cell, and the dielectric constant $\epsilon_\parallel$ was measured. A sample was put in a liquid crystal cell subjected to treatment in homogeneous alignment, a voltage of 0.5 V was applied to the cell, and the dielectric constant $\epsilon_\perp$ was measured. The value of dielectric anisotropy was calculated from the equation of $\Delta \epsilon = \epsilon_\parallel - \epsilon_\perp$.

Threshold Voltage (Vth; Measured at 25° C.; V):

(1) Composition having a positive dielectric anisotropy: A sample was put in a normally white mode liquid crystal display device in which the distance (gap) between two glass substrates (cell gap) was $(0.5/\Delta n)$ µm and the twist angle was 80°, wherein $\Delta n$ is the value of refractive index anisotropy measured by the above method. Rectangular waves having a frequency of 32 Hz were applied to the device. The voltage of rectangular waves was increased, and the value of voltage at 90% transmittance of light passing through the device was measured.

(2) Composition having a negative dielectric anisotropy: A sample was put in a normally black mode liquid crystal display device subjected to treatment in homeotropic alignment in which the distance (gap) between two glass substrates (cell gap) was about 9 µm. Rectangular waves having a frequency of 32 Hz were applied to the device. The voltage of rectangular waves was increased, and the value of voltage at 10% transmittance of light passing through the device was measured.

Voltage holding ratio (VHR; measured at 25° C.; %): The TN device used for measurement had a polyimide alignment film, and the distance (cell gap) between two glass substrates was 6 p.m. A sample was put in the device, and then the device was sealed with an UV-polymerizable adhesive. A pulse voltage (60 microseconds at 5 V) was applied to the TN device to charge the device. The decaying voltage was measured for 16.7 milliseconds with a high-speed voltmeter, and area A between the voltage curve and the horizontal axis in a unit cycle was determined. The voltage holding ratio is the percentage of area A to area B that is the area without decay.

Helical pitch (measured at 20° C.; µm): For measuring a helical pitch, a Cano's wedge cell method was applied. A sample was injected into a Cano's wedge cell, and the gap between disclination lines (a; unit: µm) as observed from the cell was measured. The helical pitch (P) was calculated according to an equation: $P = 2 \times a \times \tan \theta$, in which $\theta$ is the angle between two glass plates in the wedge cell.

Alternatively, the pitch length was measured utilizing selective reflection (Handbook of Liquid Crystals (Ekisho Binran in Japanese), page 196, issued in 2000, Maruzen Co., Ltd.). The equation of $<n> p/\lambda = 1$ applies for the selective reflection wavelength $\lambda$, wherein $<n>$ represents the average refractive index and is provided by the following equation of $<n> = \{(n_\parallel^2 + n_\perp^2)/2\}^{1/2}$. The selective reflection wavelength was measured with a microspectrophotometer (trade name: MSV-350, JEOL Co., Ltd.). The pitch was determined by dividing the reflection wavelength obtained by the average refractive index.

The pitch of a cholesteric liquid crystal having a reflection wavelength longer than the wavelengths of visible light is proportional to the reciprocal number of the concentration of chiral agent when the concentration of the chiral agent is low. Thus, the pitch length of liquid crystals having a selective reflection wavelength in the visible light region was measured in several points, and the pitch was determined with a linear extrapolation method.

The proportion (percentage) of a component or a liquid crystal compound is expressed in terms of weight percent (wt %) based on the total weight of the liquid crystal compounds. A composition is prepared by weighting the components, such as the liquid crystal compounds, and then mixing them. Accordingly, the weight percentages of the components are easy to calculate.

Comparative Example 1

Liquid crystal composition NLC-A was prepared by mixing the liquid crystal compounds shown below in the proportions described below.

The correspondences to general formulas are described at the right sides of the structural formulas.
Liquid Crystal Composition NLC-A
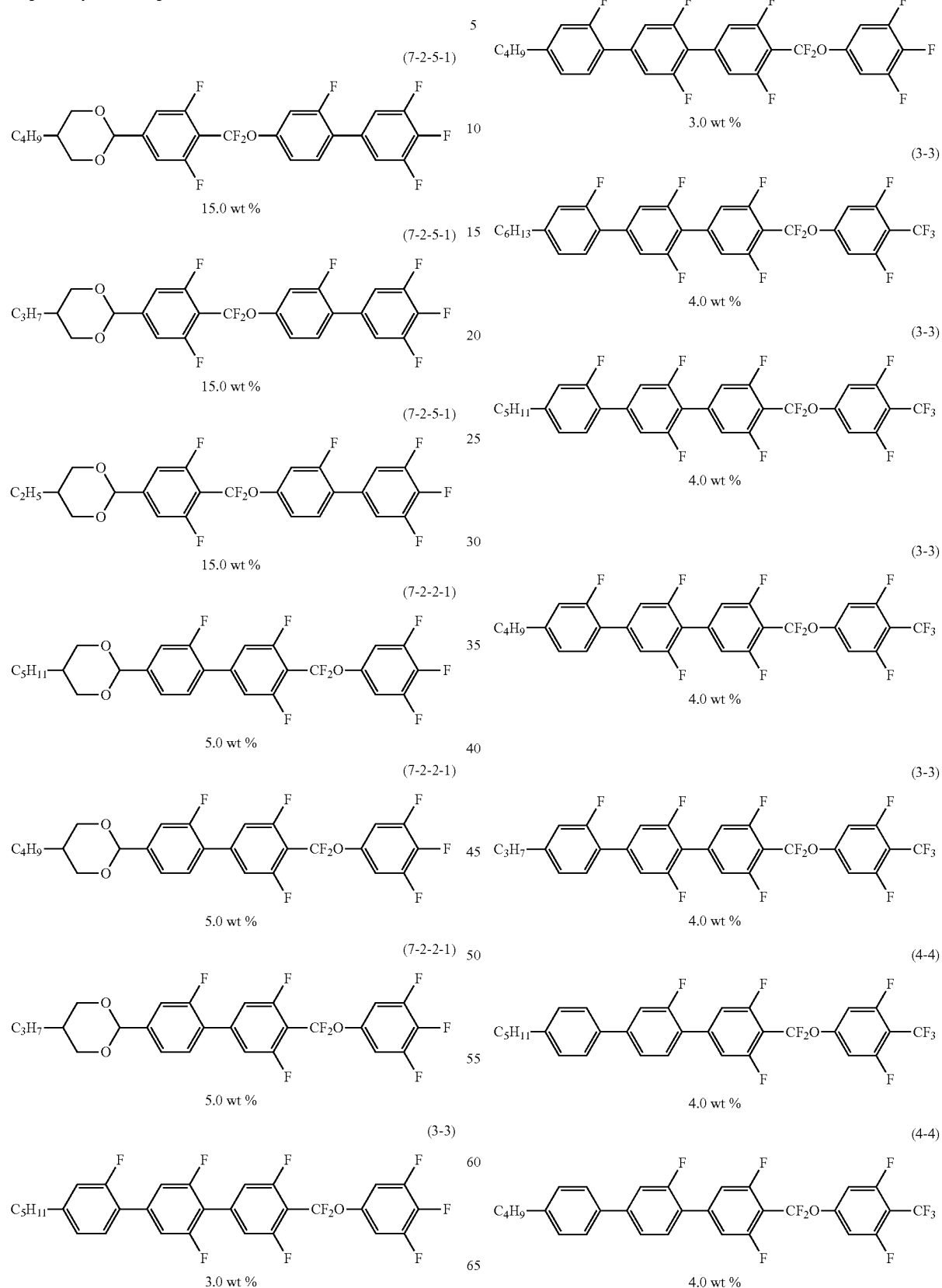

(3-3)

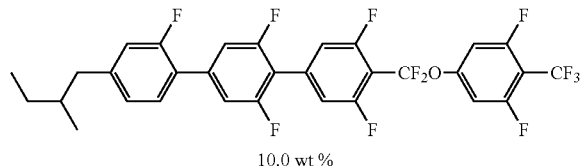

10.0 wt %

The phase transition temperature (° C.) of the liquid crystal composition NLC-A was N 77.6 I.

Next, liquid crystal composition CLC-A including liquid crystal composition NLC-A (94.8 wt %) and chiral agents BN-H4 (2.6 wt %) and BN-H5 (2.6 wt %) as represented by formulas below was obtained.

The phase transition temperatures (° C.) of the liquid crystal composition CLC-A were N* 69.8 BP 71.6 I.

BN-H4

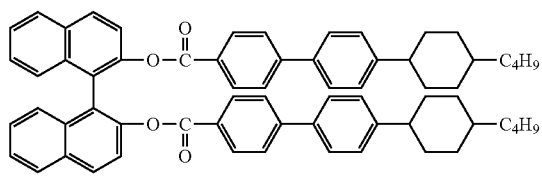

BN-H5

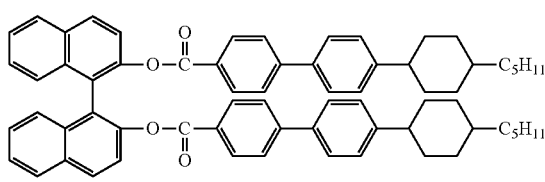

Comparative Example 2

Preparation of Mixture of Monomer and Liquid Crystal Composition

As a mixture of a liquid crystal composition and a polymerizable monomer, liquid crystal composition MLC-A was prepared by mixing 88.8 wt % of liquid crystal composition CLC-A, 6.0 wt % of n-dodecylacrylate, 4.8 wt % of 1,4-di(4-(6-(acryloyloxy)dodecyloxy)benzoyloxy)-2-methylbenzene (LCA-12), and 0.4 wt % of 2,2'-dimethoxyphenylacetophenone as a photopolymerization initiator.

The phase transition temperatures (° C.) of the liquid crystal composition MLC-A were N* 37.5 BP 42.6 I and 141.6 BP 35.0 N*.

Preparation of Polymer/Liquid Crystal Composite Material

Liquid crystal composition MLC-A was interposed between a comb-shaped electrode substrate not subjected to an alignment treatment, and an opposite glass substrate (not provided with an electrode) (cell thickness: 8 μm), and the cell obtained was heated to a blue phase at 40.5° C. In the state, a polymerization reaction was performed by irradiating the resultant composition with UV light (intensity: 23 mWcm$^{-2}$ (365 nm)) for 1 minute.

The thus obtained polymer/liquid crystal composite material (PSBP-A) maintained an optically isotropic liquid crystal phase, even when cooled to room temperature.

In addition, as shown in FIG. 1, the electrodes of the comb-shaped electrode substrate are arranged such that electrode 1 extending from the electrode part for connection at the left side and electrode 2 extending from the electrode part for connection at the right side are alternately arranged. Accordingly, when a potential difference exists between electrode 1 and electrode 2, a state in which an electric field of two directions, namely the upward direction and the downward direction in the figure, can be provided on the comb-shaped electrode substrate as shown in FIG. 1, in view of one electrode.

Comparative Example 3

The cell having polymer/liquid crystal composite material PSBP-A interposed therebetween as obtained in Comparative Example 2 was set to an optical system, and electro-optic characteristics thereof were measured. A white light source of a polarizing microscope (ECLIPSE LV100POL, made by Nikon Corporation) was used as the light source, and the cell was arranged in the optical system such that the angle of incidence was perpendicular to the cell plane and the line direction of the comb-shaped electrode was 45 degrees relative to Polarizer and Analyzer polarizing plates, respectively. The relationship between applied voltage and transmittance was investigated at room temperature. When rectangular waves having a voltage of 65 V were applied, the transmittance became 92%, and the intensity of transmitted light was saturated. The contrast was 1,070.

Example 1

Liquid crystal composition NLC-B was prepared by mixing the liquid crystal compounds shown below in the proportions below.

The correspondences to the general formulas are described at the right sides of the structural formulas.

LCA-12

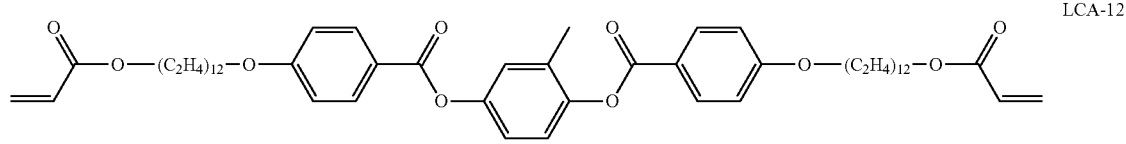

Liquid Crystal Composition NLC-B
(7-2-5-1)
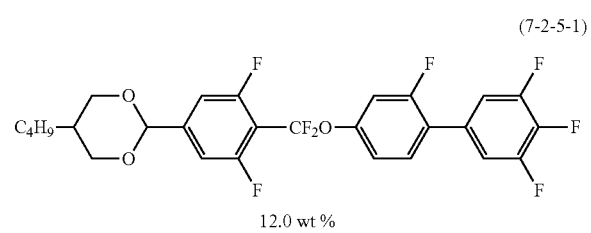
12.0 wt %
(7-2-5-1)
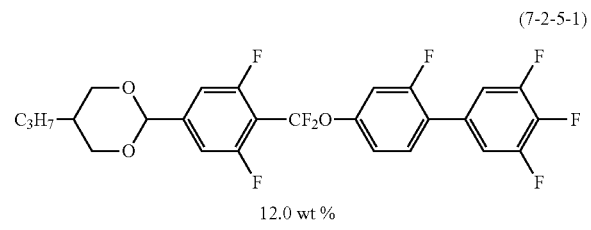
12.0 wt %
(7-2-5-1)
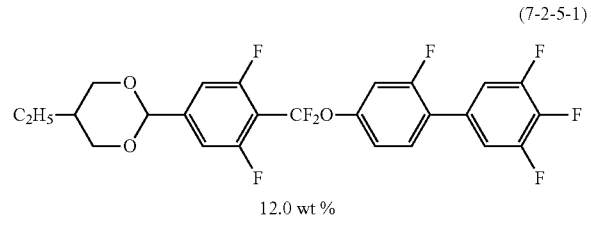
12.0 wt %
(7-2-2-1)
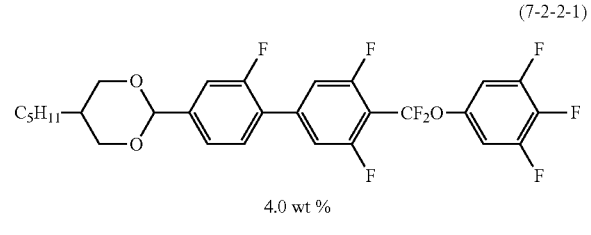
4.0 wt %
(7-2-2-1)
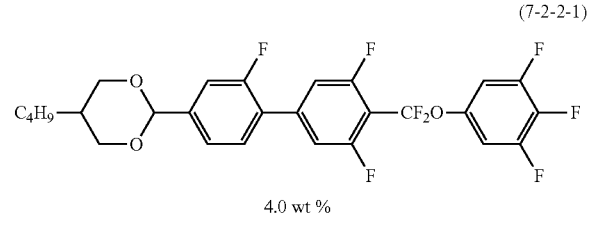
4.0 wt %
(7-2-2-1)
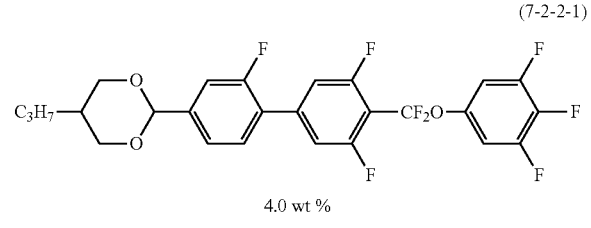
4.0 wt %
(1-2-5-1)
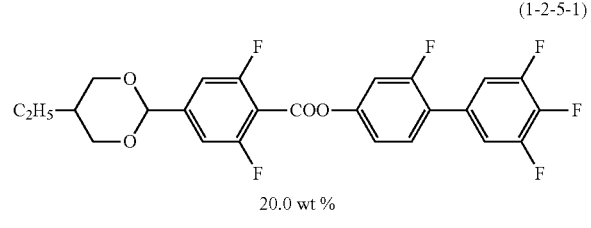
20.0 wt %
-continued
(3-3)
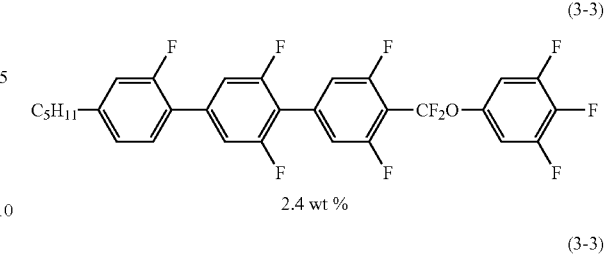
2.4 wt %
(3-3)
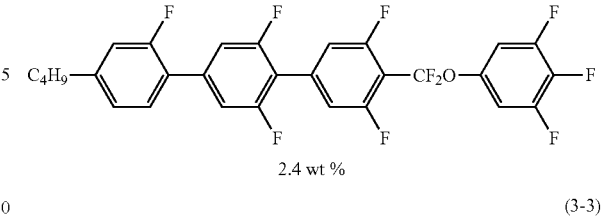
2.4 wt %
(3-3)
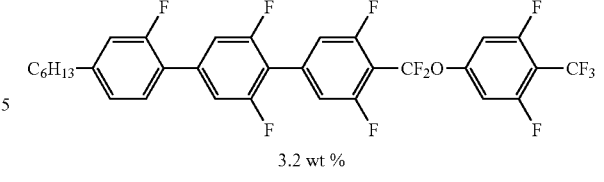
3.2 wt %
(3-3)
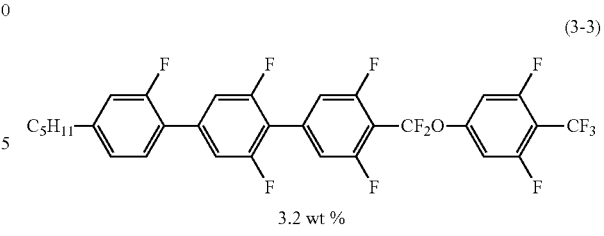
3.2 wt %
(3-3)
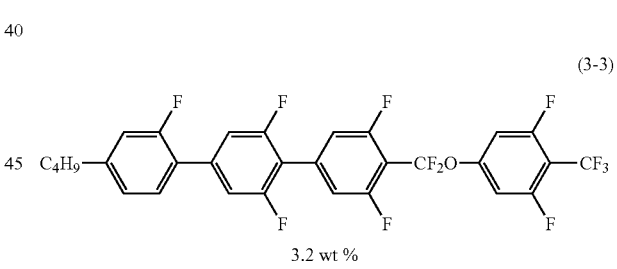
3.2 wt %
(3-3)
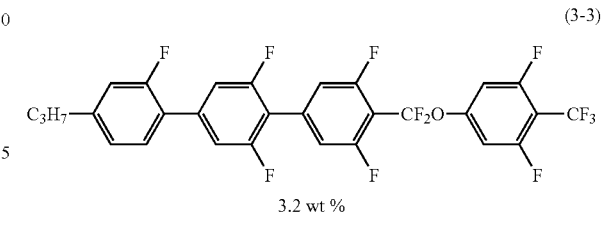
3.2 wt %
(4-4)
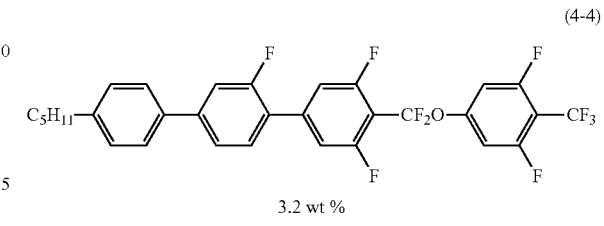
3.2 wt %

(4-4)

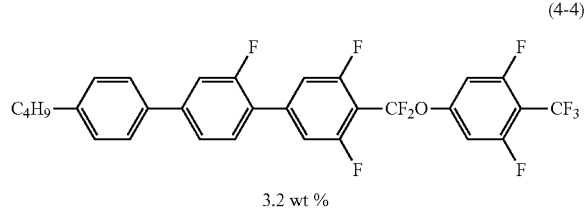

3.2 wt %

(3-3)

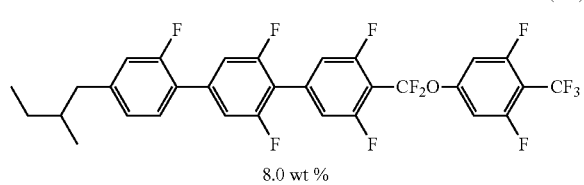

8.0 wt %

The phase transition temperature (° C.) of the liquid crystal composition NLC-B was N 89.9 I.

Next, liquid crystal composition CLC-B including liquid crystal composition NLC-A (94.8 wt %) and chiral agents BN-H4 (2.6 wt %) and BN-H5 (2.6 wt %) represented by the formulas shown below was obtained.

The phase transition temperatures (° C.) of the liquid crystal composition CLC-B were N* 84.6 BP 86.9 I.

Example 2

Preparation of Mixture of Monomer and Liquid Crystal Composition

As a mixture of a liquid crystal composition and a polymerizable monomer, liquid crystal composition MLC-B was prepared by mixing 88.8 wt % of liquid crystal composition CLC-B, 6.0 wt % of n-dodecylacrylate, 4.8 wt % of 1,4-di(4-(6-(acryloyloxy)dodecyloxy)benzoyloxy)-2-methylbenzene (LCA-12), and 0.4 wt % of 2,2'-dimethoxyphenylacetophenone as a photopolymerization initiator. The phase transition temperatures (° C.) of the liquid crystal composition MLC-B were N* 47.9 BP 50.3 I and 147.0 BP 45.2 N*.

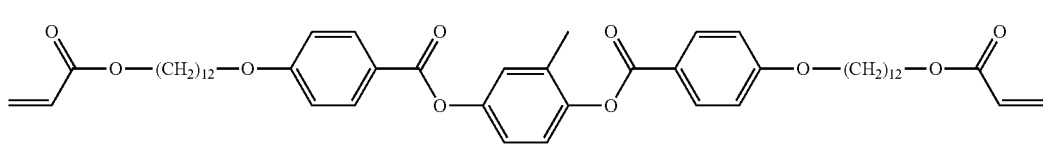

LCA-12

Preparation of Polymer/Liquid Crystal Composite Material

Liquid crystal composition MLC-B was interposed between a comb-shaped electrode substrate not subjected to an alignment treatment, and an opposite glass substrate (not provided with an electrode) (cell thickness: 9 µm), and the cell obtained was heated to a blue phase at 47.9° C. In the state, a polymerization reaction was performed by irradiating the resultant composition with UV light (intensity: 23 mWcm$^{-2}$ (365 nm)) for 1 minute.

The thus obtained polymer/liquid crystal composite material (PSBP-B) maintained an optically isotropic liquid crystal phase, even when cooled to room temperature.

In addition, as shown in FIG. 1, the electrodes of the comb-shaped electrode substrate are arranged such that electrode 1 extended from the electrode part for connection at the left side and electrode 2 extended from the electrode part for connection at the right side are alternately arranged. Accordingly, when a potential difference exists between electrode 1 and electrode 2, a state in which an electric field of two directions, namely the upward direction and the downward direction in the figure, can be provided on the comb-shaped electrode substrate as shown in FIG. 1, in view of one electrode.

Example 3

The cell having polymer/liquid crystal composite material PSBP-B interposed therebetween as obtained in Example 2 was set to an optical system, and electro-optic characteristics thereof were measured. A white light source of a polarizing microscope (ECLIPSE LV100POL, made by Nikon Corporation) was used as the light source, and the cell was arranged in the optical system such that the angle of incidence was perpendicular to the cell plane and the line direction of the comb-shaped electrode was 45 degrees relative to Polarizer and Analyzer polarizing plates, respectively. The relationship between applied voltage and transmittance was investigated at room temperature. When rectangular waves having a voltage of 28 V were applied, the transmittance became 80% and the intensity of transmitted light was saturated. The contrast was 873. Thus, PSBP-B containing the compound represented by formula (1) of the invention was found to be driven by a low voltage.

Example 4

Liquid crystal composition NLC-C was prepared by mixing the liquid crystal compounds shown below in the proportions below.

The correspondences to the general formulas are described at the right sides of the structural formulas.

Liquid Crystal Composition NLC-C (7-2-5-1)

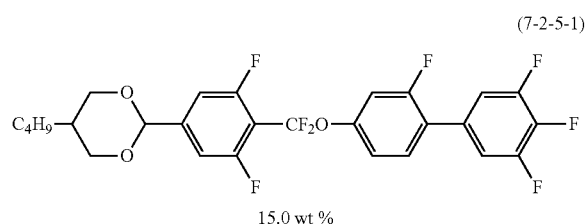

15.0 wt %

-continued
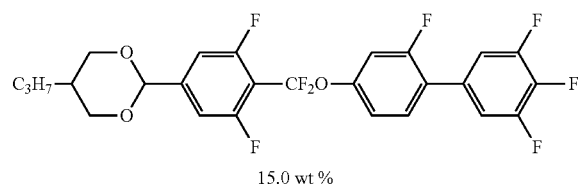
(7-2-5-1)
15.0 wt %
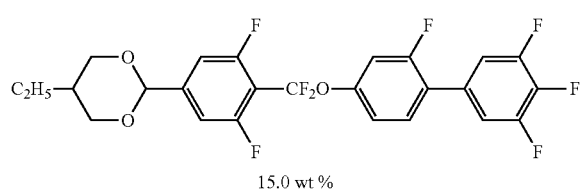
(7-2-5-1)
15.0 wt %
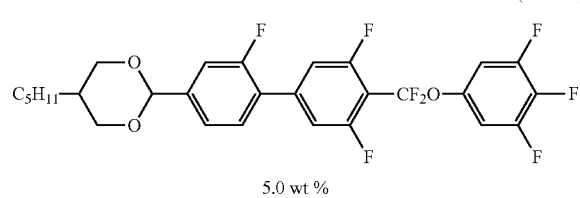
(7-2-2-1)
5.0 wt %
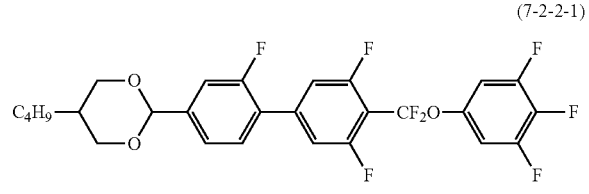
(7-2-2-1)
5.0 wt %
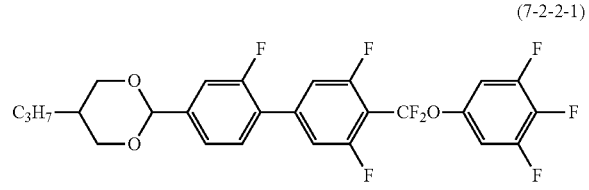
(7-2-2-1)
5.0 wt %
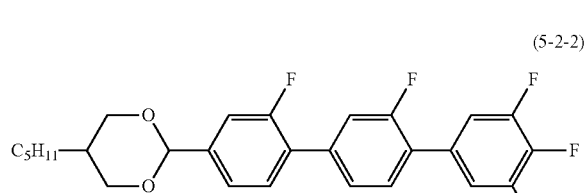
(5-2-2)
2.8 wt %
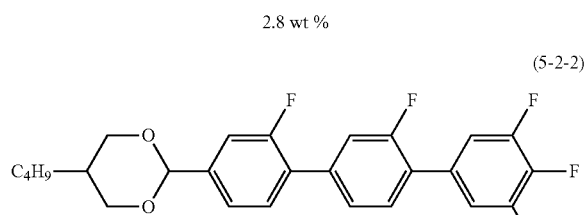
(5-2-2)
2.8 wt %
-continued
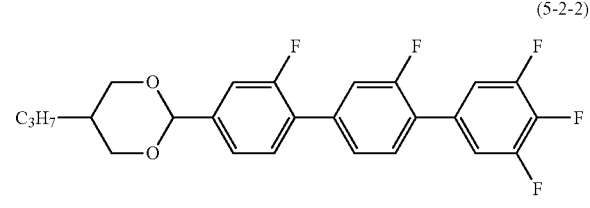
(5-2-2)
2.8 wt %
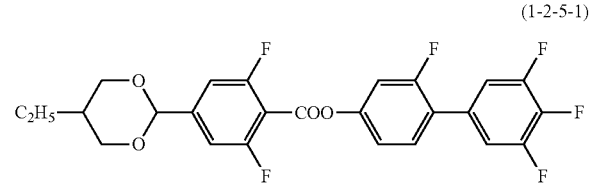
(1-2-5-1)
15 wt %
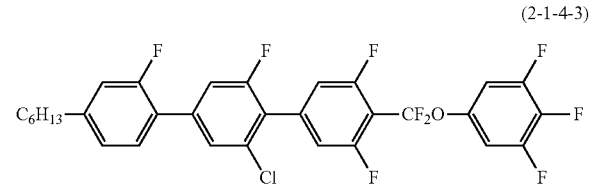
(2-1-4-3)
4.0 wt %
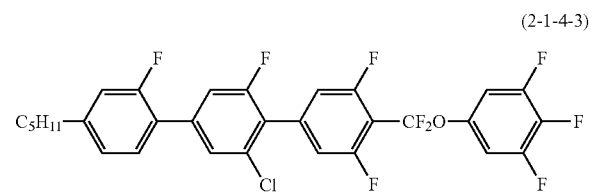
(2-1-4-3)
4.0 wt %
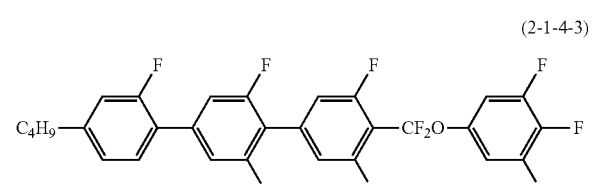
(2-1-4-3)
4.0 wt %
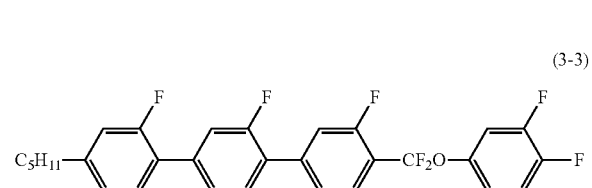
(3-3)
2.6 wt %
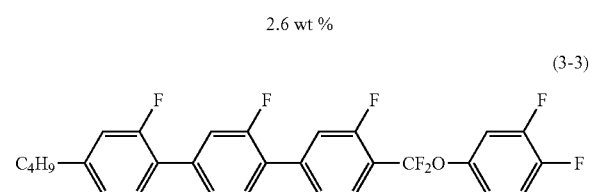
(3-3)
2.6 wt %

-continued

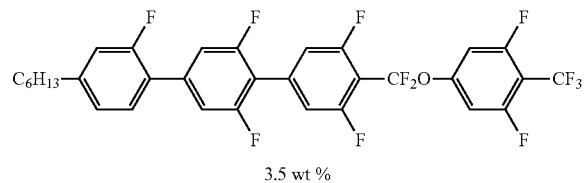

3.5 wt %

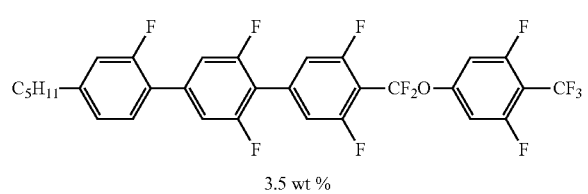

3.5 wt %

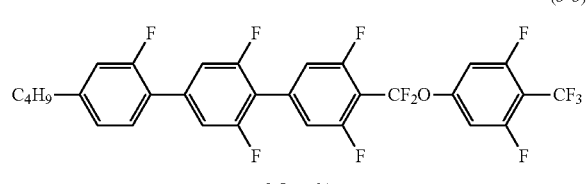

3.5 wt %

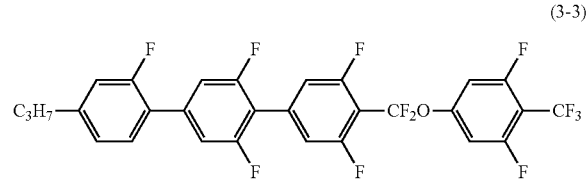

3.5 wt %

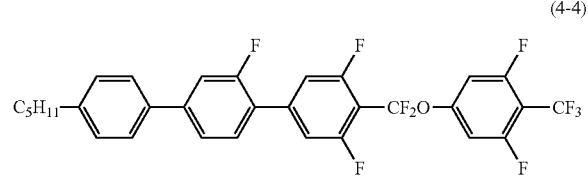

1.3 wt %

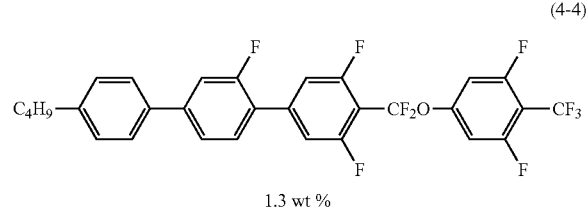

1.3 wt %

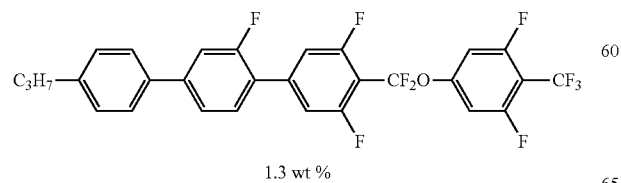

1.3 wt %

-continued

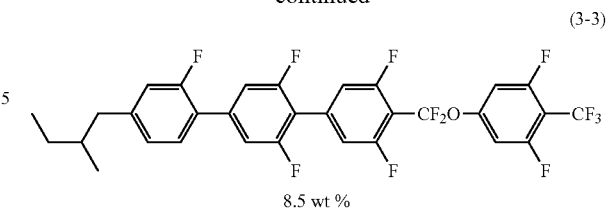

8.5 wt %

The phase transition temperature (° C.) of the liquid crystal composition NLC-C was N 91.2 I.

Next, liquid crystal composition CLC-C including liquid crystal composition NLC-C (94.8 wt %) and chiral agents BN-H4 (2.6 wt %) and BN-H5 (2.6 wt %) represented by the formulas described below was obtained.

The phase transition temperatures (° C.) of the liquid crystal composition CLC-C were N* 81.0 BP 83.0 BP+183.5 I.

Example 5

Preparation of Mixture of Monomer and Liquid Crystal Composition

As a mixture of a liquid crystal composition and a polymerizable monomer, liquid crystal composition MLC-C was prepared by mixing 88.8 wt % of liquid crystal composition CLC-C, 6.0 wt % of n-dodecylacrylate, 4.8 wt % of 1,4-di(4-(6-(acryloyloxy)dodecyloxy)benzoyloxy)-2-methylbenzene (LCA-12), and 0.4 wt % of 2,2'-dimethoxyphenylacetophenone as a photopolymerization initiator. The phase transition temperatures (° C.) of the liquid crystal composition MLC-C were N* 44.4 BP 48.4 BP+150.6 I, I-I+BP 48.0 BP 44.4 N*.

Preparation of Polymer/Liquid Crystal Composite Material

Liquid crystal composition MLC-C was interposed between a comb-shaped electrode substrate not subjected to an alignment treatment, and an opposite glass substrate (not provided with an electrode) (cell thickness: 8 μm), and the cell obtained was heated to a blue phase at 46.6° C. In the state, a polymerization reaction was performed by irradiating the resultant composition with UV light (intensity: 23 mWcm$^{-2}$ (365 nm)) for 1 minute.

The thus obtained polymer/liquid crystal composite material (PSBP-C) maintained an optically isotropic liquid crystal phase, even when cooled to room temperature.

In addition, as shown in FIG. 1, the electrodes for the comb-shaped electrode substrate were arranged such that electrode 1 extended from the electrode part for connection at the left side and electrode 2 extended from the electrode part for connection at the right side are alternately arranged. Accordingly, when a potential difference exists between electrode 1 and electrode 2, a state in which an electric field of two directions, namely the upward direction and the downward direction in the figure, can be provided on the comb-shaped electrode substrate as shown in FIG. 1, in view of one electrode.

Example 6

The cell having polymer/liquid crystal composite material PSBP-C interposed therebetween as obtained in Example 5 was set to an optical system, and electro-optic characteristics thereof were measured. A white light source of a polarizing microscope (ECLIPSE LV100POL, made by Nikon Corporation) was used as a light source, and the cell was arranged in the optical system such that the angle of incidence was perpendicular to the cell plane and the line direction of the comb-shaped electrode was 45 degrees relative to Polarizer and Analyzer polarizing plates, respectively. The relationship between applied voltage and transmittance was investigated at room temperature. When rectangular waves having a voltage of 25 V were applied, the transmittance became 85%, and the intensity of transmitted light was saturated. The contrast was 934. Thus, PSBP-C containing the compound represented by formula (1) of the invention was found to be driven by a low voltage.

Example 7

Liquid crystal composition NLC-D was prepared by mixing the liquid crystal compounds shown below in the proportions below.

The correspondence to the general formulas was described at the right sides of the structural formulas.

Liquid Crystal Composition NLC-D

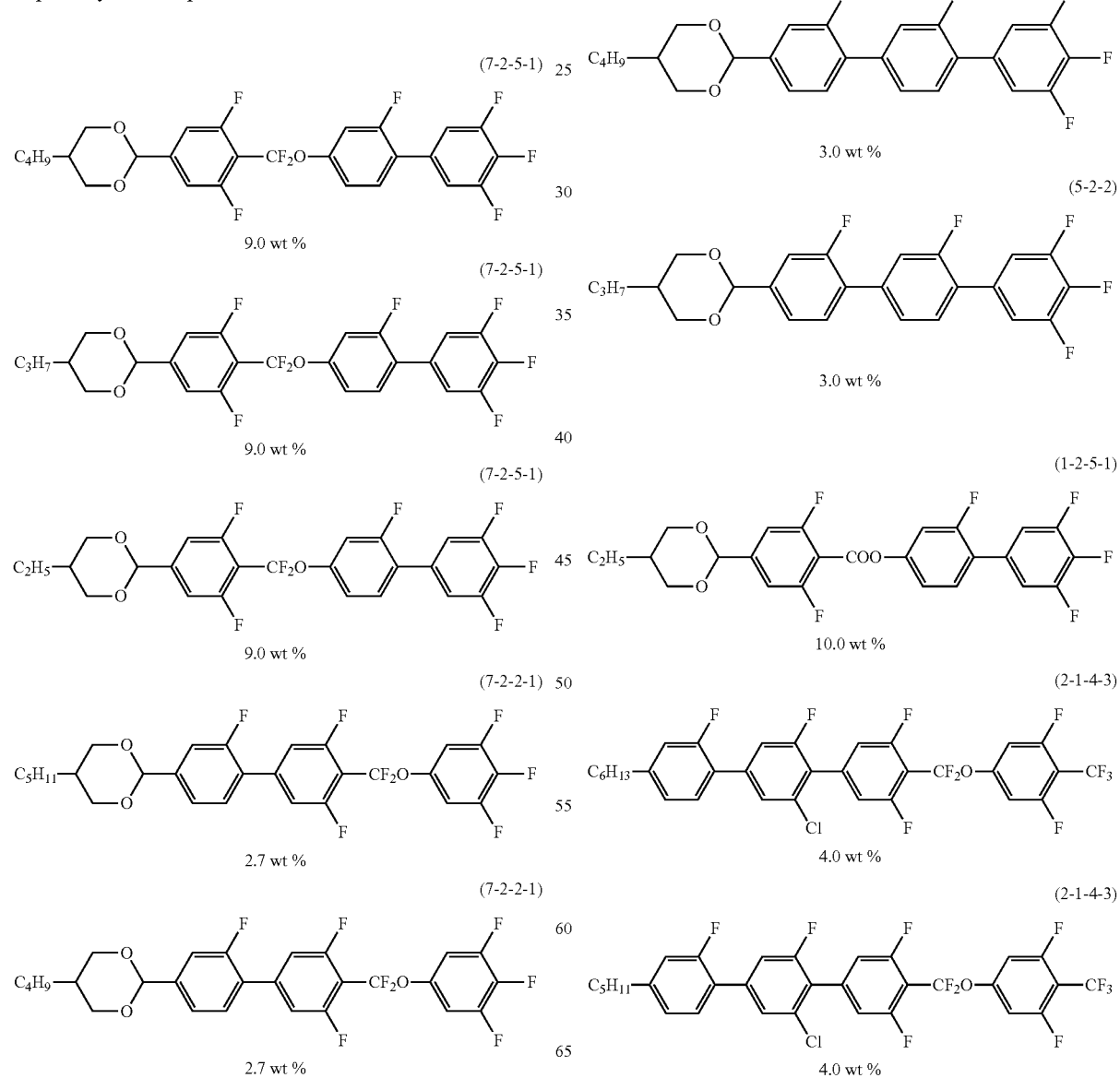

-continued (2-1-4-3)

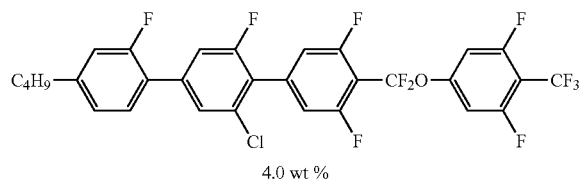

4.0 wt %

(3-3)

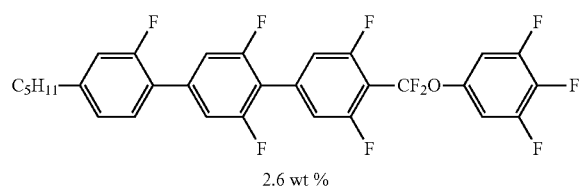

2.6 wt %

(3-3)

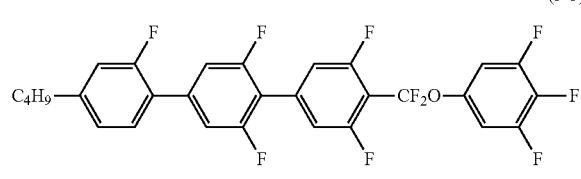

2.6 wt %

(3-3)

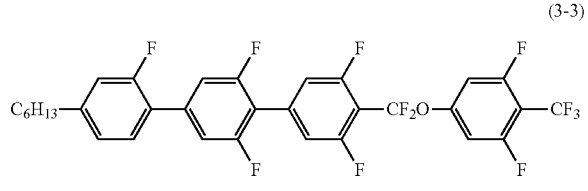

3.5 wt %

(3-3)

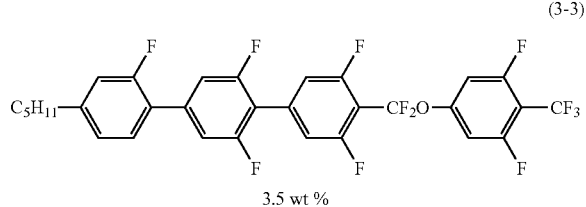

3.5 wt %

(3-3)

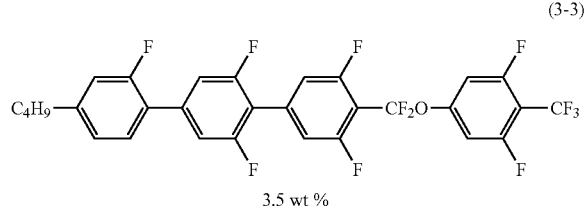

3.5 wt %

(3-3)

C₃H₇—〈biphenyl-CF₂O-phenyl-CF₃ structure〉

3.5 wt %

-continued (4-4)

C₅H₁₁—〈structure〉—CF₂O—〈structure〉—CF₃

1.3 wt %

(4-4)

C₄H₉—〈structure〉—CF₂O—〈structure〉—CF₃

1.3 wt %

(4-4)

C₃H₇—〈structure〉—CF₂O—〈structure〉—CF₃

1.3 wt %

(3-3)

〈branched alkyl structure〉—CF₂O—〈structure〉—CF₃

8.5 wt %

The phase transition temperature (° C.) of the liquid crystal composition NLC-D was N 87.2 I.

Next, liquid crystal composition CLC-D including liquid crystal composition NLC-D (94.8 wt %) and chiral agents BN-H4 (2.6 wt %) and BN-H5 (2.6 wt %) represented by formulas described below was obtained.

The phase transition temperatures (° C.) of the liquid crystal composition CLC-D were N* 77.4 BP 79.5 I.

Example 8

Preparation of Mixture of Monomer and Liquid Crystal Composition

As a mixture of a liquid crystal composition and a polymerizable monomer, liquid crystal composition MLC-D was prepared by mixing 88.8 wt % of liquid crystal composition CLC-D, 6.0 wt % of n-dodecylacrylate, 4.8 wt % of 1,4-di(4-(6-(acryloyloxy)dodecyloxy)benzoyloxy)-2-methylbenzene (LCA-12), and 0.4 wt % of 2,2'-dimethoxyphenylacetophenone as a photopolymerization initiator. The phase transition temperatures (° C.) of the liquid crystal composition MLC-D were N* 44.8 BP 46.7 BP+149.1 I, I 48.1 I+BP-BP 42.6 N*.

Preparation of Polymer/Liquid Crystal Composite Material

Liquid crystal composition MLC-D was interposed between a comb-shaped electrode substrate not subjected to an alignment treatment, and an opposite glass substrate (not provided with an electrode) (cell thickness: 8 μm), and the cell obtained was heated to a blue phase at 45.0° C. In the state, a polymerization reaction was performed by irradiating the resultant composition with UV light (intensity: 23 mWcm⁻² (365 nm)) for 1 minute.

The thus obtained polymer/liquid crystal composite material (PSBP-D) maintained an optically isotropic liquid crystal phase, even when cooled to room temperature.

In addition, as shown in FIG. 1, the electrodes for the comb-shaped electrode substrate are arranged such that electrode 1 extended from the electrode part for connection at the left side and electrode 2 extended from the electrode part for connection at the right side are alternately arranged. Accordingly, when a potential difference exists between electrode 1 and electrode 2, a state in which an electric field of two directions, namely the upward direction and the downward direction in the figure, can be provided on the comb-shaped electrode substrate as shown in FIG. 1, in view of one electrode.

Example 9

The cell having polymer/liquid crystal composite material PSBP-D interposed therebetween as obtained in Example 8 was set to an optical system, and electro-optic characteristics thereof were measured. A white light source of a polarizing microscope (ECLIPSE LV100POL, made by Nikon Corporation) was used as the light source, and the cell was arranged in the optical system such that the angle of incidence was perpendicular to the cell plane and the line direction of the comb-shaped electrode was 45 degrees relative to Polarizer and Analyzer polarizing plates, respectively. The relationship between applied voltage and transmittance was investigated at room temperature. When rectangular waves having a voltage of 35 V were applied, the transmittance became 85% and the intensity of transmitted light was saturated. The contrast was 884.

It was found from Example 7 that CLC-D containing the compound represented by formula (1) of the invention had a high clearing point, and from Example 9 that PSBP-D obtained from CLC-D could be driven by a low voltage.

Example 10

Liquid crystal composition NLC-E was prepared by mixing the liquid crystal compounds shown below in the proportions below.

The correspondences to the general formulas was described at the right sides of the structural formulas.

Liquid Crystal Composition NLC-E

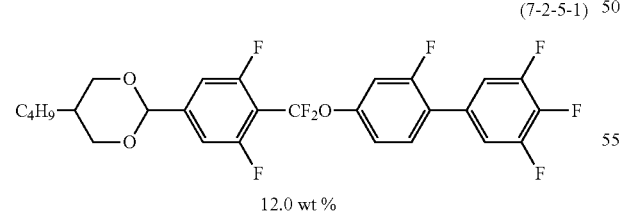

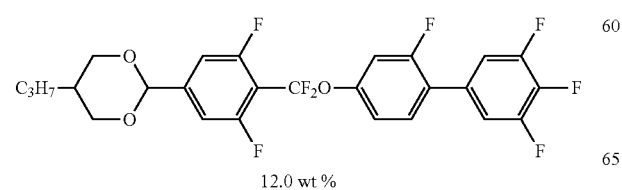

-continued

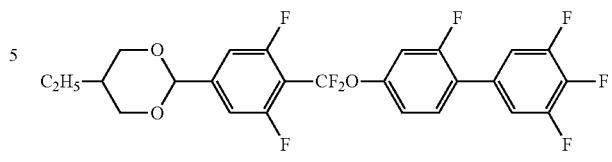

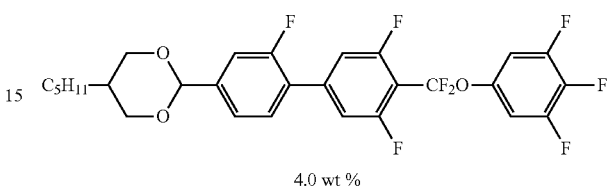

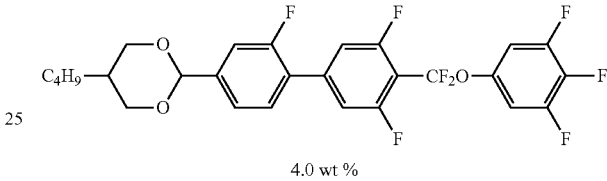

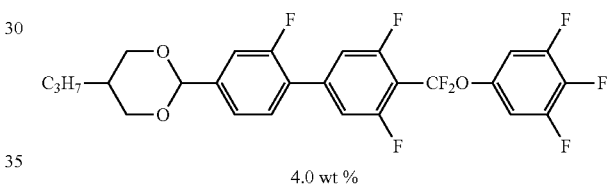

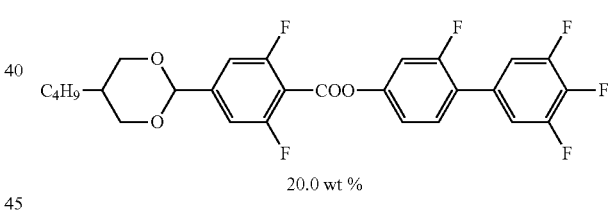

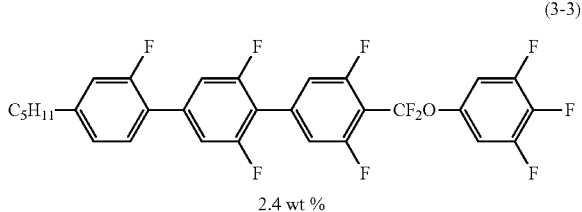

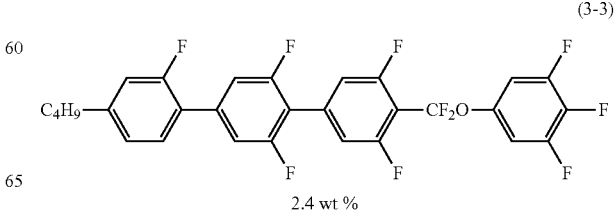

(3-3)

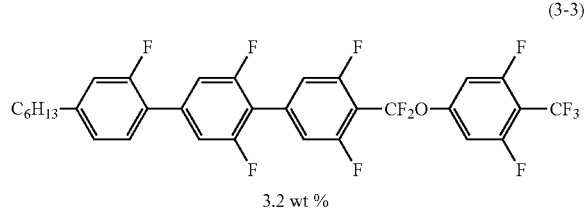

3.2 wt %

(3-3)

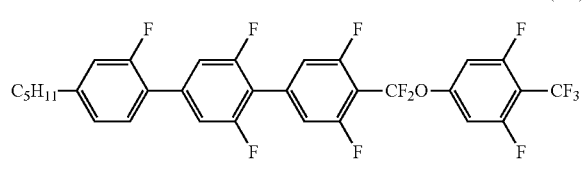

3.2 wt %

(3-3)

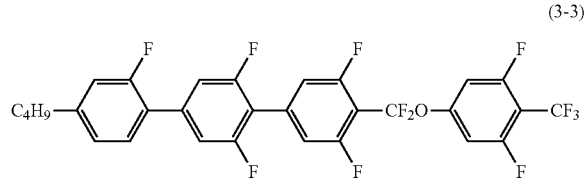

3.2 wt %

(3-3)

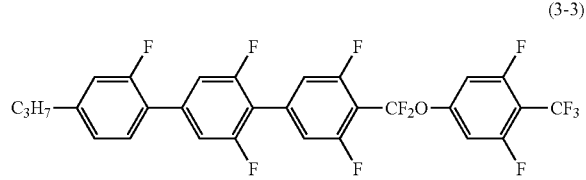

3.2 wt %

(4-4)

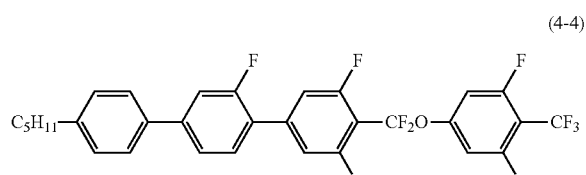

3.2 wt %

(4-4)

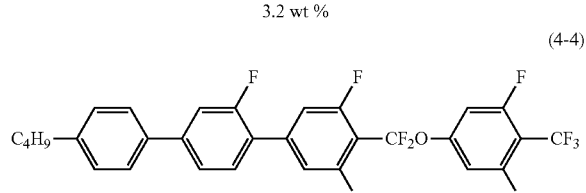

3.2 wt %

(3-3)

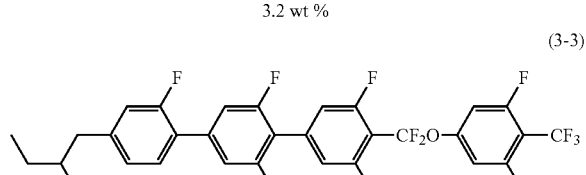

8.0 wt %

The phase transition temperature (° C.) of the liquid crystal composition NLC-E was N 98.3 I.

Next, liquid crystal composition CLC-E including liquid crystal composition NLC-E (94.4 wt %) and chiral agents BN-H4 (2.8 wt %) and BN-H5 (2.8 wt %) represented by the formulas described below was obtained.

The phase transition temperatures (° C.) of the liquid crystal composition CLC-E were N* 87.0 BP 89.11.

Example 11

Preparation of Mixture of Monomer and Liquid Crystal Composition

As a mixture of a liquid crystal composition and a polymerizable monomer, liquid crystal composition MLC-E was prepared by mixing 88.8 wt % of liquid crystal composition CLC-E, 6.0 wt % of n-dodecylacrylate, 4.8 wt % of 1,4-di(4-(6-(acryloyloxy)dodecyloxy)benzoyloxy)-2-methylbenzene (LCA-12), and 0.4 wt % of 2,2'-dimethoxyphenylacetophenone as a photopolymerization initiator. The phase transition temperatures (° C.) of the liquid crystal composition MLC-E were N* 52.2 BP 57.3 BP+158.2 I and 155.6 I+BP 50.6BP 49.2 N*.

Preparation of Polymer/Liquid Crystal Composite Material

Liquid crystal composition MLC-E was interposed between a comb-shaped electrode substrate not subjected to an alignment treatment, and an opposite glass substrate (not provided with an electrode) (cell thickness: 8 μm), and the cell obtained was heated to a blue phase at 52.3° C. In the state, a polymerization reaction was performed by irradiating the resultant composition with UV light (intensity: 23 mWcm$^{-2}$ (365 nm)) for 1 minute.

The thus obtained polymer/liquid crystal composite material (PSBP-E) maintained an optically isotropic liquid crystal phase, even when cooled to room temperature.

In addition, as shown in FIG. 1, the electrodes for the comb-shaped electrode substrate were arranged such that electrode 1 extended from the electrode part for connection at the left side and electrode 2 extended from the electrode part for connection at the right side were alternately arranged. Accordingly, when a potential difference existed between electrode 1 and electrode 2, a state in which an electric field of two directions, namely the upward direction and the downward direction in the figure, can be provided on the comb-shaped electrode substrate as shown in FIG. 1, in view of one electrode.

Example 12

The cell having polymer/liquid crystal composite material PSBP-E interposed therebetween as obtained in Example 11 was set to an optical system, and electro-optic characteristics thereof were measured. A white light source of a polarizing microscope (ECLIPSE LV100POL, made by Nikon Corporation) was used as the light source, and the cell was arranged in the optical system such that the angle of incidence was perpendicular to the cell plane and the line direction of the comb-shaped electrode was 45 degrees relative to Polarizer and Analyzer polarizing plates, respectively. The relationship between applied voltage and transmittance was investigated at room temperature. When rectangular waves having a voltage of 37.5 V were applied, the transmittance became 90% and the intensity of transmitted light was saturated. The contrast was 975.

From Example 10, CLC-E containing the compound represented by formula (1) of the invention was found to have a high clearing point. From Example 13, PSBP-E obtained from CLC-E was found to be driven at a low voltage.

Example 13

Liquid crystal composition NLC-F was prepared by mixing the liquid crystal compounds shown below in the proportions below.

The correspondences to the general formulas were described at the right sides of the structural formulas.
Liquid Crystal Composition NLC-F
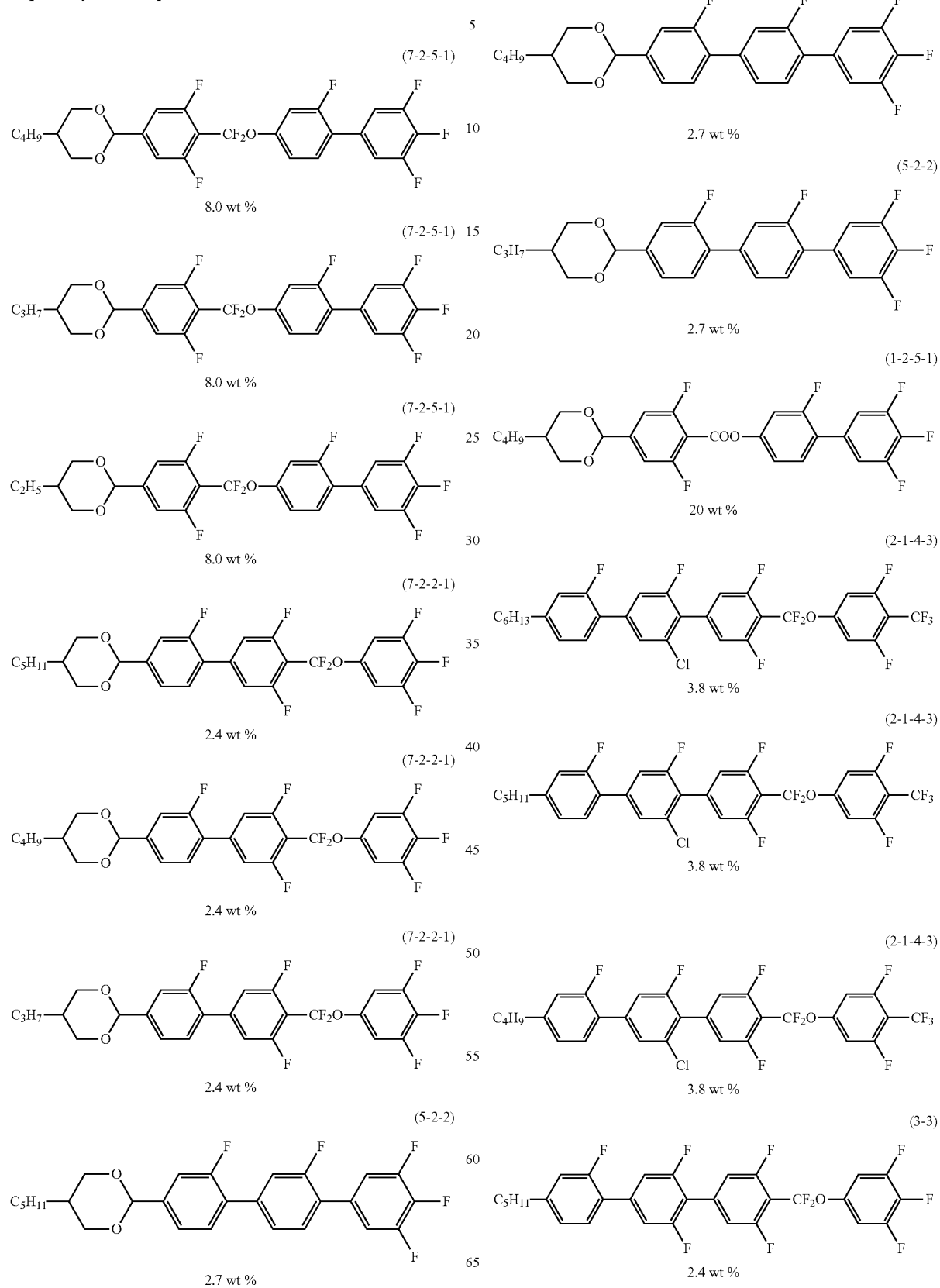

-continued

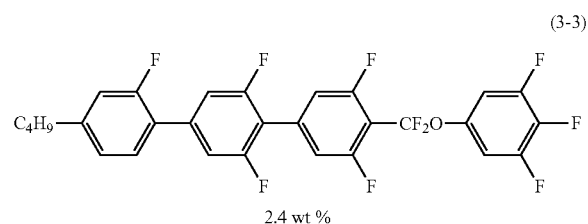

2.4 wt %

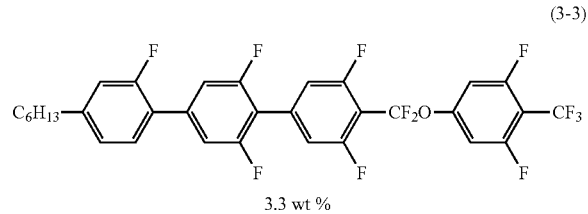

3.3 wt %

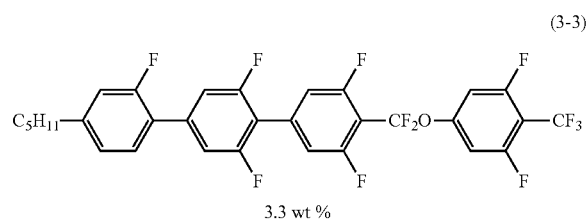

3.3 wt %

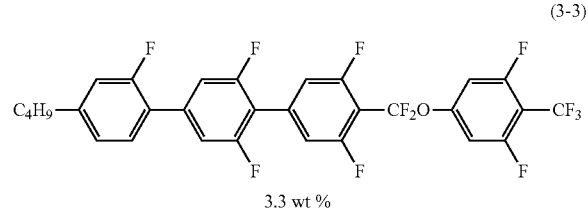

3.3 wt %

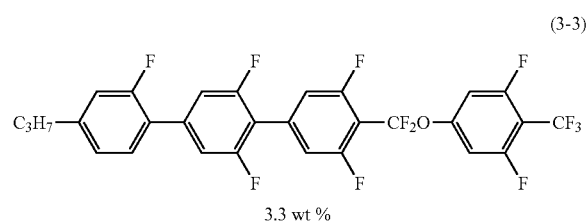

3.3 wt %

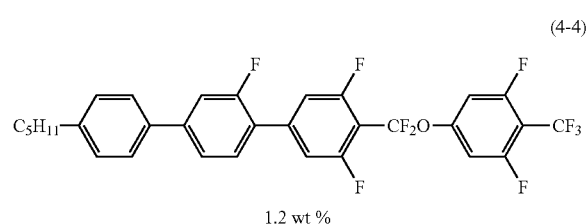

1.2 wt %

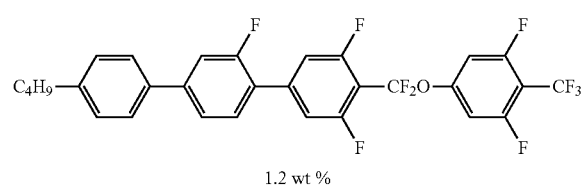

1.2 wt %

-continued

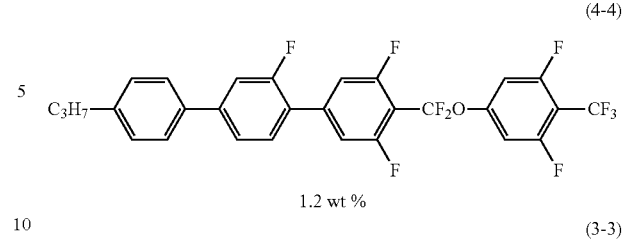

1.2 wt %

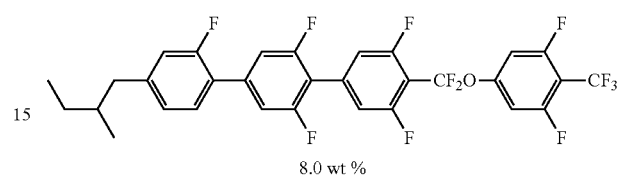

8.0 wt %

The phase transition temperature (° C.) of the liquid crystal composition NLC-F was N 99.7 I.

Next, liquid crystal composition CLC-F including liquid crystal composition NLC-F (94.4 wt %) and chiral agents BN-H4 (2.8 wt %) and BN-H5 (2.8 wt %) represented by the formulas described below was obtained.

The phase transition temperatures (° C.) of the liquid crystal composition CLC-F were N* 88.3 BP 91.9 I.

Example 14

Preparation of Mixture of Monomer and Liquid Crystal Composition

As a mixture of a liquid crystal composition and a polymerizable monomer, liquid crystal composition MLC-F was prepared by mixing 88.8 wt % of liquid crystal composition CLC-F, 6.0 wt % of n-dodecylacrylate, 4.8 wt % of 1,4-di(4-(6-(acryloyloxy)dodecyloxy)benzoyloxy)-2-methylbenzene (LCA-12), and 0.4 wt % of 2,2'-dimethoxyphenylacetophenone as a photopolymerization initiator. The phase transition temperatures (° C.) of the liquid crystal composition MLC-F were N* 53.0 BP 57.01 and 156.5 I+BP-BP 50.7 N*.

Preparation of Polymer/Liquid Crystal Composite Material

Liquid crystal composition MLC-F was interposed between a comb-shaped electrode substrate not subjected to an alignment treatment, and an opposite glass substrate (not provided with an electrode) (cell thickness: 8 μm), and the cell obtained was heated to a blue phase at 53.2° C. In the state, a polymerization reaction was performed by irradiating the resultant composition with UV light (intensity: 23 mWcm$^{-2}$ (365 nm)) for 1 minute.

The thus obtained polymer/liquid crystal composite material (PSBP-F) maintained an optically isotropic liquid crystal phase, even when cooled to room temperature.

In addition, as shown in FIG. 1, the electrodes for the comb-shaped electrode substrate were arranged such that electrode 1 extended from the electrode part for connection at the left side and electrode 2 extended from the electrode part for connection at the right side were alternately arranged. Accordingly, when a potential difference existed between electrode 1 and electrode 2, a state in which an electric field of two directions, namely the upward direction and the downward direction in the figure, can be provided on the comb-shaped electrode substrate as shown in FIG. 1, in view of one electrode.

Example 15

The cell having polymer/liquid crystal composite material PSBP-F interposed therebetween as obtained in Example 14 was set to an optical system, and electro-optic characteristics thereof were measured. A white light source of a polarizing microscope (ECLIPSE LV100POL, made by Nikon Corporation) was used as a light source, and the cell was arranged in the optical system such that the angle of incidence was perpendicular to the cell plane and the line direction of the comb-shaped electrode was 45 degrees relative to Polarizer and Analyzer polarizing plates, respectively. The relationship between applied voltage and transmittance was investigated at room temperature. When rectangular waves having a voltage of 35.2 V were applied, the transmittance became 90% and the intensity of transmitted light was saturated. The contrast was 1,147.

From Example 13, CLC-F containing the compound represented by formula (1) of the invention was found to have a high clearing point. From Example 15, PSBP-F obtained from CLC-F was found to be driven at a low voltage.

Example 16

Preparation of Nematic Liquid Crystal Composition (NLC)

As presented in Table 1, nematic liquid crystal compositions NLC-G, NLC-L, NLC-M, NLC-N, NLC-O and NLC-P containing the compound represented by formula (1) were prepared (Table 1). In Table 1, the correspondence of each compound to a general formula herein is shown. The phase transition temperature (N-I temperature) of each nematic liquid crystal composition is shown in Table 2.

TABLE 1

Formulation of nematic liquid crystal composition

| Compound | General formula | NLC-G | NLC-L | NLC-M | NLC-N | NLC-O | NLC-P |
|---|---|---|---|---|---|---|---|
| $C_5H_{11}$–[fluorinated terphenyl]–$CF_2O$–[fluorophenyl]–F | (3-3) | 2.4 | 2.4 | 2.5 | 2.5 | 2.7 | 2.7 |
| $C_4H_9$–[fluorinated terphenyl]–$CF_2O$–[fluorophenyl]–F | (3-3) | 2.4 | 2.4 | 2.5 | 2.5 | 2.7 | 2.7 |
| $C_6H_{13}$–[fluorinated terphenyl]–$CF_2O$–[fluorophenyl]–$CF_3$ | (3-3) | 3.2 | 3.2 | 3.4 | 3.4 | 3.6 | 3.6 |
| $C_5H_{11}$–[fluorinated terphenyl]–$CF_2O$–[fluorophenyl]–$CF_3$ | (3-3) | 3.2 | 3.2 | 3.4 | 3.4 | 3.6 | 3.6 |
| $C_4H_9$–[fluorinated terphenyl]–$CF_2O$–[fluorophenyl]–$CF_3$ | (3-3) | 3.2 | 3.2 | 3.4 | 3.4 | 3.6 | 3.6 |
| $C_3H_7$–[fluorinated terphenyl]–$CF_2O$–[fluorophenyl]–$CF_3$ | (3-3) | 3.2 | 3.2 | 3.4 | 3.4 | 3.6 | 3.6 |
| $C_5H_{11}$–[phenyl-fluorinated biphenyl]–$CF_2O$–[fluorophenyl]–$CF_3$ | (4-4) | 3.2 | 3.2 | 3.4 | 3.4 | 3.6 | 3.6 |

TABLE 1-continued

Formulation of nematic liquid crystal composition

| Structure | General formula | Formulation (wt %) | | | | | |
|---|---|---|---|---|---|---|---|
| | | NLC-G | NLC-L | NLC-M | NLC-N | NLC-O | NLC-P |
| C₄H₉–⌬–⌬(F)–⌬(F,F)–CF₂O–⌬(F,F)–CF₃ | (4-4) | 3.2 | 3.2 | 3.4 | 3.4 | 3.6 | 3.6 |
| (CH₃)CH–CH₂–⌬(F)–⌬(F,F)–⌬(F,F)–CF₂O–⌬(F,F)–CF₃ | (3-3) | 8.0 | 8.0 | 8.5 | 8.5 | 9.0 | 9.0 |
| C₄H₉–[dioxane]–⌬(F,F)–CF₂O–⌬(F)–⌬(F,F)–F | (1-2-5-1) | 12.0 | 12.0 | 12.8 | 12.8 | 13.5 | 13.5 |
| C₃H₇–[dioxane]–⌬(F,F)–CF₂O–⌬(F)–⌬(F,F)–F | (1-2-5-1) | 12.0 | 12.0 | 12.8 | 12.8 | 13.5 | 13.5 |
| C₂H₅–[dioxane]–⌬(F,F)–CF₂O–⌬(F)–⌬(F,F)–F | (1-2-5-1) | 12.0 | 12.0 | 12.8 | 12.8 | 13.5 | 13.5 |
| C₅H₁₁–[dioxane]–⌬(F)–⌬(F,F)–CF₂O–⌬(F,F)–F | (1-2-2-1) | 4.0 | 4.0 | 4.3 | 4.3 | 4.5 | 4.5 |
| C₄H₉–[dioxane]–⌬(F)–⌬(F,F)–CF₂O–⌬(F,F)–F | (1-2-2-1) | 4.0 | 4.0 | 4.2 | 4.2 | 4.5 | 4.5 |
| C₃H₇–[dioxane]–⌬(F)–⌬(F,F)–CF₂O–⌬(F,F)–F | (1-2-2-1) | 4.0 | 4.0 | 4.2 | 4.2 | 4.5 | 4.5 |
| C₄H₉–[dioxane]–⌬(F,F)–COO–⌬(F)–⌬(F,F)–F | (1-2-5-1) | | | | 7.5 | | |
| C₄H₉–[dioxane]–⌬(F,F)–COO–⌬(F,F)–F | (1-2-2-1) | | | 15.0 | 7.5 | | |

TABLE 1-continued

Formulation of nematic liquid crystal composition

| | General formula | Formulation (wt %) | | | | | |
|---|---|---|---|---|---|---|---|
| | | NLC-G | NLC-L | NLC-M | NLC-N | NLC-O | NLC-P |
| 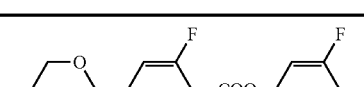 | (1-5-2) | 20.0 | | | | 10.0 | |
| 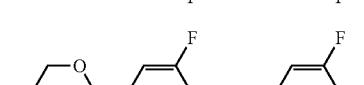 | (1-5-1) | | | | | | 10.0 |
| 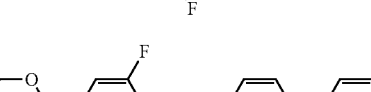 | | | | 20.0 | | | |

TABLE 2

Phase transition temperature (N-I temperature) of nematic liquid crystal composition

| | N-I/° C. |
|---|---|
| NLC-G | 63.9 |
| NLC-L | 100.7 |
| NLC-M | 95.7 |
| NLC-N | 94.8 |
| NLC-O | 71.7-72.1 |
| NLC-P | 73.4-74.1 |

Example 17

Preparation of Chiral Liquid Crystal Composition (CLC)

Next, chiral liquid crystal compositions CLC-G, CLC-L, CLC-M, CLC-N, CLC-O and CLC-P were prepared by mixing each nematic liquid crystal composition (94.70 wt %) presented in Table 1 with chiral agents BN-H4 (2.65 wt %) and BN-H5 (2.65 wt %) shown below. Formulations of the chiral liquid crystal compositions were shown below, and their phase transition temperatures shown in Table 3.

CLC-G

| NLC-G | 94.70 wt % |
|---|---|
| BN-H4 | 2.65 wt % |
| BN-H5 | 2.65 wt % |

CLC-L

| NLC-L | 94.70 wt % |
|---|---|
| BN-H4 | 2.65 wt % |
| BN-H5 | 2.65 wt % |

CLC-M

| NLC-M | 94.70 wt % |
|---|---|
| BN-H4 | 2.65 wt % |
| BN-H5 | 2.65 wt % |

CLC-N

| NLC-N | 94.70 wt % |
|---|---|
| BN-H4 | 2.65 wt % |
| BN-H5 | 2.65 wt % |

CLC-O

| NLC-O | 94.70 wt % |
|---|---|
| BN-H4 | 2.65 wt % |
| BN-H5 | 2.65 wt % |

CLC-P

| NLC-P | 94.70 wt % |
|---|---|
| BN-H4 | 2.65 wt % |
| BN-H5 | 2.65 wt % |

TABLE 3

Phase transition temperature/° C.

| CLC-G | N* 55.8-56.5 BP – I, I 55.1 BP 54.8 N* |
|---|---|
| CLC-L | N* 89.2 BP 91.3 I, I 90.6 BP 87.8 N* |
| CLC-M | N* 89.3 BP 90.5 I, I 89.5 BPII 87.5 BPI 87.2 N* |
| CLC-N | N* 87.2 BP 88.8 I, I 88.5 BPII 86.4 BPI 85.5 N* |
| CLC-O | N* 63.2 BP 64.8 BP + I 65.3 I, I 63.7 BP 61.7 N* |
| CLC-P | N* 65.7-65.9 BP 67.3 BP + I 67.6 I, I 66.1 BP 64.3 N* |

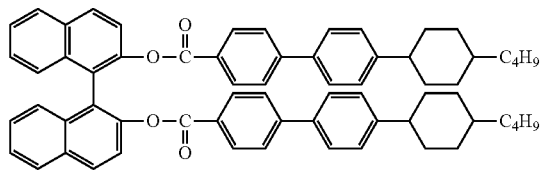

BN-H4

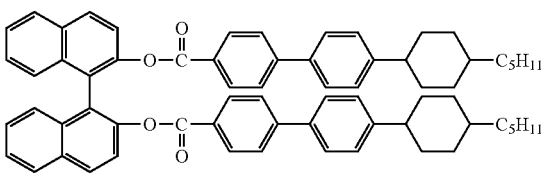

BN-H5

Example 18

Preparation of Liquid Crystal Composition (MLC) being Mixture with Polymerizable Monomer Liquid crystal compositions MLC-G, MLC-L, MLC-M, MLC-N, MLC-O and MLC-P were prepared by heat-mixing, in an isotropic phase, a mixture of a polymerizable monomer with each chiral liquid crystal composition (CLC) prepared in Example 17. The formulations of the liquid crystal compositions were described below, and their phase transition temperatures were presented in Table 4.

MLC-G

| CLC-G | 88.8 wt % |
|---|---|
| n-hexadecyl acrylate | 6.0 wt % |
| LCA-12 | 4.8 wt % |
| DMPAP | 0.4 wt % |

MLC-L

| CLC-L | 88.8 wt % |
|---|---|
| n-hexadecyl acrylate | 6.0 wt % |
| LCA-12 | 4.8 wt % |
| DMPAP | 0.4 wt % |

MLC-M

| CLC-M | 88.3 wt % |
|---|---|
| Dodecyl acrylate | 5.8 wt % |
| LCA-12 | 4.7 wt % |
| DMPAP | 1.2 wt % |

MLC-N

| CLC-N | 88.3 wt % |
|---|---|
| Dodecyl acrylate | 5.8 wt % |
| LCA-12 | 4.7 wt % |
| DMPAP | 1.2 wt % |

MLC-O

| CLC-O | 88.80 wt % |
|---|---|
| n-hexadecyl acrylate | 6.0 wt % |
| LCA-12 | 4.8 wt % |
| DMPAP | 0.4 wt % |

MLC-P

| CLC-P | 88.80 wt % |
|---|---|
| n-hexadecyl acrylate | 6.0 wt % |
| LCA-12 | 4.8 wt % |
| DMPAP | 0.4 wt % |

TABLE 4

| | Phase transition temperature/° C. |
|---|---|
| MLC-G | N* 27.2-27.9 BP – I, I – BP 25.2 N* |
| MLC-L | N* 59.1-59.5 BP 60.0 I, I 59.0 BP 57.2 N* |
| MLC-M | N* 47.5 BP 50.5 BP + Iso 50.8 I, I – BP 45.3 N* |
| MLC-N | N* 44.6 BP 46.8 BP + Iso – I, I – BP 42.2 N* |
| MLC-O | N* 38.2-38.8 BP 42.3 BP + I 43.5 I, I 40.5 BP 36.3 N* |
| MLC-P | N* 40.1-40.6 BP 44.2 BP + I 45.0 I, I 42.3 BP 38.4 N* |

LCA-6, LCA-12 and DMPA as described in Table 4 stand for 1,4-di(4-(6-(acryloyloxy)hexyloxy)benzoyloxy)-2-methylbenzene (LCA-6), 1,4-di(4-(6-(acryloyloxy)dodecyloxy) benzoyloxy)-2-methylbenzene (LCA-12) and 2,2'-dimethoxyphenylacetophenone, respectively, wherein DMPA is a photopolymerization initiator.

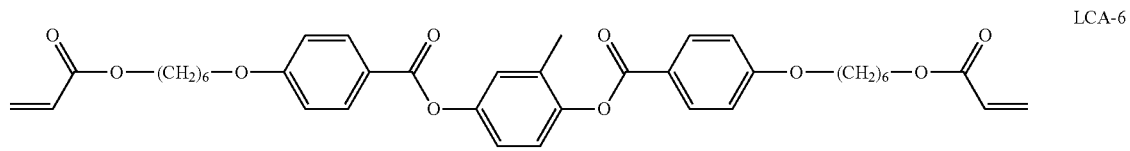

LCA-6

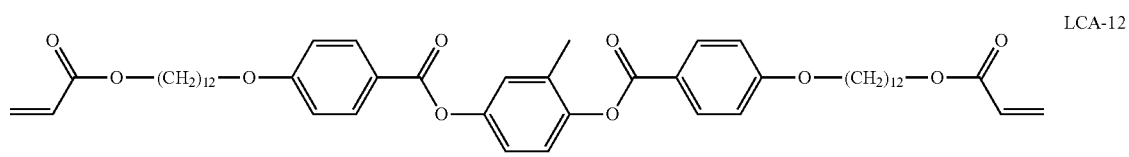

LCA-12

Example 19

Preparation of Cell Having Polymer/Liquid Crystal Composite Material Interposed Therebetween A liquid crystal composition (MLC) being a mixture of a chiral liquid crystal composition (CLC) and a polymerizable monomer was interposed between a comb-shaped electrode substrate not subjected to an alignment treatment, and an opposite glass substrate (not provided with an electrode), and the cell obtained was heated to a blue phase. In the state, a polymerization reaction was performed by irradiating the resultant composition with UV light (intensity: 23 mWcm$^{-2}$ (365 nm)) for 1 minute. Thus, cells each having polymer/liquid crystal composite materials PSBP-G, PSBP-L, PSBP-M, PSBP-N, PSBP-O or PSBP-P interposed therebetween were prepared (the cell thickness was described in Table 5). The polymerization temperatures were shown in Table 5.

TABLE 5

Table 5. Polymerization temperatures for preparing polymer/liquid crystal composite materials and values of physical properties of polymer/liquid crystal composite materials

| Kinds of MLC used | PSBP-G MLC-G | PSBP-L MLC-L | PSBP-M MLC-M | PSBP-N MLC-N | PSBP-O MLC-O | PSBP-P MLC-P |
|---|---|---|---|---|---|---|
| Polymerization temperature (° C.) | 27.4 | 61.5 | 47.7 | 44.8 | 38.3 | 40.3 |
| Vmax (V) | 37.5 | 40.4 | 45.2 | 50.5 | 47.6 | 55 |
| Contrast ratio | 1,685 | 919.3 | 1,068.3 | 1,579.3 | 1,147.9 | 1,276.2 |
| Rise (V10-90) (ms) | 1.85 | 2.5 | 2.15 | 2.28 | 1.11 | 1.06 |
| Fall (V90-10) (ms) | 1.07 | 1.3 | 1.34 | 1.49 | 0.78 | 0.69 |
| Cell gap (μm) | 6.8 | 9 | 7.97 | 6.2 | 7.81 | 7.69 |

Any one of the thus obtained polymer/liquid crystal composite materials (PSBP) maintained an optically isotropic liquid crystal phase, even when cooled to room temperature.

Example 20

Optical System Using a Cell

Figure 2:
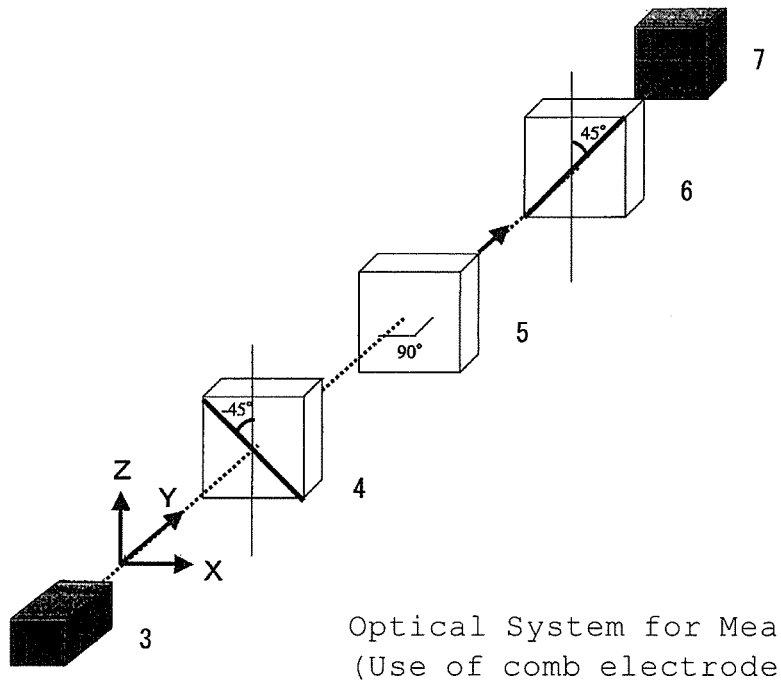
FIG. 2 shows an optical system used in Examples.

The cell having polymer/liquid crystal composite material PSBP-C interposed therebetween as obtained in Example 5 was set to the optical system shown in FIG. 2. Specifically, a white light source of a polarizing microscope (ECLIPSE LV100POL, made by Nikon Corporation) was used as the light source, and the cell having the polymer/liquid crystal composite material interposed therebetween as obtained in Example 19 was arranged in the optical system such that the angle of incidence was perpendicular to the cell plane and the line direction of the comb-shaped electrode was 45 degrees relative to Polarizer and Analyzer polarizing plates, respectively (FIG. 2).

The relationship between applied voltage and transmittance of the polymer/liquid crystal composite material obtained in Example 5 was investigated at room temperature. The values of physical properties of the cells each having a polymer/liquid crystal composite material (PSBP) interposed therebetween were as presented in Table 5.

As described above, the optical device of the invention has a high maximum temperature of the liquid crystal phase, and a high contrast, and allows low-voltage driving or shows a high speed response even though the maximum temperature of the liquid crystal phase is high, and therefore is superior to the prior art.

INDUSTRIAL APPLICABILITY

Specific examples of the utilization methods according to the invention include an optical device such as a display device using a polymer/liquid crystal composite.

LIST OF REFERENCE CHARACTERS

1 . . . Electrode 1
2 . . . Electrode 2
3 . . . Light source
4 . . . Polarizer
5 . . . Comb-shaped electrode cell
6 . . . Analyzer
7 . . . Photodetector

What is claimed is:

1. A liquid crystal composition that exhibits an optically isotropic liquid crystal phase, contains an achiral component T and a chiral agent, and contains at least one compound selected from the group of compounds represented by formula (1) as a first component of the achiral component T:

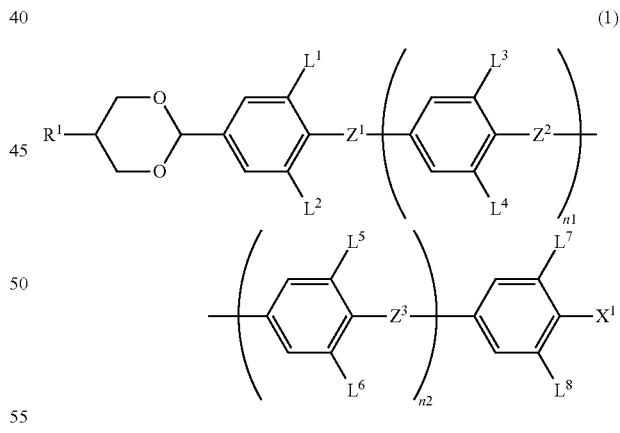

(1)

wherein R$^1$ is hydrogen or alkyl having 1 to 20 carbons, at least one —CH$_2$— in the alkyl may be replaced by —O—, —S—, —COO— or —OCO—, at least one —CH$_2$—CH$_2$— in the alkyl may be replaced by —CH═CH—, —CF═CF— or —C≡C—, and in the alkyl, in the group formed by replacing at least one —CH$_2$— in the alkyl by —O—, —S—, —COO— or —OCO—, or in the group formed by replacing at least one —CH$_2$—CH$_2$— in the alkyl by —CH═CH—, —CF═CF— or —C≡C—, at least one hydrogen may be replaced by halogen, provided that in R$^1$, —O— and —CH═CH— are not adjacent and —CO— and —CH=CH— are not adjacent; $L^1, L^2, L^3, L^4, L^5, L^6, L^7$ and $L^8$ are independently hydrogen or fluorine; $Z^1, Z^2$ and $Z^3$ are each independently a single bond, —COO— or —CF$_2$O—, but at least one thereof is —COO—; n1 and n2 are each independently 0 or 1; and $X^1$ is hydrogen, halogen, —SF$_5$ or alkyl having 1 to 10 carbons, at least one —CH$_2$— in the alkyl may be replaced by —O—, —S—, —COO— or —OCO—, at least one —CH$_2$—CH$_2$— in the alkyl may be replaced by —CH=CH—, —CF=CF— or —C≡C—, and in the alkyl, the group formed by replacing at least one —CH$_2$— in the alkyl by —O—, —S—, —COO— or —OCO—, or the group formed by replacing at least one —CH$_2$—CH$_2$— in the alkyl by —CH=CH—, —CF=CF— or —C≡C—, at least one hydrogen may be replaced by fluorine, provided that in $X^1$, —O— and —CH=CH— are not adjacent and —CO— and —CH=CH— are not adjacent.

2. The liquid crystal composition of claim 1, wherein the first component of the achiral component T contains at least one compound selected from the group of compounds represented by formulas (1-1-1), (1-1-2), (1-2-1) to (1-2-5), (1-3-1), (1-3-2), (1-4-1), (1-4-2) and (1-5-1):

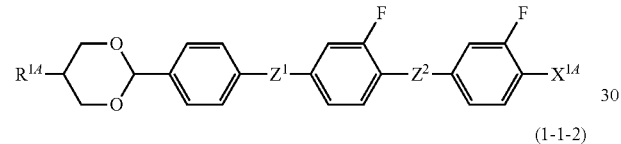
(1-1-1)

(1-1-2)

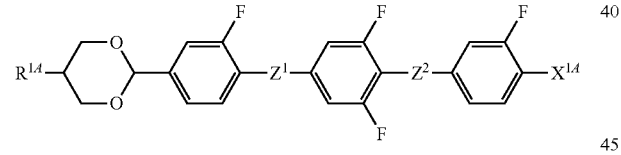
(1-2-1)

(1-2-2)

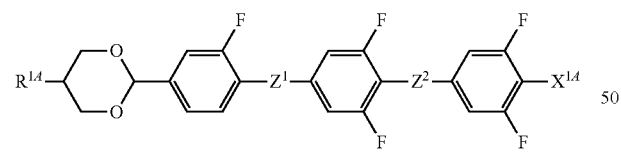
(1-2-3)

(1-2-4)

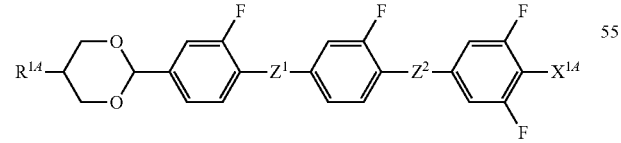

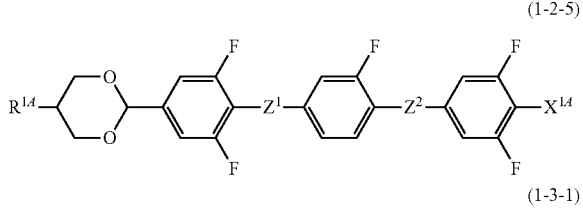
(1-2-5)

(1-3-1)

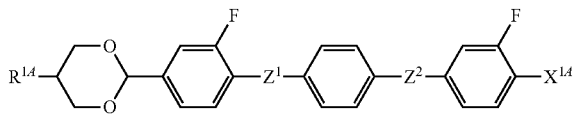
(1-3-2)

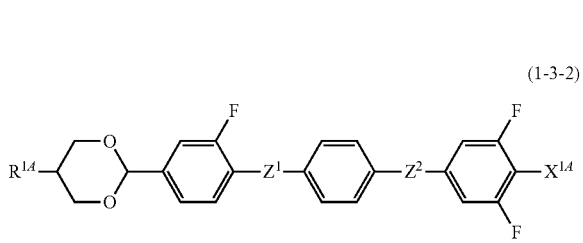
(1-4-1)

(1-4-2)

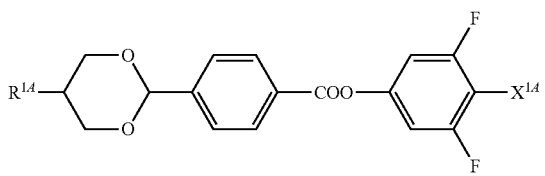
(1-5-1)

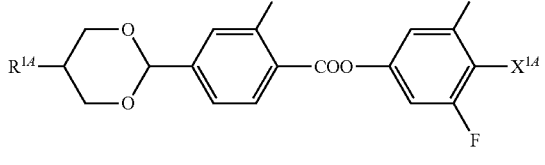

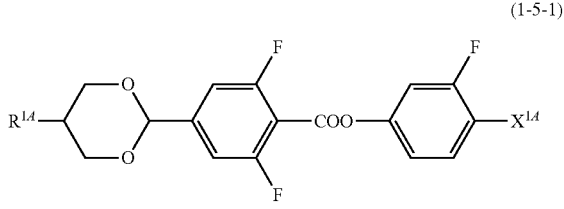

wherein $R^{14}$ is alkyl having 1 to 12 carbons, alkoxy having 1 to 12 carbons, alkenyl having 2 to 12 carbons, or alkenyl having 2 to 12 carbons in which at least one hydrogen is replaced by fluorine; $Z^1$ and $Z^2$ are each independently a single bond, —COO— or —CF$_2$O—, but at least one thereof is —COO—; and $X^{14}$ is fluorine, chlorine, —CF$_3$ or —OCF$_3$.

3. The liquid crystal composition of claim 1, wherein the first component of the achiral component T contains at least one compound selected from the group of compounds represented by formulas (1-2-2-1) and (1-2-5-1):

(1-2-2-1)

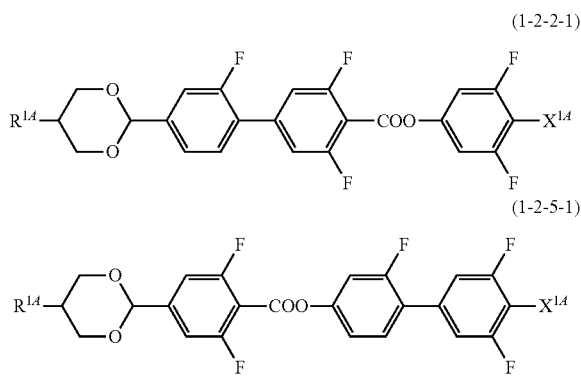

(1-2-5-1)

wherein, $R^{1A}$ is alkyl having 1 to 12 carbons, alkoxy having 1 to 12 carbons, alkenyl having 2 to 12 carbons, or alkenyl having 2 to 12 carbons in which at least one hydrogen is replaced by fluorine; and $X^{1A}$ is fluorine, chlorine, —$CF_3$ or —$OCF_3$.

5. The liquid crystal composition of claim 1, wherein a proportion of the first component of the achiral component T is in a range of 3 wt % to 80 wt % based on a total weight of the achiral component T.

6. The liquid crystal composition of claim 1, further containing at least one compound selected from the group of compounds represented by formula (2) as a second component of the achiral component T:

(2)

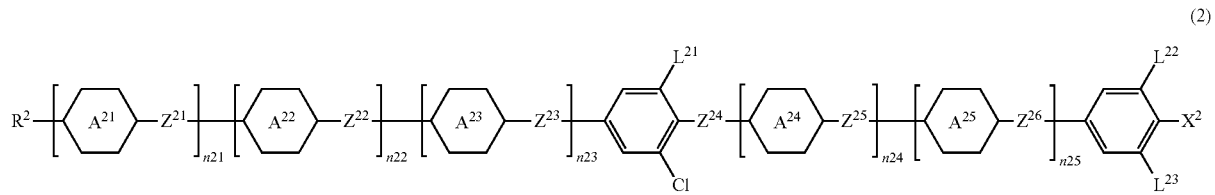

wherein $R^2$ is hydrogen or alkyl having 1 to 20 carbons, at least one —$CH_2$— in the alkyl may be replaced by —O—, —S—, —COO— or —OCO—, at least one —$CH_2$—$CH_2$— in the alkyl may be replaced by —CH=CH—, —CF=CF— or —C≡C—, and in the alkyl, the group formed by replacing at least one —$CH_2$— in the alkyl by —O—, —S—, —COO— or —OCO—, or the group formed by replacing at least one —$CH_2$—$CH_2$— in the alkyl by —CH=CH—, —CF=CF— or —C≡C—, at least one hydrogen may be replaced by halogen, provided that in $R^2$, —O— and —CH=CH— are not adjacent and —CO— and —CH=CH— are not adjacent; ring $A^{21}$, ring $A^{22}$, ring $A^{23}$, ring $A^{24}$ and ring $A^{25}$ are independently 1,4-cyclohexylene, 1,3-dioxane-2,5-diyl, 1,4-phenylene, 1,4-phenylene in which one or two hydrogens are replaced by fluorine, 1,4-phenylene in which two hydrogens are replaced by fluorine and chlorine, respectively, pyridine-2,5-diyl or pyrimidine-2,5-diyl; $Z^{21}$, $Z^{22}$, $Z^{23}$, $Z^{24}$, $Z^{25}$ and $Z^{26}$ are independently a single bond or alkylene having 1 to 4 carbons, and at least one —$CH_2$— in the alkylene may be replaced by —O—, —COO— or —$CF_2O$—; $L^{21}$, $L^{22}$ and $L^{23}$ are independently hydrogen or fluorine; $X^2$ is fluorine, chlorine, —$CF_3$ or —$OCF_3$; and n21, n22, n23, n24 and n25 are independently 0 or 1, while satisfying an equality of $2 \leq n21+n22+n23+n24+n25 \leq 3$.

having 2 to 12 carbons in which at least one hydrogen is replaced by fluorine; and $X^{1A}$ is fluorine, chlorine or —$CF_3$.

4. The liquid crystal composition of claim 1, wherein the first component of the achiral component T contains at least one compound selected from the group of compounds represented by formulas (1-4-1), (1-4-2) and (1-5-1):

(1-4-1)

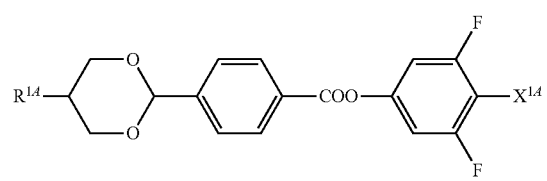

(1-4-2)

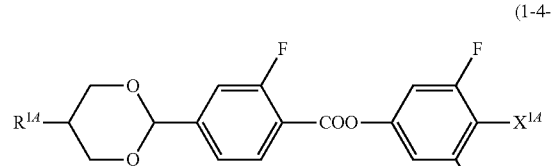

(1-5-1)

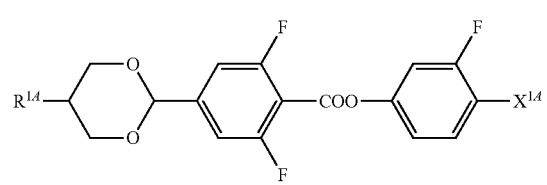

7. The liquid crystal composition of claim 6, wherein the second component of the achiral component T contains at least one compound selected from the group of compounds represented by formulas (2-1-1-2), (2-1-2-1), (2-1-3-1), (2-1-3-2), (2-1-4-2) and (2-1-4-3):

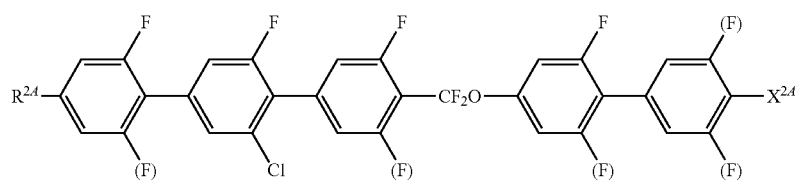
(2-1-1-2)

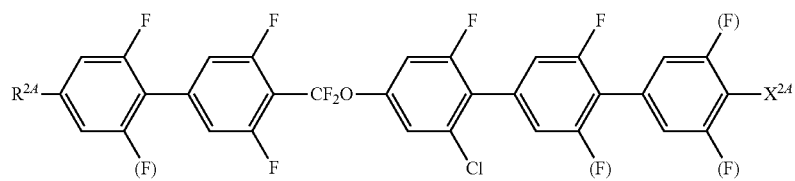
(2-1-2-1)

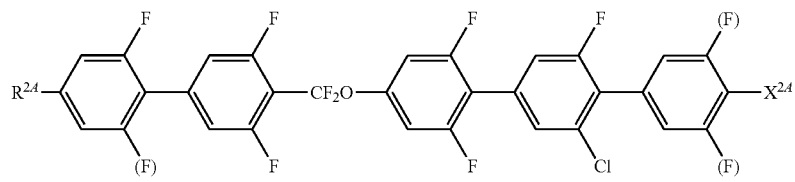
(2-1-3-1)

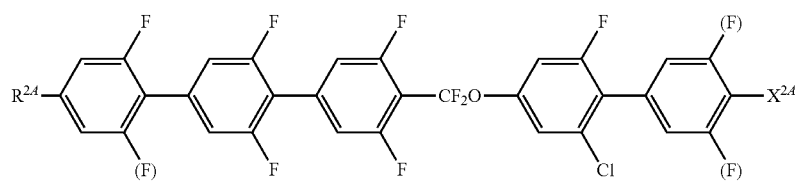
(2-1-3-2)

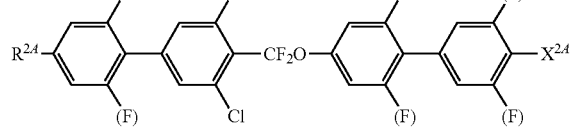
(2-1-4-2)

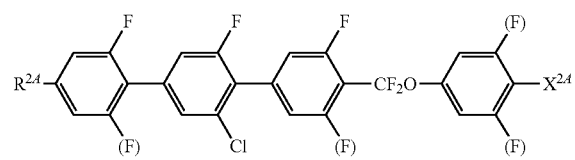
(2-1-4-3)

wherein $R^{2A}$ is alkyl having 1 to 12 carbons, alkoxy having 1 to 12 carbons, alkenyl having 2 to 12 carbons, or alkenyl having 2 to 12 carbons in which at least one hydrogen is replaced by fluorine; (F) is independently hydrogen or fluorine; and $X^{2A}$ is fluorine, chlorine, —$CF_3$ or —$OCF_3$.

8. The liquid crystal composition of claim 7, wherein the second component of the achiral component T contains at least one compound selected from the group of compounds represented by formula (2-1-1-2).

9. The liquid crystal composition of claim 7, wherein the second component of the achiral component T contains at least one compound selected from the group of compounds represented by the formula (2-1-4-3).

10. The liquid crystal composition of claim 7, wherein the second component of the achiral component T contains a mixture of at least one compound selected from the group of compounds represented by formula (2-1-1-2), and at least one compound selected from the group of compounds represented by formula (2-1-4-3).

11. The liquid crystal composition of claim 6, wherein a proportion of the second component of the achiral component T is in a range of 5 wt % to 70 wt % based on a total weight of the achiral component T.

12. The liquid crystal composition of claim 1, further containing at least one compound selected from the group of compounds represented by formula (3) as a third component of the achiral component T:

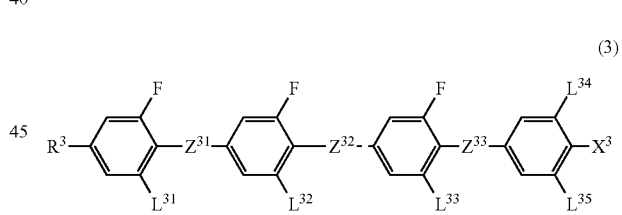
(3)

wherein in formula (3), $R^3$ is hydrogen or alkyl having 1 to 20 carbons, at least one —$CH_2$— in the alkyl may be replaced by —O—, —S—, —COO— or —OCO—, at least one —$CH_2$—$CH_2$— in the alkyl may be replaced by —CH=CH—, —CF=CF— or —C≡C—, and in the alkyl, the group formed by replacing at least one —$CH_2$— in the alkyl by —O—, —S—, —COO— or —OCO—, or the group formed by replacing at least one —$CH_2$—$CH_2$— in the alkyl by —CH=CH—, —CF=CF— or —C≡C—, at least one hydrogen may be replaced by halogen, provided that in $R^3$, —O— and —CH=CH— are not adjacent and —CO— and —CH=CH— are not adjacent; $Z^{31}$, $Z^{32}$ and $Z^{33}$ are independently a single bond, —COO— or —$CF_2O$—, but at least one thereof is —$CF_2O$—; $L^{31}$, $L^{32}$, $L^{33}$, $L^{34}$ and $L^{35}$ are independently hydrogen or fluorine; and $X^3$ is hydrogen, halogen, —$SF_5$ or alkyl having 1 to 10 carbons, at least one —$CH_2$— in the alkyl may be replaced by —O—, —S—, —COO— or —OCO—, at least one —$CH_2$—$CH_2$— in the alkyl may be replaced by —CH=CH—, —CF=CF— or —C≡C—, and in the alkyl, the group formed by replacing at least one —CH₂— in the alkyl by —O—, —S—, —COO— or —OCO—, or the group formed by replacing at least one —CH₂—CH₂— in the alkyl by —CH=CH—, —CF=CF— or —C≡C—, at least one hydrogen may be replaced by fluorine, provided that in X³, —O— and —CH=CH— are not adjacent and —CO— and —CH=CH— are not adjacent.

13. The liquid crystal composition of claim 12, wherein the third component of the achiral component T is at least one compound selected from the group of compounds represented by formulas (3-2) to (3-3):

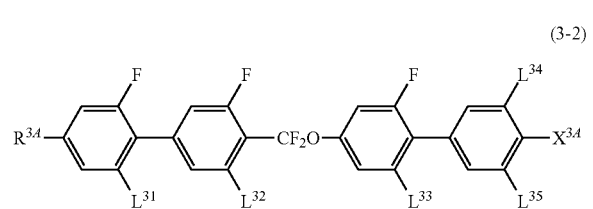
(3-2)

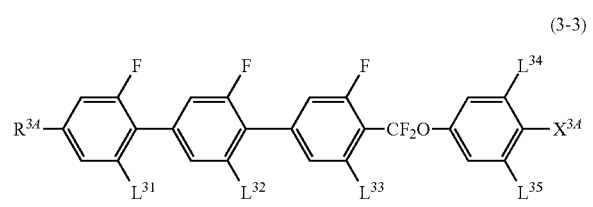
(3-3)

wherein $R^{3A}$ is independently alkyl having 1 to 12 carbons, alkoxy having 1 to 12 carbons, alkenyl having 2 to 12 carbons, or alkenyl having 2 to 12 carbons in which at least one hydrogen is replaced by fluorine, $X^{3A}$ is fluorine, chlorine, —CF₃ or —OCF₃, and $L^{31}$ to $L^{35}$ are independently hydrogen or fluorine.

14. The liquid crystal composition of claim 12, wherein in formula (3), $R^3$ has a straight chain.

15. The liquid crystal composition of claim 13, wherein the third component of the achiral component T is at least one compound selected from the group of compounds represented by formulas (3-2A) and (3-2C):

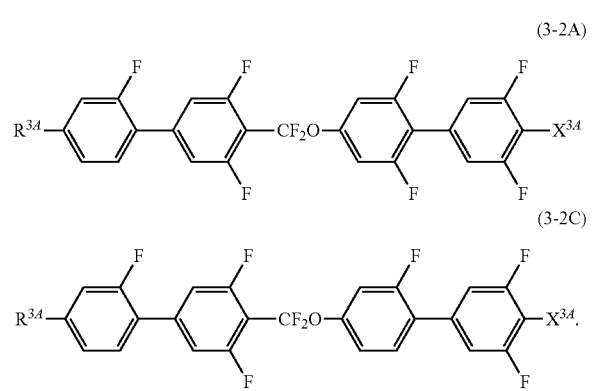
(3-2A)

(3-2C)

16. The liquid crystal composition of claim 13, wherein the third component of the achiral component T is at least one compound selected from the group of compounds represented by formula (3-3A):

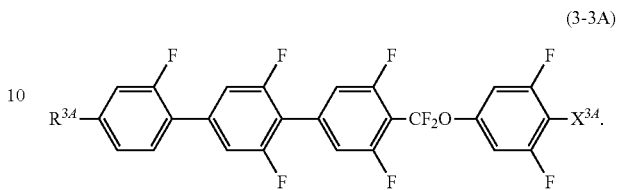
(3-3A)

17. The liquid crystal composition of claim 12, wherein a proportion of the third component of the achiral component T is in a range of 5 wt % to 70 wt % based on a total weight of the achiral component T.

18. The liquid crystal composition of claim 12, wherein a proportion of the first component of the achiral component T is in a range of 30 wt % to 70 wt %, a proportion of the second component is in a range of 10 wt % to 50 wt %, and a proportion of the third component is in a range of 10 wt % to 50 wt %, based on a total weight of the achiral component T.

19. The liquid crystal composition of claim 1, further containing at least one compound selected from the group of compounds represented by formula (4) as a fourth component of the achiral component T:

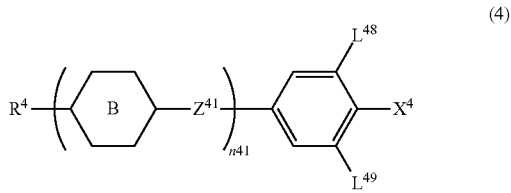
(4)

wherein $R^4$ is alkyl having 1 to 12 carbons, alkoxy having 1 to 12 carbons, alkenyl having 2 to 12 carbons, or alkenyl having 2 to 12 carbons in which at least one hydrogen is replaced by fluorine; each ring B is independently 1,4-cyclohexylene, 1,4-phenylene, 2-fluoro-1,4-phenylene, 3-fluoro-1,4-phenylene, 3,5-difluoro-1,4-phenylene, 3,5-dichloro-1,4-phenylene or pyrimidine-2,5-diyl; $Z^{41}$ is independently a single bond, ethylene, —COO—, —OCO—, —CF₂O— or —OCF₂—; $L^{48}$ and $L^{49}$ are independently hydrogen or fluorine; $X^4$ is fluorine, chlorine, —CF₃ or —OCF₃; n41 is 1, 2, 3 or 4, provided that when n41 is 3 or 4, one $Z^{41}$ is —CF₂O— or —OCF₂—; and when n41 is 3, a case where all of the rings B are 1,4-phenylene replaced by fluorine is excluded.

20. The liquid crystal composition of claim 19, wherein the fourth component of the achiral component T is at least one compound selected from the group of compounds represented by formulas (4-1) to (4-9):

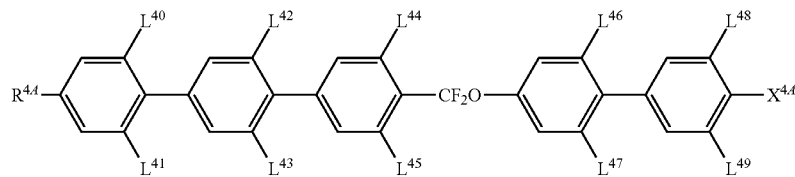
(4-1)

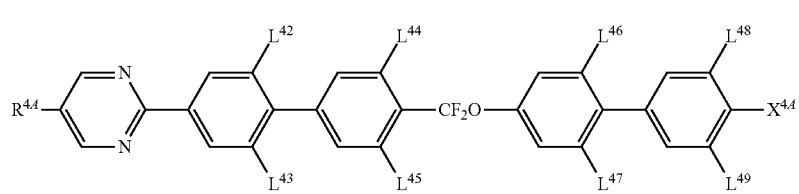
(4-2)

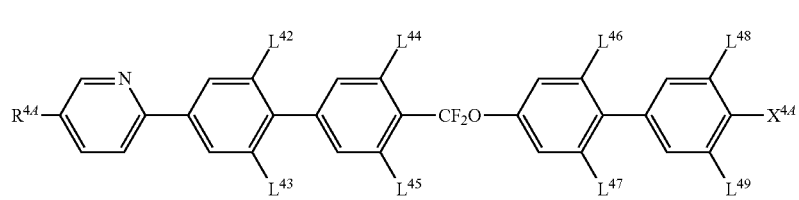
(4-3)

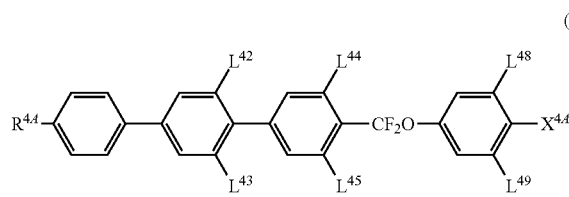
(4-4)

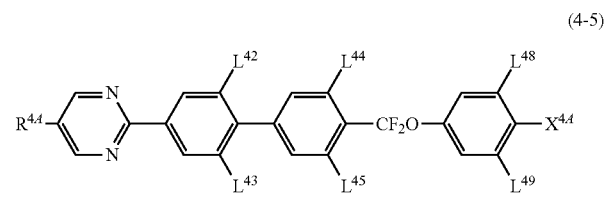
(4-5)

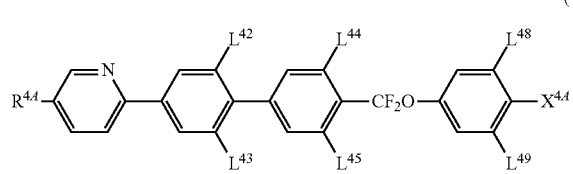
(4-6)

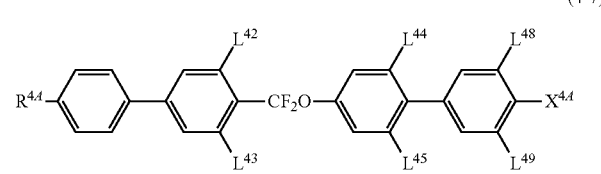
(4-7)

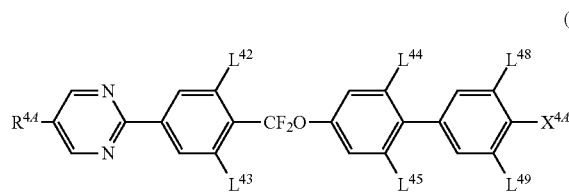
(4-8)

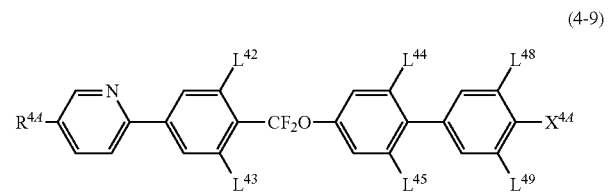
(4-9)

wherein each $R^{4A}$ is independently alkyl having 1 to 12 carbons, alkoxy having 1 to 12 carbons, alkenyl having 2 to 12 carbons, or alkenyl having 2 to 12 carbons in which at least one hydrogen is replaced by fluorine, $X^{4A}$ is fluorine, chlorine, —$CF_3$ or —$OCF_3$, and $L^{40}$ to $L^{49}$ are independently hydrogen or fluorine.

21. The liquid crystal composition of claim 1, further containing at least one compound selected from the group of compounds represented by formula (5) as a fifth component of the achiral component T:

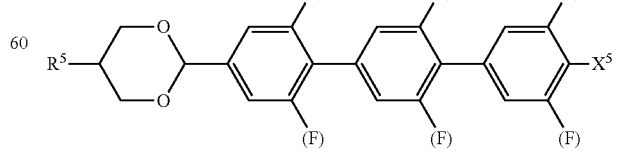
(5)

wherein $R^5$ is hydrogen or alkyl having 1 to 20 carbons, at least one —$CH_2$— in the alkyl may be replaced by —O—, —S—, —COO— or —OCO—, at least one —CH$_2$—CH$_2$— in the alkyl may be replaced by —CH═CH—, —CF═CF— or —C≡C—, and in the alkyl, the group formed by replacing at least one —CH$_2$— by —O—, —S—, —COO— or —OCO—, or the group formed by replacing at least one —CH$_2$—CH$_2$— in the alkyl by —CH═CH—, —CF═CF— or —C≡C—, at least one hydrogen may be replaced by halogen, provided that in $R^5$, —O— and —CH═CH— are not adjacent and —CO— and —CH═CH— are not adjacent; (F) is independently hydrogen or fluorine; $X^5$ is hydrogen, halogen, —SF$_5$ or alkyl having 1 to 10 carbons, at least one —CH$_2$— in the alkyl may be replaced by —O—, —S—, —COO— or —OCO—, at least one —CH$_2$—CH$_2$— in the alkyl may be replaced by —CH═CH—, —CF═CF— or —C≡C—, and in the alkyl, the group formed by replacing at least one —CH$_2$— in the alkyl by —O—, —S—, —COO— or —OCO—, or the group formed by replacing at least one —CH$_2$—CH$_2$— in the alkyl by —CH═CH—, —CF═CF— or —C≡C—, at least one hydrogen may be replaced by fluorine, provided that in $X^5$, —O— and —CH═CH— are not adjacent and —CO— and —CH═CH— are not adjacent.

22. The liquid crystal composition of claim 21, wherein the fifth component of the achiral component T contains at least one compound selected from the group of compounds represented by formulas (5-1) to (5-3):

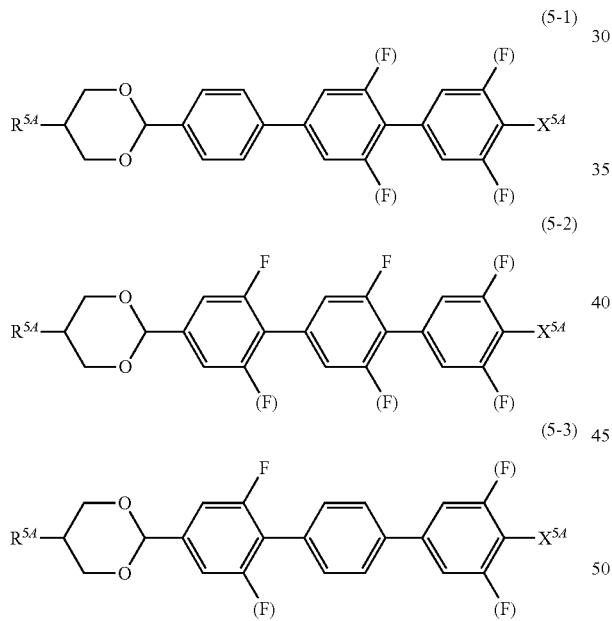

wherein $R^{5A}$ is alkyl having 1 to 12 carbons, alkoxy having 1 to 12 carbons, alkenyl having 2 to 12 carbons, or alkenyl having 2 to 12 carbons in which at least one hydrogen is replaced by fluorine; (F) is independently hydrogen or fluorine; and $X^{5A}$ is fluorine, chlorine, —CF$_3$ or —OCF$_3$.

23. The liquid crystal composition of claim 21, wherein a proportion of the fifth component of the achiral component T is in a range of 1 wt % to 20 wt % based on a total weight of the liquid crystal composition.

24. The liquid crystal composition of claim 1, further containing at least one compound selected from the group of compounds represented by formula (6) as a sixth component of the achiral component T:

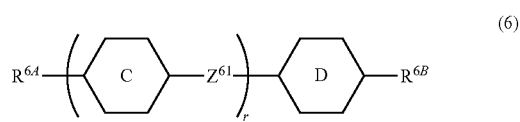

wherein $R^{6A}$ and $R^{6B}$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine; ring C and ring D are independently 1,4-cyclohexylene, 1,4-phenylene, 2-fluoro-1,4-phenylene, 3-fluoro-1,4-phenylene or 2,5-difluoro-1,4-phenylene; each $Z^{61}$ is independently a single bond, ethylene, —COO— or —OCO—; and r is 1, 2 or 3.

25. The liquid crystal composition of claim 24, wherein the sixth component of the achiral component T contains at least one compound selected from the group of compounds represented by formulas (6-1) to (6-13):

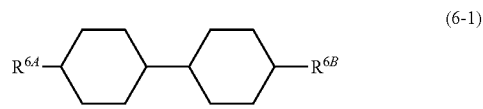

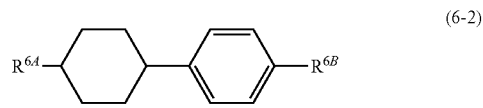

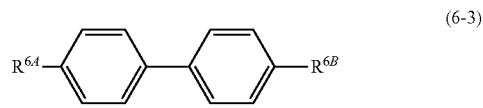

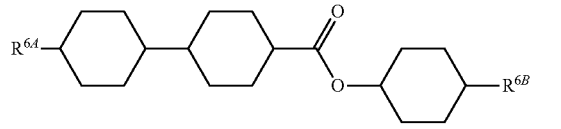

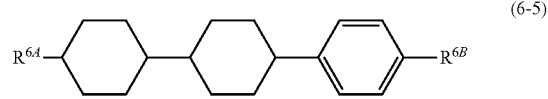

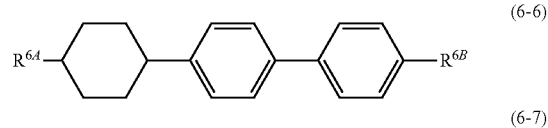

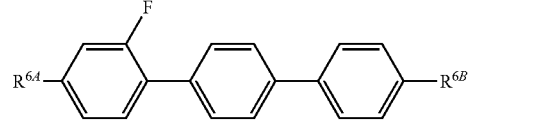

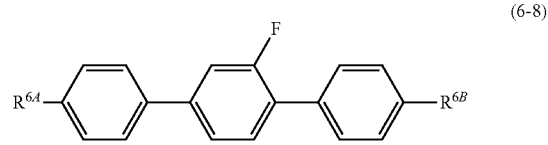

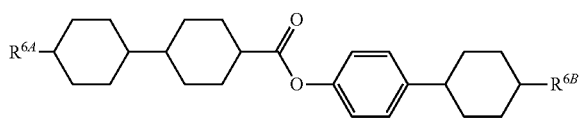

-continued (6-10)

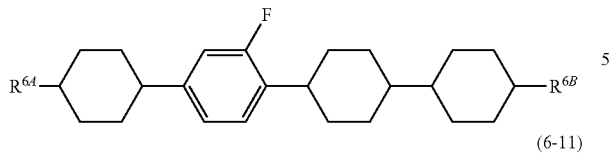

(6-11)

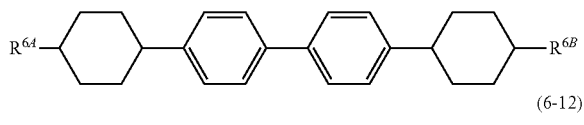

(6-12)

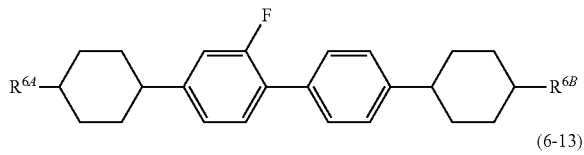

(6-13)

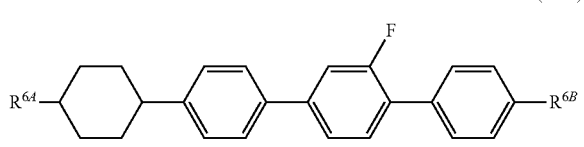

wherein $R^{6A}$ and $R^{6B}$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine.

26. The liquid crystal composition of claim 1, further containing at least one compound selected from the group of compounds represented by formula (7) as a seventh component of the achiral component T:

(7)

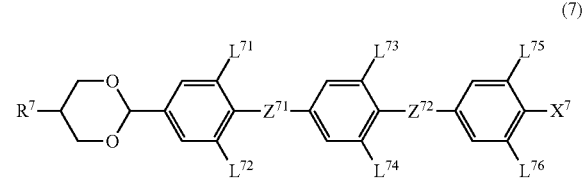

wherein $R^7$ is hydrogen or alkyl having 1 to 20 carbons, at least one —CH$_2$— in the alkyl may be replaced by —O—, —S—, —COO— or —OCO—, at least one —CH$_2$—CH$_2$— in the alkyl may be replaced by —CH=CH—, —CF=CF— or —C≡C—, and in the alkyl, the group formed by replacing at least one —CH$_2$— in the alkyl by —O—, —S—, —COO— or —OCO—, or the group formed by replacing at least one —CH$_2$—CH$_2$— in the alkyl by —CH=CH—, —CF=CF— or —C≡C—, at least one hydrogen may be replaced by halogen, provided that in $R^7$, —O— and —CH=CH— are no adjacent and —CO— and —CH=CH— are no adjacent; $L^{71}$, $L^{72}$, $L^{73}$, $L^{74}$, $L^{75}$ and $L^{76}$ are independently hydrogen or fluorine; $Z^{71}$ and $Z^{72}$ are each independently a single bond or —CF$_2$O—, but at least one thereof is —CF$_2$O—; and $X^7$ is hydrogen, halogen, —SF$_5$ or alkyl having 1 to 10 carbons, at least one —CH$_2$— in the alkyl may be replaced by —O—, —S—, —COO— or —OCO—, at least one —CH$_2$—CH$_2$— in the alkyl may be replaced by —CH=CH—, —CF=CF— or —C≡C—, and in the alkyl, the group formed by replacing at least one —CH$_2$— in the alkyl by —O—, —S—, —COO— or —OCO—, or the group formed by replacing at least one —CH$_2$—CH$_2$— in the alkyl by —CH=CH—, —CF=CF— or —C≡C—, at least one hydrogen may be replaced by fluorine, provided that in $X^7$, —O— and —CH=CH— are not adjacent and —CO— and —CH=CH— are not adjacent.

27. The liquid crystal composition of claim 26, wherein the seventh component of the achiral component T contains at least one compound selected from the group of compounds represented by formulas (7-1) to (7-3):

(7-1)

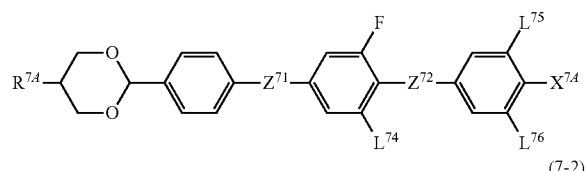

(7-2)

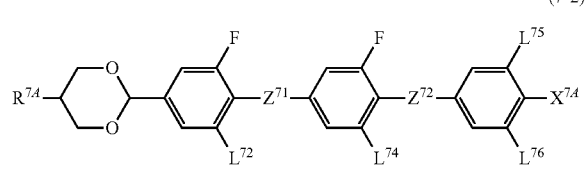

(7-3)

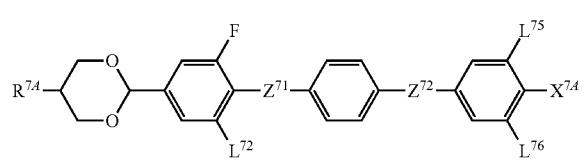

wherein $R^{7A}$ is alkyl having 1 to 12 carbons, alkoxy having 1 to 12 carbons, alkenyl having 2 to 12 carbons, or alkenyl having 2 to 12 carbons in which at least one hydrogen is replaced by fluorine; $L^{72}$, $L^{74}$, $L^{75}$ and $L^{76}$ are independently hydrogen or fluorine; $Z^{71}$ and $Z^{72}$ are each independently a single bond or —CF$_2$O—, but at least one thereof is —CF$_2$O—; and $X^{7A}$ is fluorine, chlorine, —CF$_3$ or —OCF$_3$.

28. The liquid crystal composition of claim 27, wherein a proportion of the first component of the achiral component T is in a range of 5 wt % to 30 wt %, and a proportion of the seventh component of the achiral component T is in a range of 30 to 70 wt %, based on a total weight of the achiral component T.

29. The liquid crystal composition of claim 1, wherein the chiral agent is at least one compound selected from the group of compounds represented by formulas (K1) to (K5):

(K1)

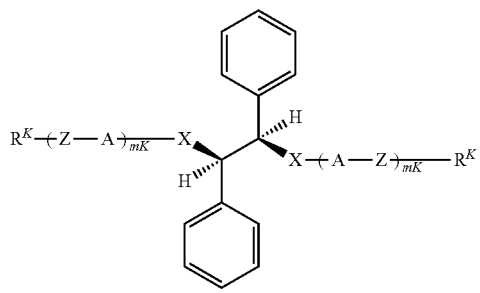

-continued

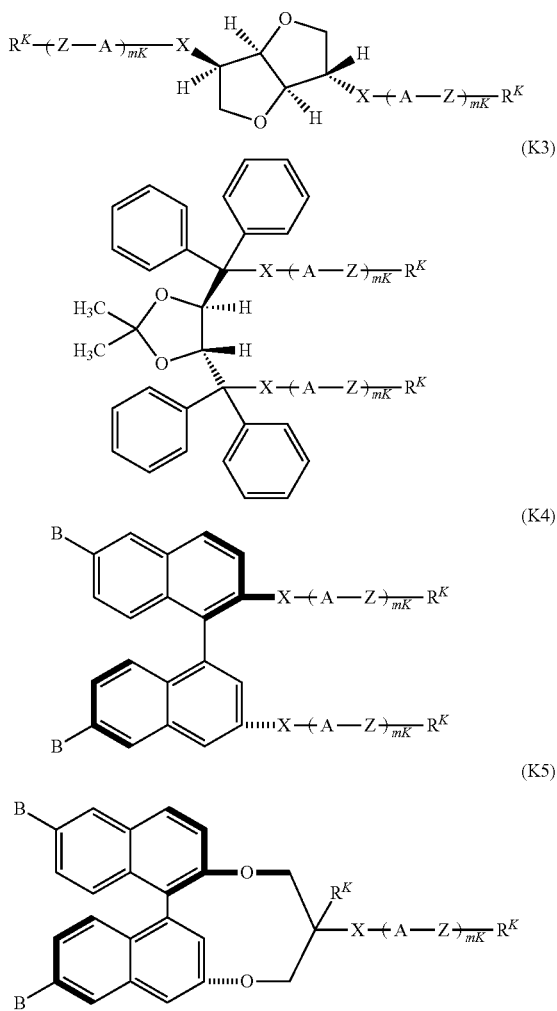

wherein each $R^K$ is independently hydrogen, halogen, —C≡N, —N=C=O, —N=C=S, or alkyl having 1 to 20 carbons, at least one —$CH_2$— in the alkyl may be replaced by —O—, —S—, —COO— or —OCO—, at least one —$CH_2$—$CH_2$— in the alkyl may be replaced by —CH=CH—, —CF=CF— or —C≡C—, and at least one hydrogen in the alkyl may be replaced by halogen; each A is independently an aromatic six- to eight-membered ring, a non-aromatic three- to eight-membered ring, or a fused ring having 9 or more carbons, and in the rings, at least one hydrogen may be replaced by halogen, or alkyl or haloalkyl each having 1 to 3 carbons, —$CH_2$— may be replaced by —O—, —S— or —NH—, and —CH= may be replaced by —N=; each B is independently hydrogen, halogen, alkyl having 1 to 3 carbons, haloalkyl having 1 to 3 carbons, an aromatic six- to eight-membered ring, a non-aromatic three- to eight-membered ring, or a fused ring having 9 or more carbons, and in the rings, at least one hydrogen may be replaced by halogen, or alkyl or haloalkyl each having 1 to 3 carbons, —$CH_2$— may be replaced by —O—, —S— or —NH—, and —CH= may be replaced by —N=; each Z is independently a single bond, or alkylene having 1 to 8 carbons, at least one —$CH_2$— in the alkylene may be replaced by —O—, —S—, —COO—, —OCO—, —CSO—, —OCS—, —CH=N— or —N=CH—, at least one —$CH_2$—$CH_2$— in the alkylene may be replaced by —CH=CH—, —CF=CF— or —C≡C—, and at least one hydrogen may be replaced by halogen; X is a single bond, —COO—, —OCO—, —$CH_2$O—, —O$CH_2$—, —$CF_2$O—, —O$CF_2$— or —$CH_2CH_2$—; and mK is an integer from 1 to 4.

30. The liquid crystal composition of claim 29, wherein the chiral agent is at least one compound selected from the group of compounds represented by formulas (K4-1) to (K4-6) and (K5-1) to (K5-3):

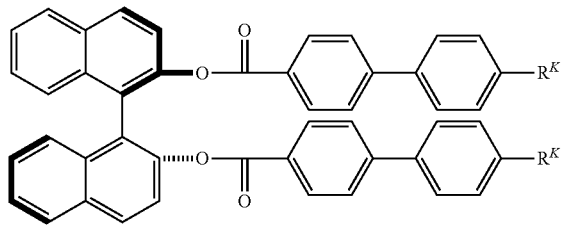
(K4-1)

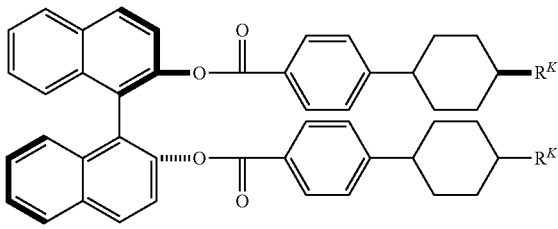
(K4-2)

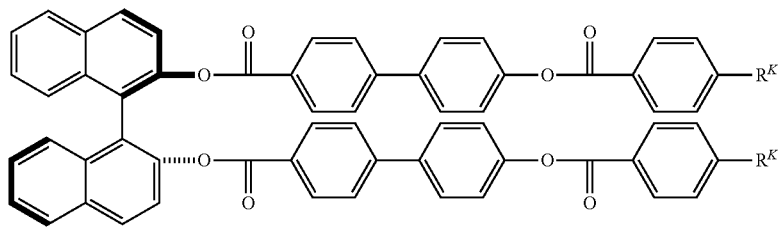
(K4-3)

-continued (K4-4)
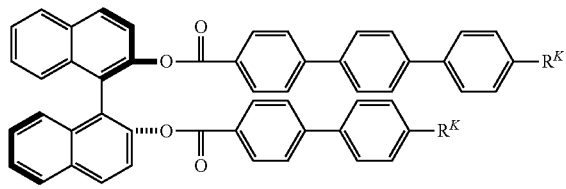

(K4-5)
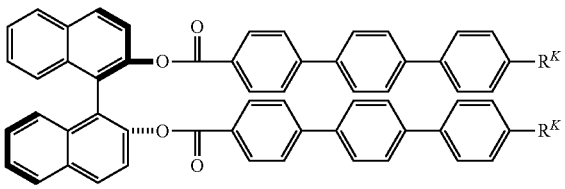

(K4-6)
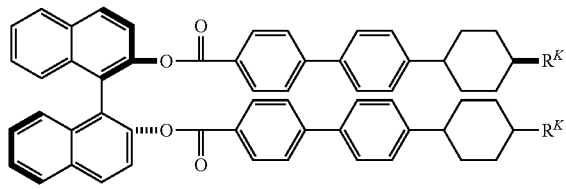

(K5-1)
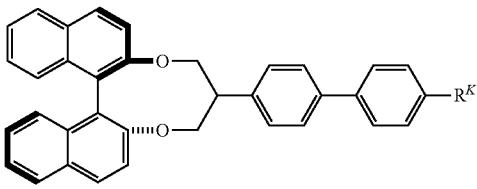

(K5-2)
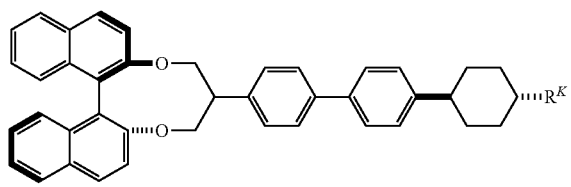

(K-5-3)
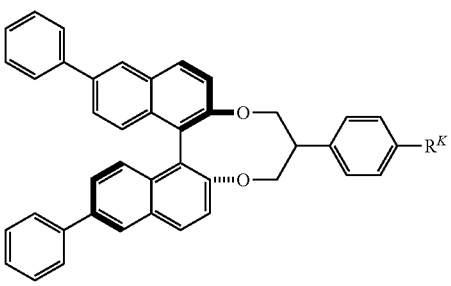

wherein each $R^K$ is independently alkyl having 3 to 10 carbons or alkoxy having 3 to 10 carbons, and at least one —CH$_2$— in the alkyl or the alkoxy may be replaced by —CH=CH—, provided that —O— and —C≡C— are not adjacent.

31. The liquid crystal composition of claim 1, showing a chiral nematic phase at any temperature in a range of 70 to −20° C., wherein a helical pitch is 700 nm or less at least in a part of the temperature range.

32. The liquid crystal composition of claim 1, containing at least one antioxidant and/or at least one ultraviolet light absorbent.

33. A mixture, containing the liquid crystal composition of claim 1, and a polymerizable monomer.

34. A polymer/liquid crystal composite material, obtained by polymerizing the mixture of claim 33, and used for a device to be driven in an optically isotropic liquid crystal phase.

35. The polymer/liquid crystal composite material of claim 34, wherein the mixture is polymerized in a non-liquid crystal isotropic phase or the optically isotropic liquid crystal phase.

36. An optical device, comprising two substrates with electrodes disposed on a surface of one or both of the substrates, a liquid crystal medium disposed between the substrates, and an electric field applying means for applying an electric field to the liquid crystal medium through the electrodes, wherein the liquid crystal medium is the polymer/liquid crystal composite material of claim 34.

37. An optical device, comprising a set of substrates, at least one of which is transparent, with electrodes disposed on one or both thereof, a liquid crystal medium disposed between the substrates, a polarizing plate disposed outside the substrate, and an electric field applying means for applying an electric field to the liquid crystal medium through the electrodes, wherein the liquid crystal medium is the polymer/liquid crystal composite material of claim 34.

38. The optical device of claim 36, wherein the electrodes are constituted so as to allow application of an electric field at least in two directions at least on one substrate of the set of substrates.

39. The optical device of claim 36, wherein the electrodes are constituted so as to allow application of an electric field at least in two directions on one substrate or both substrates of the set of substrates arranged in parallel to each other.

40. The optical device of claim 36, wherein the electrodes are arranged in a matrix to constitute pixel electrodes, each pixel has a thin film transistor (TFT) as an active device.

* * * * *